United States Patent
Kurasawa et al.

(10) Patent No.: US 9,671,919 B2
(45) Date of Patent: Jun. 6, 2017

(54) DISPLAY DEVICE

(71) Applicant: Japan Display Inc., Tokyo (JP)

(72) Inventors: Hayato Kurasawa, Tokyo (JP); Koji Ishizaki, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 116 days.

(21) Appl. No.: 14/598,295

(22) Filed: Jan. 16, 2015

(65) Prior Publication Data

US 2015/0206501 A1    Jul. 23, 2015

(30) Foreign Application Priority Data

Jan. 17, 2014 (JP) ................................ 2014-007229
Jul. 31, 2014 (JP) ................................ 2014-155705

(51) Int. Cl.
*G06F 3/047*    (2006.01)
*G09G 3/20*     (2006.01)
*G09G 3/36*     (2006.01)
*G09G 5/00*     (2006.01)
(Continued)

(52) U.S. Cl.
CPC .............. *G06F 3/047* (2013.01); *G06F 3/044* (2013.01); *G06F 3/0416* (2013.01); *G09G 3/2092* (2013.01); *G09G 3/3611* (2013.01); *G09G 5/003* (2013.01); *G06F 2203/04103* (2013.01); *G06F 2203/04112* (2013.01)

(58) Field of Classification Search
CPC .............. G06F 3/047; G09G 5/18; G09G 5/00
See application file for complete search history.

(56) References Cited

U.S. PATENT DOCUMENTS

2010/0182273 A1    7/2010    Noguchi et al.
2011/0134076 A1    6/2011    Kida et al.
2011/0267293 A1    11/2011   Noguchi et al.
(Continued)

FOREIGN PATENT DOCUMENTS

JP    2010-197576 A    9/2010
JP     2011-59771 A    3/2011
(Continued)

OTHER PUBLICATIONS

Taiwanese Patent Office Action issued Apr. 6, 2016 for corresponding Taiwanese Application No. 103141260.
(Continued)

*Primary Examiner* — Shaheda Abdin
(74) *Attorney, Agent, or Firm* — Michael Best & Friedrich LLP

(57) ABSTRACT

A display device includes: a plurality of pixel electrodes each of which is provided in each of a plurality of sub-pixels arranged in a display region; a driving electrode provided so as to overlap the plurality of pixel electrodes when seen in a plan view; a plurality of detecting electrodes provided so as to overlap the driving electrode when seen in a plan view; and a dummy electrode provided apart from the detecting electrodes. The detecting electrodes and the dummy electrode include a metal layer or an alloy layer. A ratio of total sum of areas of portions of the plurality sub-pixels which overlap any of the detecting electrodes and the dummy electrode when seen in a plan view to total sum of areas of the plurality of sub-pixels is 1 to 22%.

19 Claims, 35 Drawing Sheets

(51) Int. Cl.
    *G06F 3/041*     (2006.01)
    *G06F 3/044*     (2006.01)

(56) References Cited

U.S. PATENT DOCUMENTS

| | | |
|---|---|---|
| 2012/0050193 A1 | 3/2012 | Noguchi et al. |
| 2012/0299803 A1* | 11/2012 | Bae .................. G02F 1/136286 |
| | | 345/55 |
| 2013/0271689 A1 | 10/2013 | Kim et al. |
| 2015/0236047 A1 | 8/2015 | Kim et al. |

FOREIGN PATENT DOCUMENTS

| | | |
|---|---|---|
| JP | 2014-109904 A | 6/2014 |
| KR | 10-2013-0108220 A | 10/2013 |
| KR | 10-2013-0115621 A | 10/2013 |
| TW | 201115443 A | 5/2011 |
| TW | 201211852 A | 3/2012 |

OTHER PUBLICATIONS

Korean Office Action mailed Aug. 23, 2016, for corresponding Korean Application No. 10-2015-0007478.

* cited by examiner

DISPLAY DEVICE

CROSS-REFERENCE TO RELATED APPLICATION

The present application claims priority from Japanese Patent Applications No. 2014-007229 filed on Jan. 17, 2014 and No. 2014-155705 filed on Jul. 31, 2014, the contents of which are hereby incorporated by reference into this application.

TECHNICAL FIELD OF THE INVENTION

The present invention relates to a display device and an electronic device, and particularly relates to a display device and an electronic device having an electrostatic capacitive input device.

BACKGROUND OF THE INVENTION

In recent years, a technique of attaching an input device referred to as a touch panel or a touch sensor to a display surface side of a display device and detecting and outputting an input position when input operations are performed by contacting the touch panel with a finger or an input tool such as a touch pen has been known. Since such display devices including a touch panel do not require input devices such as a keyboard, a mouse and a keypad, they are widely used in portable information terminals such as mobile phones in addition to computers.

One detecting method for detecting contact positions at which a finger or the like has contacted the touch panel is the electrostatic capacitance method. In an electrostatic capacitive touch panel, a plurality of capacitive elements each made up of a pair of electrodes disposed to be opposed to each other with a dielectric layer interposed therebetween, that is, a driving electrode and a detecting electrode are provided in a plane of the touch panel. Then, the input positions are detected by utilizing the characteristics that the electrostatic capacitance of capacitive elements changes when performing input operations by contacting the capacitive elements with a finger or an input tool such as a touch pen.

For example, Japanese Patent Application Laid-Open Publication No. 2010-197576 (Patent Document 1) describes a touch panel in which measures for making transparent electrode patterns invisible are taken. Further, Japanese Patent Application Laid-Open Publication No. 2011-059771 (Patent Document 2) describes a mesh-like conductive pattern including mesh patterns which are at least partially separated and have superior invisibility even at discontinuous portions, and a base material and a touch panel member having conductor layer patterns including the mesh-like conductive pattern.

SUMMARY OF THE INVENTION

In the display device to which an input device such as a touch panel is attached, it is desirable to reduce electric resistance of the detecting electrodes for improving the detection performance. Conductive oxides with translucency with respect to visible light such as ITO (Indium Tin Oxide) are used in some cases as a material of the detecting electrodes in order to secure transmittance with respect to visible light in a display region. However, the electric resistivity of conductive oxides such as ITO is larger than the electric resistivity of conductive materials such as metal or alloy. Accordingly, for reducing the electric resistance of the detecting electrodes, it is desirable to use conductive materials such as metal or alloy.

However, conductive materials such as metal or alloy have light-shielding properties with respect to visible light. Namely, the transmittance of conductive materials such as metal or alloy with respect to visible light is smaller than the transmittance of conductive oxides with translucency such as ITO or the like with respect to visible light. Therefore, when detecting electrodes made of conductive materials such as metal or alloy are used as detecting electrodes of an input device such as an input panel, there is the fear that the transmittance with respect to visible light is degraded in the display region.

The present invention has been made for solving the above-described problems of the prior art, and an object thereof is to provide a display device provided with an input device, which is capable of improving the transmittance with respect to visible light in a display region and improving the detection performance of the input device.

The following is a brief description of an outline of the typical invention disclosed in the present application.

A display device as one aspect of the present invention includes: a substrate; a plurality of pixels arranged in a first region on a first main surface side of the substrate; and a plurality of first electrodes each of which is provided in each of the plurality of pixels. Also, the display device includes: a second electrode provided so as to overlap the plurality of first electrodes when seen in a plan view; a plurality of third electrodes provided at intervals so as to respectively overlap the second electrode when seen in a plan view; and a fourth electrode provided apart from any of the plurality of third electrodes in the first region. Images are displayed by applying voltage between each of the plurality of first electrodes and the second electrode, and input positions are detected based on electrostatic capacitance between the second electrode and each of the plurality of third electrodes. Each of the plurality of third electrodes includes a first metal layer or a first alloy layer, and the fourth electrode includes a second metal layer or a second alloy layer. Further, a ratio of total sum of areas of portions of the plurality of pixels which overlap any of the plurality of third electrodes and the fourth electrode when seen in a plan view to a total sum of areas of the plurality of pixels is 1 to 22%.

Also, according to another aspect, the plurality of pixels are arranged in a matrix form in a first direction and a second direction which intersects the first direction in the first region, each of the plurality of third electrodes has a first conductive line including the first metal layer or the first alloy layer, and the first conductive line extends in a third direction as a whole while alternately bending in opposite directions when seen in a plan view. At this time, the ratio of total sum of areas of portions of the plurality of pixels which overlap any of the plurality of third electrodes and the fourth electrode when seen in a plan view to total sum of areas of the plurality of pixels is 1 to 11%.

Also, according to another aspect, the plurality of pixels are arranged in a matrix form in a first direction and a second direction which intersects the first direction in the first region, and each of the plurality of third electrodes includes a plurality of first conductive lines. Each of the plurality of first conductive lines includes the first metal layer or the first alloy layer and extends in a third direction as a whole while alternately bending in opposite directions when seen in a plan view, and portions of adjacent first conductive lines which are bent in mutually opposite directions are coupled with each other. At this time, the ratio of total sum of areas of portions of the plurality of pixels which overlap any of the plurality of third electrodes and the fourth electrode when seen in a plan view to total sum of areas of the plurality of pixels is 2 to 22%.

Also, according to another aspect, the plurality of pixels are arranged in a matrix form in a first direction and a second direction which intersects the first direction in the first region. Also, each of the plurality of third electrodes includes: a plurality of first conductive lines which extend in a third direction and are arranged in a fourth direction which intersects the third direction; and a plurality of second conductive lines which respectively extend in a fifth direction which intersects both of the third direction and the fourth direction and are arranged in the fourth direction. Further, each of the plurality of first conductive lines includes the first metal layer or the first alloy layer, each of the plurality of second conductive lines includes a third metal layer or a third alloy layer, the plurality of first conductive lines and the plurality of second conductive lines intersect each other, and each of the plurality of third electrodes has a mesh-like shape formed by the plurality of first conductive lines and the plurality of second conductive lines which intersect each other. At this time, the ratio of total sum of areas of portions of the plurality of pixels which overlap any of the plurality of third electrodes and the fourth electrode when seen in a plan view to total sum of areas of the plurality of pixels is 2 to 22%.

Alternatively, a display device as one aspect of the present invention includes: a substrate; a plurality of pixels arranged in a matrix form in a first direction and a second direction which intersects the first direction in a first region on a first main surface side of the substrate; and a plurality of first electrodes each of which is provided in each of the plurality of pixels. Also, the display device includes: a second electrode provided so as to overlap the plurality of first electrodes when seen in a plan view; and a plurality of third electrodes provided at intervals so as to respectively overlap the second electrode when seen in a plan view. Images are displayed by applying voltage between each of the plurality of first electrodes and the second electrode, and input positions are detected based on electrostatic capacitance between the second electrode and each of the plurality of third electrodes. Each of the plurality of third electrodes has a first conductive line including a first metal layer or a first alloy layer, and the first conductive line has a portion extending in a third direction which intersects both of the first direction and the second direction when seen in a plan view. Also, a width of the first conductive line is 2 to 7 µm.

Also, according to another aspect, the first conductive line extends in a fourth direction as a whole while alternately bending in opposite directions when seen in a plan view. At this time, a width of the first conductive line is 2.5 to 4.5 µm.

Also, according to another aspect, each of the plurality of third electrodes includes a plurality of the first conductive lines, each of the plurality of first conductive lines extends in a fourth direction as a whole while alternately bending in opposite directions when seen in a plan view, and portions of adjacent first conductive lines which are bent in mutually opposite directions are coupled with each other. At this time, a width of each of the plurality of first conductive lines is 2.5 to 4.5 µm.

Also, according to another aspect, each of the plurality of third electrodes includes: a plurality of the first conductive lines which extend in the third direction and are arranged in a fourth direction which intersects the third direction; and a plurality of second conductive lines which extend in a fifth direction which intersects both of the third direction and the fourth direction and are arranged in the fourth direction. Also, each of the plurality of second conductive lines includes a second metal layer or a second alloy layer, the plurality of first conductive lines and the plurality of second conductive lines intersect each other, and each of the plurality of third electrodes has a mesh-like shape formed by the plurality of first conductive lines and the plurality of second conductive lines which intersect each other. At this time, a width of each of the plurality of first conductive lines and the plurality of second conductive lines is 2.5 to 4.5 µm.

Alternatively, a display device as one aspect of the present invention includes: a substrate; a plurality of pixels arranged in a first region on a first main surface side of the substrate; and a plurality of first electrodes each of which is provided in each of the plurality of pixels. Also, the display device includes: a second electrode provided so as to overlap the plurality of first electrodes when seen in a plan view; and a plurality of third electrodes provided so as to respectively overlap the second electrode when seen in a plan view. Images are displayed by applying voltage between each of the plurality of first electrodes and the second electrode, and input positions are detected based on electrostatic capacitance between the second electrode and each of the plurality of third electrodes. Each of the plurality of third electrodes includes a first metal layer or a first alloy layer. Also, a ratio of total sum of areas of portions of the plurality of pixels which overlap any of the plurality of third electrodes when seen in a plan view to total sum of areas of the plurality of pixels is 1 to 22%.

Also, according to another aspect, each of the plurality of third electrodes has light-shielding properties with respect to visible light. Alternatively, the first electrodes are pixel electrodes, the second electrode is a common electrode, the third electrodes are detecting electrodes to which detecting signals for detecting the input positions are output, and driving signals for measuring the electrostatic capacitance between the common electrode and the detecting electrodes are input to the common electrode. Alternatively, according to another aspect, an arrangement interval of the plurality of pixels in the first direction is smaller than an arrangement interval of the plurality of pixels in the second direction, and the arrangement interval of the plurality of pixels in the first direction is 45 to 180 µm. Also, according to another aspect, an arrangement interval of the plurality of pixels in the first direction is smaller than an arrangement interval of the plurality of pixels in the second direction, the arrangement interval of the plurality of pixels in the first direction is 45 to 180 µm, and an interval of adjacent first conductive lines is 50 to 200 µm.

Also, according to another aspect, a low reflection layer having a lower reflectance with respect to visible light than a reflectance of the third electrodes with respect to visible light is formed on a surface of the third electrodes or on the third electrodes.

Alternatively, a display device as one aspect of the present invention includes: a substrate; a plurality of pixels arranged in a first region on a first main surface side of the substrate; and a plurality of first electrodes each of which is provided in each of the plurality of pixels. Also, the display device includes: a second electrode provided so as to overlap the plurality of first electrodes when seen in a plan view; a plurality of third electrodes provided at intervals so as to respectively overlap the second electrode when seen in a plan view; and a fourth electrode provided apart from any of the plurality of third electrodes in the first region. Images are displayed by applying voltage between each of the plurality of first electrodes and the second electrode, and input positions are detected based on electrostatic capacitance of each of the plurality of third electrodes. Each of the plurality of third electrodes includes a first metal layer or a first alloy layer, and the fourth electrode includes a second metal layer or a second alloy layer. Also, a ratio of total sum of areas of portions of the plurality of pixels which overlap any of the plurality of third electrodes and the fourth electrode when seen in a plan view to total sum of areas of the plurality of pixels is 1 to 22%.

Alternatively, a display device as one aspect of the present invention includes: a substrate; a plurality of pixels arranged in a matrix form in a first direction and a second direction which intersects the first direction in a first region on a first main surface side of the substrate; and a plurality of first electrodes each of which is provided in each of the plurality of pixels. Also, the display device includes: a second electrode provided so as to overlap the plurality of first electrodes when seen in a plan view; and a plurality of third electrodes provided at intervals so as to respectively overlap the second electrode when seen in a plan view. Images are displayed by applying voltage between each of the plurality of first electrodes and the second electrode, and input positions are detected based on electrostatic capacitance of each of the plurality of third electrodes. Each of the plurality of third electrodes has a first conductive line including a first metal layer or a first alloy layer, and the first conductive line has a portion extending in a third direction which intersects both of the first direction and the second direction when seen in a plan view. Also, a width of the first conductive line is 2 to 7 μm.

Alternatively, a display device as one aspect of the present invention includes: a substrate; a plurality of pixels arranged in a first region on a first main surface side of the substrate; and a plurality of first electrodes each of which is provided in each of the plurality of pixels. Also, the display device includes: a second electrode provided so as to overlap the plurality of first electrodes when seen in a plan view; and a plurality of third electrodes provided so as to respectively overlap the second electrode when seen in a plan view. Images are displayed by applying voltage between each of the plurality of first electrodes and the second electrode, and input positions are detected based on electrostatic capacitance of each of the plurality of third electrodes. Each of the plurality of third electrodes includes a first metal layer or a first alloy layer. Also, a ratio of total sum of areas of portions of the plurality of pixels which overlap any of the plurality of third electrodes when seen in a plan view to total sum of areas of the plurality of pixels is 1 to 22%.

BRIEF DESCRIPTIONS OF THE DRAWINGS

DESCRIPTIONS OF THE PREFERRED EMBODIMENTS

Figure 1:
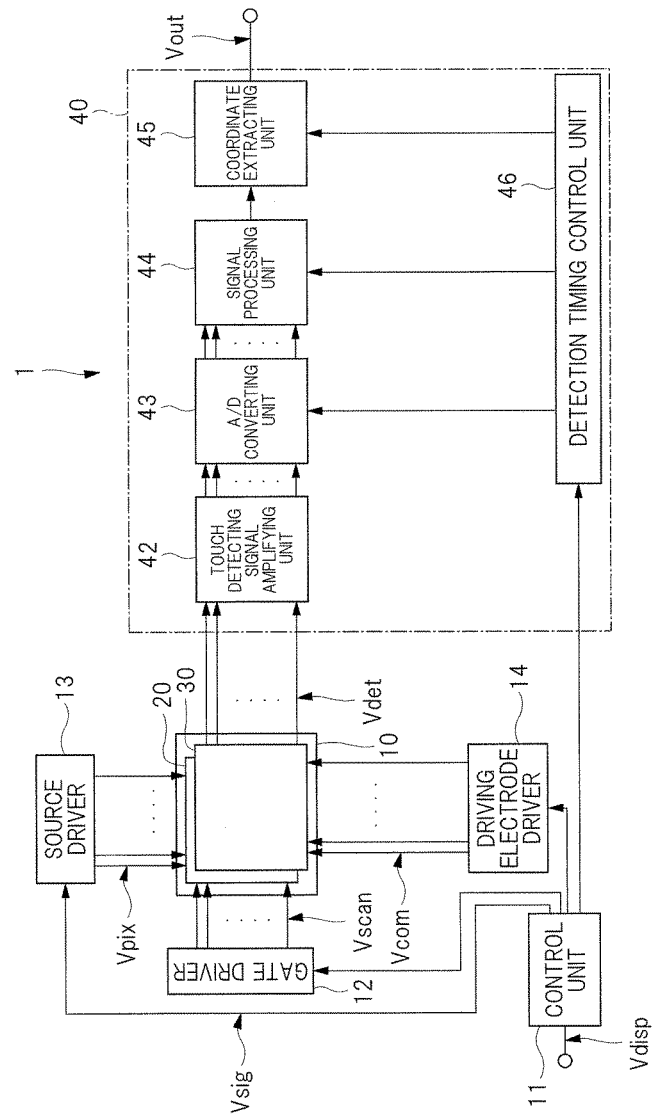
FIG. 1 is a block diagram showing one configuration example of a display device according to the first embodiment.

Hereinafter, embodiments of the present invention will be described with reference to drawings.

Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

Also, in some drawings used in the following embodiments, hatching is sometimes omitted even in a sectional view so as to make the drawings easy to see. Further, hatching is sometimes used even in a plan view so as to make the drawings easy to see.

Further, in the following embodiments, when a range is defined as A to B, the range indicates "A or more and B or less" unless specified otherwise.

First Embodiment

First, an example in which a display device provided with a touch panel as an input device is applied to an in-cell liquid crystal display device with a touch detection function will be described as the first embodiment. Note that an in-cell liquid crystal display device with a touch detection function indicates a liquid crystal display device with a touch detection function in which at least one of the driving electrodes and the detecting electrodes included in the touch panel are incorporated in the liquid crystal display device as the driving electrodes for driving liquid crystal of the liquid crystal display device.

<Overall Configuration>

First, the overall configuration of the display device according to the present first embodiment will be described with reference to FIG. 1. FIG. 1 is a block diagram showing one configuration example of a display device according to the first embodiment.

A display device 1 includes a display device 10 with a touch detection function, a control unit 11, a gate driver 12, a source driver 13, a driving electrode driver 14, and a touch detection unit 40.

The display device 10 with a touch detection function includes a liquid crystal display device 20 and a touch detection device 30. The liquid crystal display device 20 is a display device using liquid crystal display elements as display elements. The touch detection device 30 is a touch detection device of electrostatic capacitance method, that is, an electrostatic capacitive touch detection device. Therefore, the display device 1 is a display device including an input device with a touch detection function. Further, the display device 10 with a touch detection function is a display device in which the liquid crystal display device 20 and the touch detection device 30 are integrated, and is a display device incorporating a touch detection function, namely, an in-cell display device with a touch detection function.

Further, as will be described in the third embodiment later, the display device 10 with a touch detection function may be a display device in which the touch detection device 30 is attached on the liquid crystal display device 20. Further, it is also possible to use an organic EL (Electroluminescence) display device instead of the liquid crystal display device 20.

As will be described later, the liquid crystal display device 20 performs display by sequentially scanning each horizontal line in the display region in accordance with scanning signals Vscan supplied from the gate driver 12. The touch detection device 30 operates in accordance with a principle of electrostatic capacitive touch detection and outputs detecting signals Vdet as will be described later.

The control unit 11 is a circuit which respectively supplies control signals to the gate driver 12, the source driver 13, the driving electrode driver 14 and the touch detection unit 40 based on video signals Vdisp supplied from outside for controlling them so that they are operated in synchronization with each other.

The gate driver 12 has a function of sequentially selecting one horizontal line, which is an object of display driving of the display device 10 with a touch detection function, based on control signals supplied from the control unit 11.

The source driver 13 is a circuit which supplies pixel signals Vpix to sub-pixels SPix included in the display device 10 with a touch detection function (see FIG. 10 to be described later) based on control signals of image signals Vsig supplied from the control unit 11.

The driving electrode driver 14 is a circuit which supplies driving signals Vcom to driving electrodes COML included in the display device 10 with a touch detection function (see FIG. 7 or FIG. 8 to be described later) based on control signals supplied from the control unit 11.

The touch detection unit 40 is a circuit which detects presence/absence of touches of a finger or an input tool such as a touch pen to the touch detection device 30, namely, a state of contact or approach to be described later based on control signals supplied from the control unit 11 and detecting signals Vdet supplied from the touch detection device 30 of the display device 10 with a touch detection function. Also, the touch detection unit 40 is a circuit which obtains coordinates of touches, namely input positions in the touch detection region in the case where the touches are present. The touch detection unit 40 includes a touch detecting signal amplifying unit 42, an A/D (Analog/Digital) converting unit 43, a signal processing unit 44, a coordinate extracting unit 45 and a detection timing control unit 46.

The touch detecting signal amplifying unit 42 amplifies detecting signals Vdet supplied from the touch detection device 30. The touch detecting signal amplifying unit 42 may be provided with a low pass analog filter which removes high frequency components, namely, noise components included in the detecting signals Vdet and extracts and respectively outputs touch components.

<Principle of Electrostatic Capacitive Touch Detection>

Figure 2:
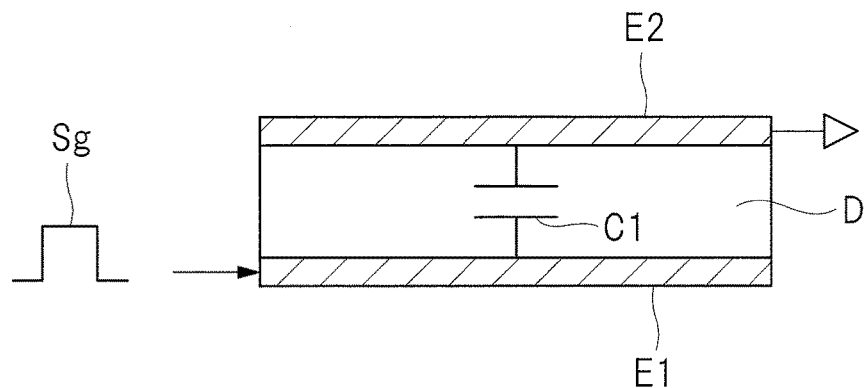
FIG. 2 is an explanatory diagram showing a state in which no finger contacts or approaches a touch detection device.
Figure 3:
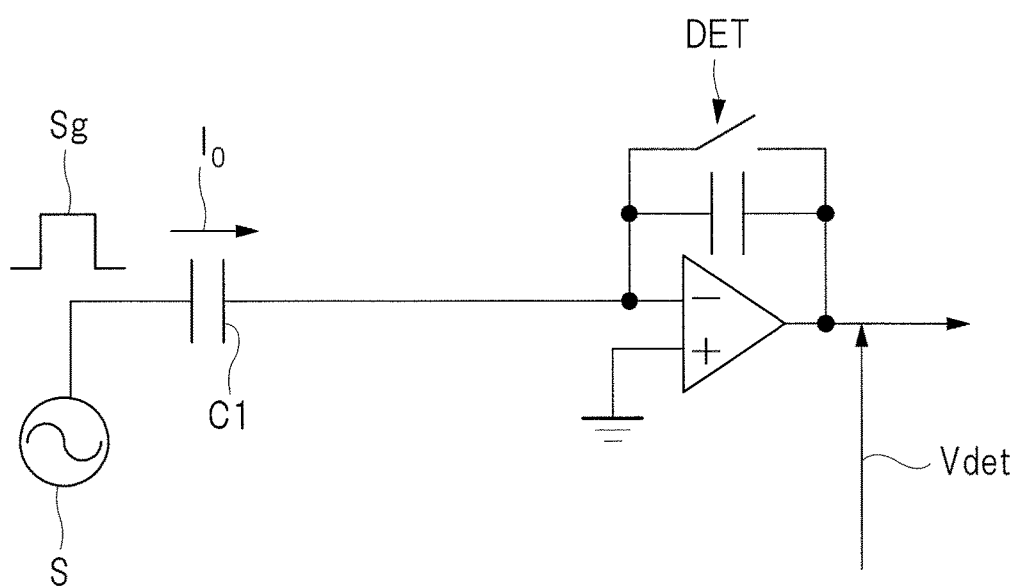
FIG. 3 is an explanatory diagram showing an example of an equivalent circuit in a state in which no finger contacts or approaches a touch detection device.
Figure 4:
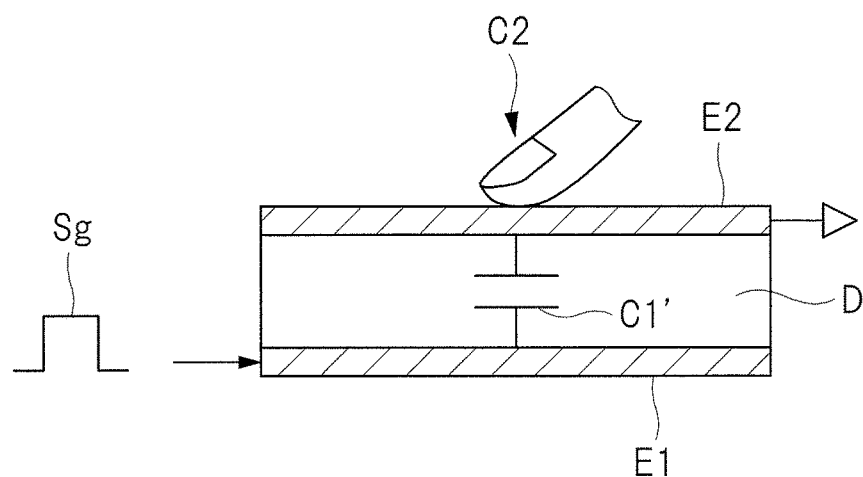
FIG. 4 is an explanatory diagram showing a state in which a finger has contacted or approached the touch detection device.
Figure 5:
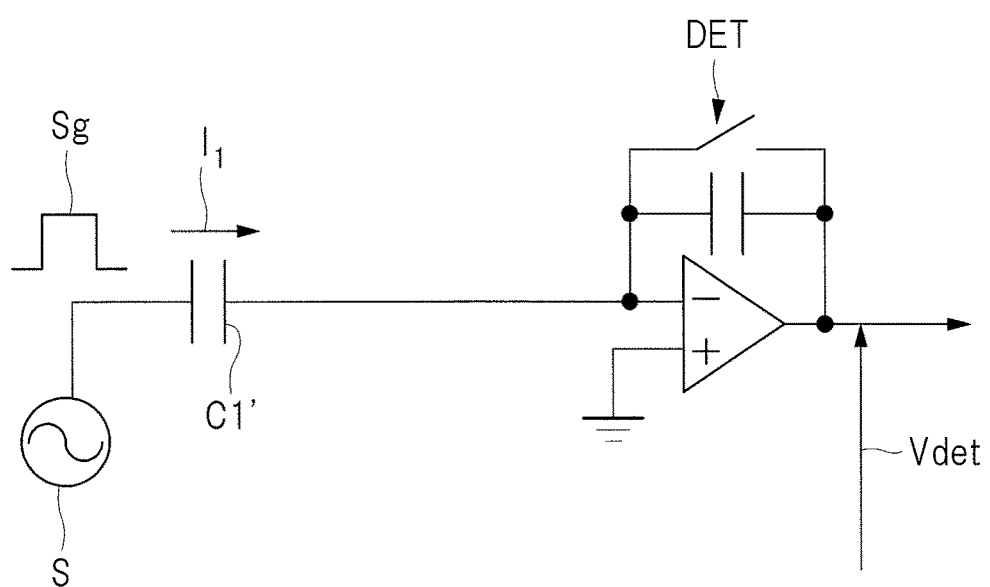
FIG. 5 is an explanatory diagram showing an example of an equivalent circuit in a state in which a finger has contacted or approached the touch detection device.
Figure 6:
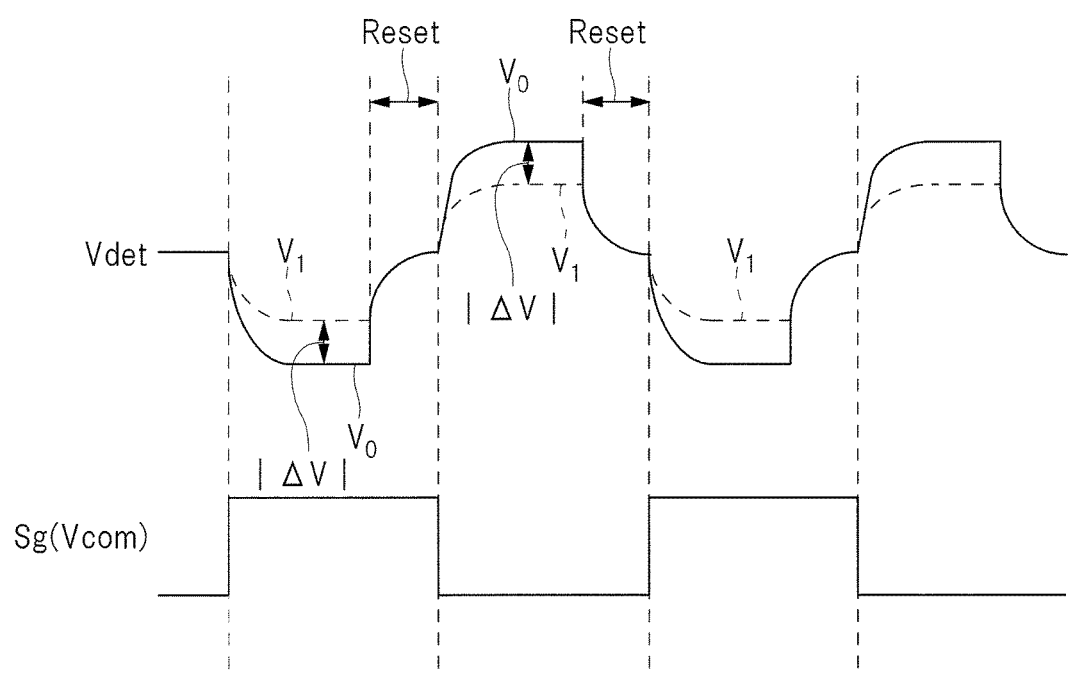
FIG. 6 is a diagram showing one example of waveforms of a driving signal and a detecting signal.

Next, the principle of touch detection in the display device 1 according to the present first embodiment will be described with reference to FIG. 1 to FIG. 6. FIG. 2 is an explanatory diagram showing a state in which no finger contacts or approaches a touch detection device. FIG. 3 is an explanatory diagram showing an example of an equivalent circuit in a state in which no finger contacts or approaches the touch detection device. FIG. 4 is an explanatory diagram showing a state in which a finger has contacted or approached the touch detection device. FIG. 5 is an explanatory diagram showing an example of an equivalent circuit in a state in which a finger has contacted or approached the touch detection device. FIG. 6 is a diagram showing one example of waveforms of a driving signal and a detecting signal.

As shown in FIG. 2, in the electrostatic capacitive touch detection, an input device referred to as a touch panel or a touch sensor includes a driving electrode E1 and a detecting electrode E2 which are disposed to be opposed to each other with a dielectric body D interposed therebetween. A capacitive element C1 is formed by the driving electrode E1 and the detecting electrode E2. As shown in FIG. 3, one end of the capacitive element C1 is connected with an AC signal source S which is a driving signal source, and the other end of the capacitive elements C1 is connected with a voltage detector DET which is the touch detection unit. The voltage detector DET is, for example, an integrating circuit included in the touch detecting signal amplifying unit 42 shown in FIG. 1.

When an AC rectangular wave Sg having a frequency in the range of, for example, several kHz to several hundreds kHz is applied from the AC signal source S to the one end of the capacitive element C1, namely, the driving electrode E1, a detecting signal Vdet which is an output waveform is generated via the voltage detector DET connected to the other end of the capacitive element C1, namely, the detecting electrodes E2 side. Note that the AC rectangular wave Sg corresponds to, for example, the driving signal Vcom shown in FIG. 6.

In the state in which no finger contacts or approaches, namely, in the non-contact state shown in FIG. 2, current $I_0$ corresponding to the capacitance value of the capacitive element C1 flows in accordance with charge and discharge of the capacitive element C1 as shown in FIG. 3. The voltage detector DET converts the fluctuation in the current $I_0$ in accordance with the AC rectangular wave Sg into the fluctuation in voltage. The voltage fluctuation is represented as the waveform $V_0$ indicated by a solid line in FIG. 6.

On the other hand, in a state in which a finger contacts or approaches, namely, in the contact state shown in FIG. 4, the capacitive element formed of the driving electrode E1 and the detecting electrode E2 is affected by the electrostatic capacitance C2 formed by the finger and acts as a capacitive element C1' having a capacitance value smaller than the capacitance value of the capacitive element C1. When viewed in the equivalent circuit shown in FIG. 5, current $I_1$ flows through the capacitive element C1'. The voltage detector DET converts the fluctuation in the current $I_1$ in accordance with the AC rectangular wave Sg into the fluctuation in voltage. This voltage fluctuation is represented as the waveform $V_1$ indicated by a broken line in FIG. 6. In this case, the amplitude of the waveform $V_1$ is smaller than that of the above-described waveform $V_0$. Accordingly, the absolute value $|\Delta V|$ of the voltage difference between the waveform $V_0$ and waveform $V_1$ varies in accordance with influences of an object such as a finger which approaches from outside. Note that, in order to accurately detect the absolute value $|\Delta V|$ of the voltage difference between the waveform $V_0$ and the waveform $V_1$, it is preferable that a period Reset during which charge and discharge of the capacitor are reset in accordance with a frequency of the AC rectangular wave Sg by the switching in the circuit is provided in the operation of the voltage detector DET.

In the example shown in FIG. 1, the touch detection device 30 performs touch detection for each detection block corresponding to one or a plurality of driving electrodes COML in accordance with the driving signal Vcom supplied from the driving electrode driver 14. More specifically, the touch detection device 30 outputs the detecting signal Vdet via the voltage detector DET shown in FIG. 3 or FIG. 5 for each detection block corresponding to each of the one or a plurality of driving electrodes COML, and supplies the output detecting signal Vdet to the A/D converting unit 43 of the touch detection unit 40.

The A/D converting unit 43 is a circuit which samples each analog signal output from the touch detecting signal amplifying unit 42 at a timing in synchronization with the driving signal Vcom, thereby converting it into a digital signal.

The signal processing unit 44 is provided with a digital filter which reduces frequency components other than the frequency at which the driving signal Vcom is sampled, namely, noise components included in the output signal of the A/D converting unit 43. The signal processing unit 44 is a logic circuit which detects presence/absence of touches to the touch detection device 30 based on the output signal of the A/D converting unit 43. The signal processing unit 44 performs the process of extracting only differential voltage caused by the finger. The differential voltage caused by the finger is the absolute value |ΔV| of the difference between the waveform $V_0$ and waveform $V_1$ mentioned above. It is also possible that the signal processing unit 44 performs calculations of averaging absolute values |ΔV| per each detection block to obtain the average value of the absolute values |ΔV|. By this means, the signal processing unit 44 can reduce the influences of noise. The signal processing unit 44 compares the detected differential voltage caused by the finger with a predetermined threshold voltage, and when the voltage is equal to or higher than the threshold voltage, it is determined to be the contact state of an externally approaching object which approaches from outside, and when the voltage is lower than the threshold voltage, it is determined to be the non-contact state of an externally approaching object. In this manner, touch detection is performed by the touch detection unit 40.

The coordinate extracting unit 45 is a logic circuit which obtains the coordinates of the position at which the touch has been detected by the signal processing unit 44, namely, the input position on the touch panel. The detection timing control unit 46 controls the A/D converting unit 43, the signal processing unit 44 and the coordinate extracting unit 45 so that they are operated in synchronization with each other. The coordinate extracting unit 45 outputs the touch panel coordinates as a signal output Vout.

<Module>

Figure 7:
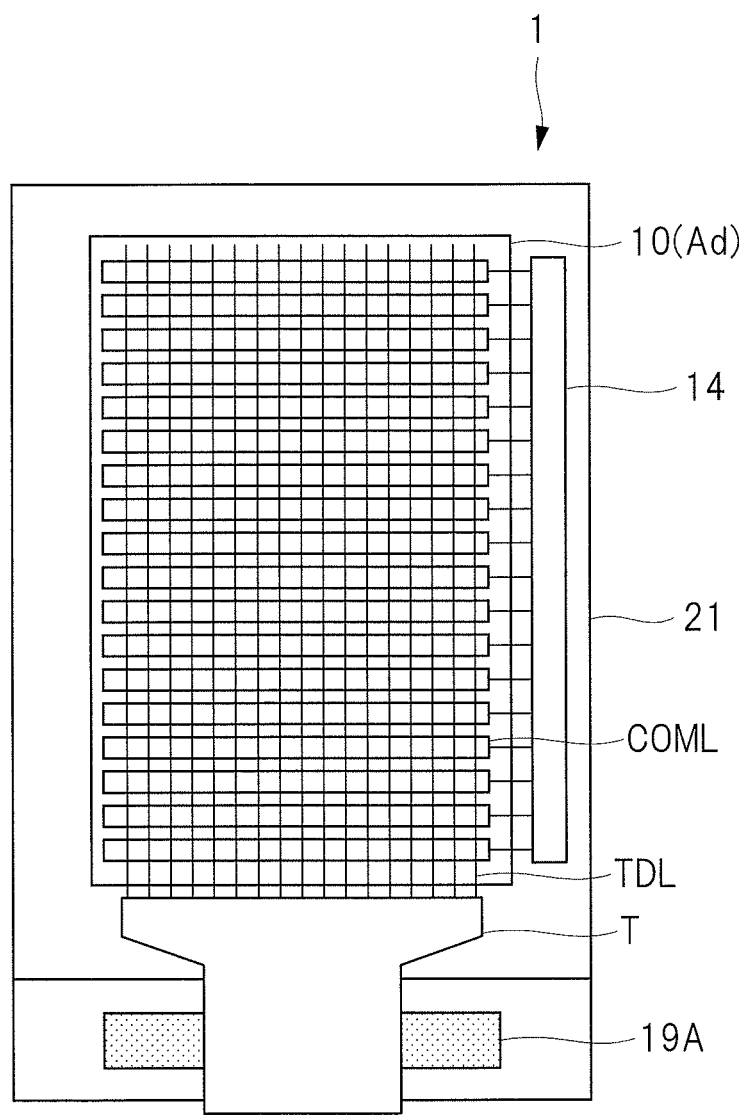
FIG. 7 is a plan view showing one example of a module having the display device according to the first embodiment mounted therein.
Figure 8:
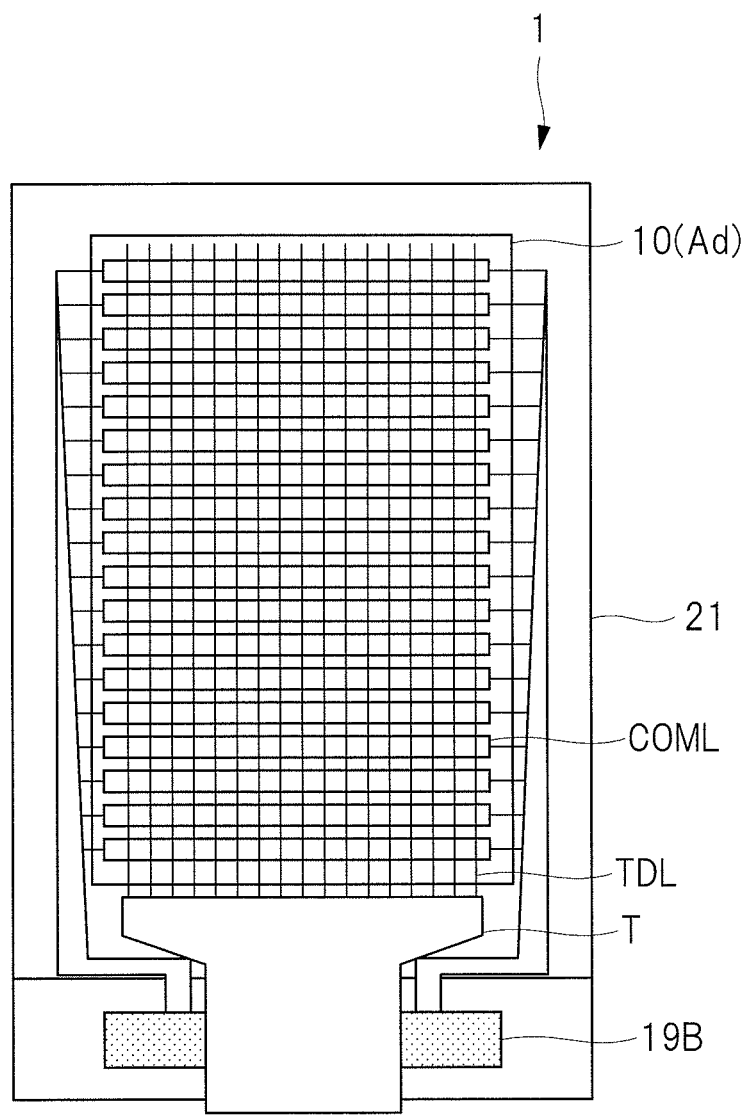
FIG. 8 is a plan view showing one example of a module having the display device according to the first embodiment mounted therein.

FIG. 7 and FIG. 8 are plan views showing one example of a module having the display device according to the first embodiment mounted therein. In the example shown in FIG. 7, the above-described driving electrode driver 14 is formed on a TFT substrate 21.

As shown in FIG. 7, the display device 1 includes the display device 10 with a touch detection function, the driving electrode driver 14, a COG (chip on glass) 19A and the TFT substrate 21.

The display device 10 with a touch detection function includes a plurality of driving electrodes COML and a plurality of detecting electrodes TDL. Here, two directions which mutually intersect, preferably orthogonally, with each other within a front surface serving as a main surface of the TFT substrate 21 are defined to be an X axis direction and a Y axis direction. At this time, the plurality of driving electrodes COML respectively extend in the X axis direction and are arranged in the Y axis direction. Further, the plurality of detecting electrodes TDL respectively intersect the plurality of driving electrodes COML and are arranged in the X axis direction when seen in a plan view. More specifically, each of the plurality of detecting electrodes TDL intersects the plurality of driving electrodes COML when seen in a plan view. Note that the region in which the display device 10 with a touch detection function is formed is the same region as the display region Ad in which images are displayed.

As will be described later with reference to FIG. 15, each of the plurality of driving electrodes COML is provided so as to overlap the plurality of sub-pixels SPix arranged in the X axis direction when seen in a plan view. More specifically, one driving electrode COML is provided as a common electrode for the plurality of sub-pixels SPix. Accordingly, the driving electrode COML is also referred to as a common electrode.

Note that the expression "when seen in a plan view" in the present specification indicates the case in which components are seen from a direction perpendicular to the front surface serving as the main surface of the TFT substrate 21.

In the example shown in FIG. 7, the display device 10 with a touch detection function has a rectangular shape with two sides which respectively extend in the X axis direction and are opposed to each other and two sides which respectively extend in the Y axis direction and are opposed to each other when seen in a plan view. A terminal unit T formed of a flexible substrate or the like is provided on one side of the display device 10 with a touch detection function in the Y axis direction. The detecting electrode TDL is connected with the touch detection unit 40 mounted to the outside of the module via the terminal unit T. The driving electrode driver 14 is formed on the TFT substrate 21 made of, for example, a glass substrate. The COG 19A is a chip mounted on the TFT substrate 21 and incorporates respective circuits necessary for display operations such as the control unit 11, the gate driver 12 and the source driver 13 shown in FIG. 1.

On the other hand, the display device 1 may incorporate the driving electrode driver 14 in the COG. An example in which the driving electrode driver 14 is incorporated in the COG is shown in FIG. 8. In the example shown in FIG. 8, the display device 1 includes a COG 19B in its module. In the COG 19B shown in FIG. 8, the driving electrode driver 14 is incorporated in addition to the above-described respective circuits necessary for the display operations.

<Display Device with Touch Detection Function>

Figure 9:
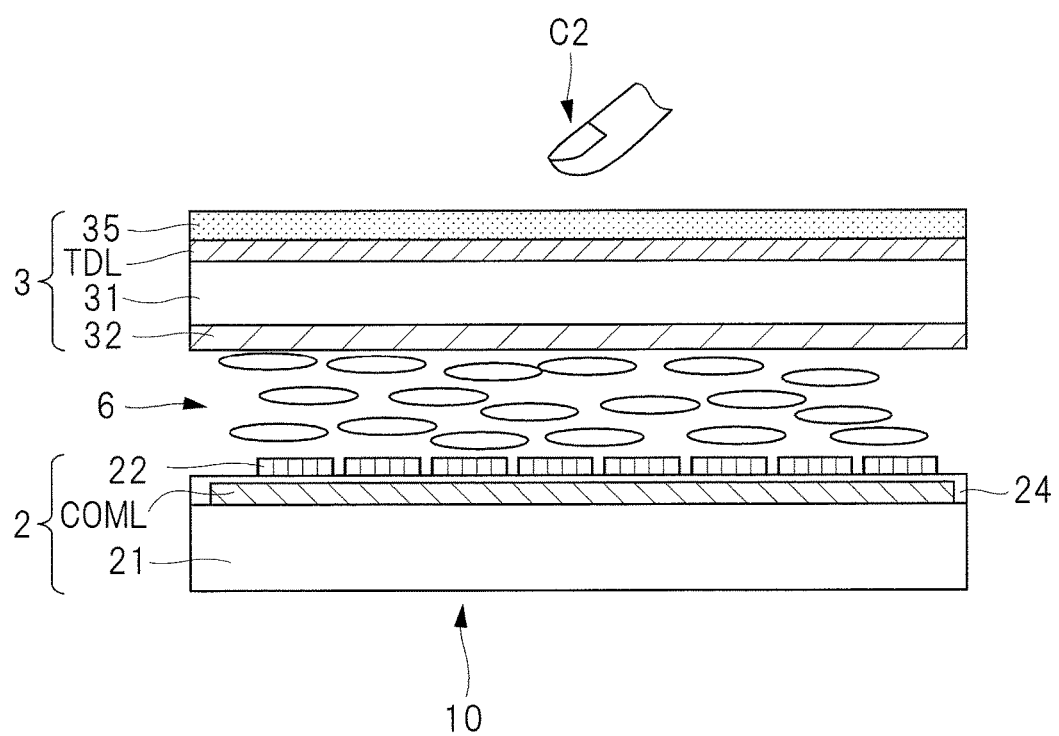
FIG. 9 is a sectional view showing a display device with a touch detection function in the display device according to the first embodiment.
Figure 10:
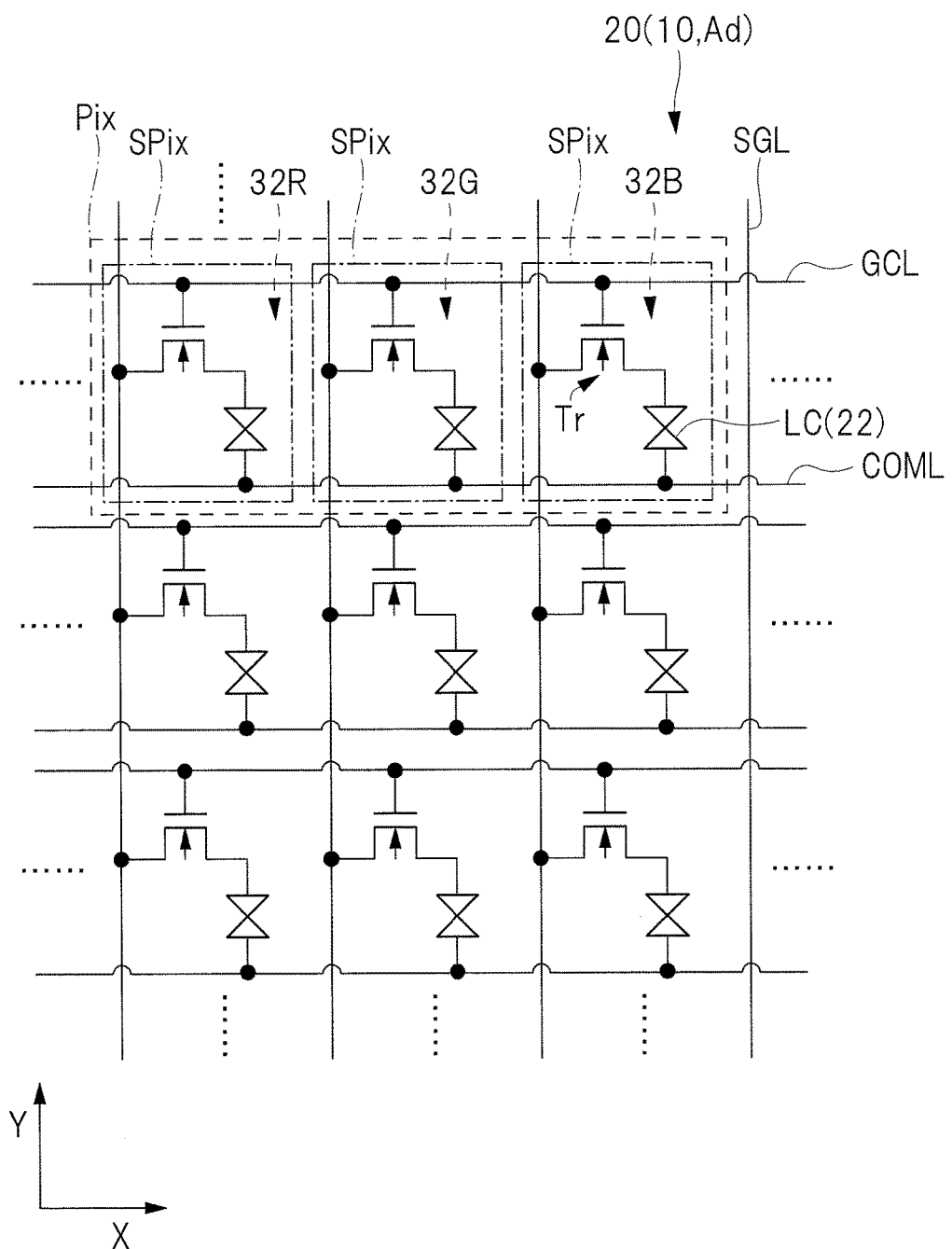
FIG. 10 is a circuit diagram showing a display device with a touch detection function in the display device according to the first embodiment.

Next, a configuration example of the display device 10 with a touch detection function will be described in details. FIG. 9 is a sectional view showing the display device with a touch detection function in the display device according to the first embodiment. FIG. 10 is a circuit diagram showing the display device with a touch detection function in the display device according to the first embodiment. Note that the illustration of parts formed between the TFT substrate 21 and the driving electrode COML such as TFT elements Tr (see FIG. 10), an interlayer resin film 23 and a passivation film 23a (see FIG. 16 to be described later) is omitted.

The display device 10 with a touch detection function includes a pixel substrate 2, an opposing substrate 3 and a liquid crystal layer 6. The opposing substrate 3 is disposed so that a front surface serving as a main surface of the pixel substrate 2 and a rear surface serving as a main surface of the opposing substrate 3 oppose each other. The liquid crystal layer 6 is provided between the pixel substrate 2 and the opposing substrate 3.

The pixel substrate 2 includes the TFT substrate 21. As shown in FIG. 10, in the display region Ad, a plurality of scanning lines GCL, a plurality of signal lines SGL and a plurality of TFT elements Tr which are thin film transistors (TFT) are formed on the TFT substrate 21 (see FIG. 9). Note that, in FIG. 9, the illustration of the scanning lines GCL, the signal lines SGL and the TFT elements Tr is omitted.

As shown in FIG. 10, the plurality of scanning lines GCL respectively extend in the X axis direction and are arranged in the Y axis direction in the display region Ad. The plurality of signal lines SGL respectively extend in the Y axis direction and are arranged in the X axis direction in the display region Ad. Accordingly, each of the plurality of signal lines SGL intersects the plurality of scanning lines when seen in a plan view. In this manner, sub-pixels SPix are demarcated by the plurality of scanning lines GCL and the plurality of signal lines SGL which intersect each other when seen in a plan view, and a single pixel Pix is formed by a plurality of sub-pixels SPix having different colors.

More specifically, on the TFT substrate 21, the sub-pixels SPix are arranged in a matrix form in the X axis direction and the Y axis direction in the display region Ad. In other words, the sub-pixels SPix are arranged in a matrix form in the X axis direction and the Y axis direction in the display region Ad on a front surface side of the TFT substrate 21.

The TFT element Tr is formed at an intersecting portion at which each of the plurality of scanning lines GCL and each of the plurality of signal lines SGL intersect each other when seen in a plan view. Accordingly, in the display region Ad, the plurality of TFT elements Tr are formed on the TFT substrate 21, and the plurality of TFT elements Tr are arranged in a matrix form in the X axis direction and the Y axis direction. More specifically, each of the plurality of sub-pixels SPix is provided with the TFT element Tr. Also, each of the plurality of sub-pixels SPix is provided with a liquid crystal element LC in addition to the TFT element Tr.

The TFT element Tr is made up of, for example, a thin film transistor such as a n-channel MOS (metal oxide semiconductor). The gate electrode of the TFT element Tr is connected with the scanning lines GCL. One of the source electrode and the drain electrode of the TFT element Tr is connected with the signal line SGL. The other one of the source electrode and the drain electrode of the TFT element Tr is connected with one end of the liquid crystal element LC. One end of the liquid crystal element LC is connected with the drain electrode of the TFT element Tr, and the other end thereof is connected with the driving electrode COML.

As shown in FIG. 9, the pixel substrate 2 includes the plurality of driving elements COML, an insulating layer 24, and a plurality of pixel electrodes 22. The plurality of driving electrodes COML are provided on the TFT substrate 21 in the display region Ad (see FIG. 7 or FIG. 8) on the front surface side of the TFT substrate 21. The insulating film 24 is formed on the TFT substrate 21 with the inclusion of the front surfaces of each of the plurality of driving electrodes COML. In the display region Ad, a plurality of pixel electrodes 22 are formed on the insulating film 24. Accordingly, the insulating film 24 electrically insulates the driving electrodes COML and the pixel electrodes 22.

As shown in FIG. 10, each of the plurality of pixel electrodes 22 is formed within each of the plurality of sub-pixels SPix arranged in a matrix form in the X axis direction and the Y axis direction in the display region Ad on the front surface side of the TFT substrate 21. Accordingly, the plurality of pixel electrodes 22 are arranged in a matrix form in the X axis direction and the Y axis direction.

In the example shown in FIG. 9, each of the plurality of driving electrodes COML is formed between the TFT substrate 21 and the pixel electrodes 22. Each of the plurality of driving electrodes COML is provided so as to overlap the plurality of pixel electrodes 22 when seen in a plan view. Then, by applying voltage between each of the plurality of pixel electrodes 22 and each of the plurality of driving electrodes COML so that voltage is applied to the liquid crystal element LC provided in each of the plurality of sub-pixels SPix, an image is displayed in the display region Ad.

Note that each of the plurality of driving electrodes COML may be formed on the opposite side of the TFT substrate 21 with the pixel electrodes 22 being interposed therebetween.

The liquid crystal layer 6 is provided to modulate light passing therethrough in accordance with the state of the electric field, and a liquid crystal layer adapted to a transverse electric field mode such an FFS (fringe field switching) mode or an IPS (in plane switching) mode is used. More specifically, a liquid crystal display device of transverse electric field mode such as the FFS mode or the IPS mode is used as the liquid crystal display device 20. Note that an alignment film may be provided between the liquid crystal layer 6 and the pixel substrate 2 and between the liquid crystal layer 6 and the opposing substrate 3 shown in FIG. 9, respectively.

As shown in FIG. 10, the plurality of sub-pixels SPix arranged in the X axis direction, that is, the plurality of sub-pixels SPix which belong to the same row of the liquid crystal display device 20 are connected with each other by the scanning line GCL. The scanning lines GCL are connected with the gate driver 12 (see FIG. 1) and scanning signals Vscan (see FIG. 1) are supplied thereto from the gate driver 12. Also, the plurality of sub-pixels SPix arranged in the Y axis direction, that is, the plurality of sub-pixels SPix which belong to the same column of the liquid crystal display device 20 are connected with each other by the signal line SGL. The signal lines SGL are connected with the source driver 13 (see FIG. 1) and pixel signals Vpix (see FIG. 1) are supplied thereto from the source driver 13. Further, the plurality of sub-pixels SPix arranged in the X axis direction, that is, the plurality of sub-pixels SPix which belong to the same row of the liquid crystal display device 20 are connected with each other by the driving electrode COML.

The driving electrodes COML are connected with the driving electrode driver 14 (see FIG. 1) and driving signals Vcom (see FIG. 1) are supplied thereto from the driving electrode driver 14. In other words, in the example shown in FIG. 10, the plurality of sub-pixels SPix which belong to the same row share one driving electrode COML. The plurality of driving electrodes COML respectively extend in the X axis direction and are arranged in the Y axis direction in the display region Ad. As described above, since the plurality of scanning lines GCL respectively extend in the X axis direction and are arranged in the Y axis direction in the display region Ad, the direction in which each of the plurality of driving electrodes COML extends is parallel to the direction in which each of the plurality of scanning lines GCL extends. However, the direction in which each of the plurality of driving electrodes COML extends is not limited, and for example, the direction in which each of the plurality of driving electrodes COML extends may be a direction which is parallel to the direction in which each of the plurality of signal lines SGL extends.

The gate driver 12 shown in FIG. 1 sequentially selects one row, namely, one horizontal line from among the sub-pixels SPix which are arranged in a matrix form in the liquid crystal display device 20 as an object of display driving by applying the scanning signals Vscan to the gate electrode of the TFT element Tr of each of the sub-pixels SPix via the scanning lines GCL shown in FIG. 10. The source driver 13 shown in FIG. 1 supplies the pixel signals Vpix to each of the plurality of sub-pixels SPix which constitute one horizontal line sequentially selected by the gate driver 12 via the signal lines SGL shown in FIG. 10. Then, displays in accordance with the supplied pixel signals Vpix are made at the plurality of sub-pixels SPix constituting one horizontal line.

The driving electrode driver 14 shown in FIG. 1 applies driving signals Vcom to drive the driving electrodes COML for each of the detection blocks corresponding to one or a plurality of driving electrodes COML.

In the liquid crystal display device 20, the gate driver 12 is driven so as to sequentially scan the scanning lines GCL on time division basis, thereby sequentially selecting the sub-pixels SPix for each horizontal line. Also, in the liquid crystal display device 20, the source driver 13 supplies pixel signals Vpix to the sub-pixels SPix which belong to one horizontal line, so that displays are made for each horizontal line. In performing the display operation, the driving electrode driver 14 applies driving signals Vcom to a detection block including the driving electrodes COML corresponding to the one horizontal line.

Figure 11:
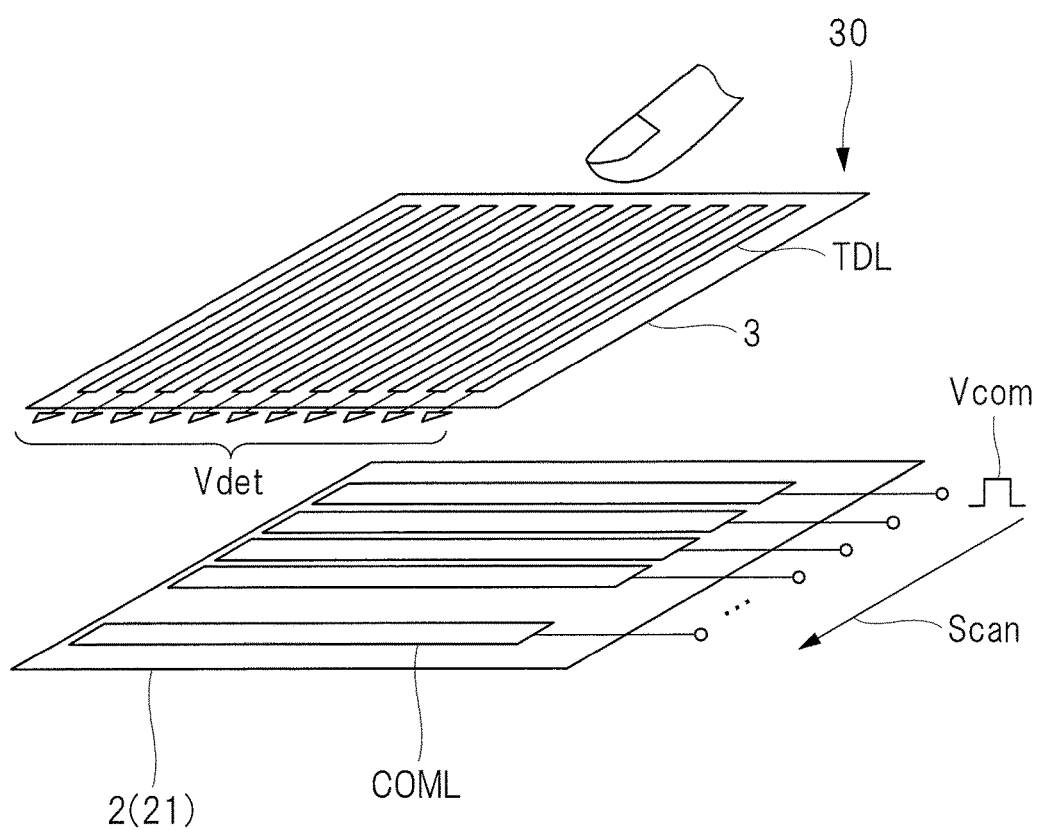
FIG. 11 is a perspective view showing one configuration example of driving electrodes and detecting electrodes of the display device according to the first embodiment.

The driving electrodes COML of the display device 1 according to the present first embodiment operate as driving electrodes of the liquid crystal display device 20 and also operate as driving electrodes of the touch detection device 30. FIG. 11 is a perspective view showing one configuration example of the driving electrodes and the detecting electrodes of the display device according to the present first embodiment.

The touch detection device 30 includes a plurality of driving electrodes COML provided on the pixel substrate 2 and a plurality of detecting electrodes TDL provided on the opposing substrate 3. The plurality of detecting electrodes TDL respectively extend in the direction which intersects the direction in which each of the plurality of driving electrodes COML extends when seen in a plan view. In other words, the plurality of detecting electrodes TDL are provided at intervals so as to respectively overlap the plurality of driving electrodes COML when seen in a plan view. Also, each of the plurality of detecting electrodes TDL opposes the driving electrodes COML in a direction which is perpendicular to the front surface of the TFT substrate 21 included in the pixel substrate 2. Each of the plurality of detecting electrodes TDL is respectively connected with the touch detecting signal amplifying unit 42 (see FIG. 1) of the touch detection unit 40. Electrostatic capacitance is generated at intersecting portions between each of the plurality of driving electrodes COML and each of the plurality of detecting electrodes TDL seen in a plan view. Thus, input positions are detected based on the electrostatic capacitance between each of the plurality of driving electrodes COML and each of the plurality of detecting electrodes TDL. Note that, as described above with reference to FIG. 9, the driving electrodes COML oppose the pixel electrodes 22 in a direction which is perpendicular to the front surface of the TFT substrate 21.

With the configuration described above, when performing the touch detection operation in the touch detection device 30, one detection block corresponding to one or a plurality of driving electrodes COML in a scanning direction Scan is sequentially selected by the driving electrode driver 14. Then, in the selected detection block, driving signals Vcom for measuring the electrostatic capacitance between the driving electrodes COML and the detecting electrodes TDL are input to the driving electrodes COML, and detecting signals Vdet for detecting input positions are output from the detecting electrodes TDL. In this manner, the touch detection device 30 is configured so as to perform the touch detection for each detection block. More specifically, one detection block corresponds to the driving electrode E1 of the above-described principle of touch detection, and the detecting electrode TDL corresponds to the detecting electrode E2.

As shown in FIG. 11, the plurality of driving electrodes COML and the plurality of detecting electrodes TDL which intersect each other when seen in a plan view form an electrostatic capacitive touch sensor having a matrix arrangement. Accordingly, by scanning the entire touch detection surface of the touch detection device 30, positions which have been contacted or approached by a finger or the like can be detected.

As shown in FIG. 9, the opposing substrate 3 includes a glass substrate 31, a color filter 32, detecting electrodes TDL and a polarizing plate 35. The color filter 32 is formed on a rear surface serving as one main surface of the glass substrate 31. The detecting electrodes TDL are the detecting electrodes of the touch detection device 30, and are formed on a front surface serving as the other main surface of the glass substrate 31. The polarizing plate 35 is provided on the detecting electrodes TDL.

For example, color filters colored in three colors of red (R), green (G) and blue (B) are arranged in the X axis direction as the color filter 32. In this manner, as shown in FIG. 10, a plurality of sub-pixels SPix corresponding to each of color regions 32R, 32G and 32B of the three colors of R, G and B are formed, and one pixel Pix is formed by one set of the plurality of sub-pixels SPix each corresponding to the color regions 32R, 32G and 32B. The pixels Pix are arranged in a matrix form in the direction in which the scanning lines GCL extend (X axis direction) and the direction in which the signal lines SGL extend (Y axis direction). Further, the region in which the pixels Pix are arranged in a matrix form is the above-described display region Ad. Note that the combination of colors of the color filter 32 may be another combination including a plurality of colors other than R, G and B. It is also possible to provide no color filter 32. Alternatively, one pixel Pix may include a sub-pixel SPix which is not provided with the color filter 32, that is, a white-colored sub-pixel SPix.

<Operation Timings>

Next, the display operation and operation timings of the touch detection operation of the display device 1 according to the present first embodiment will be described.

Figure 12:
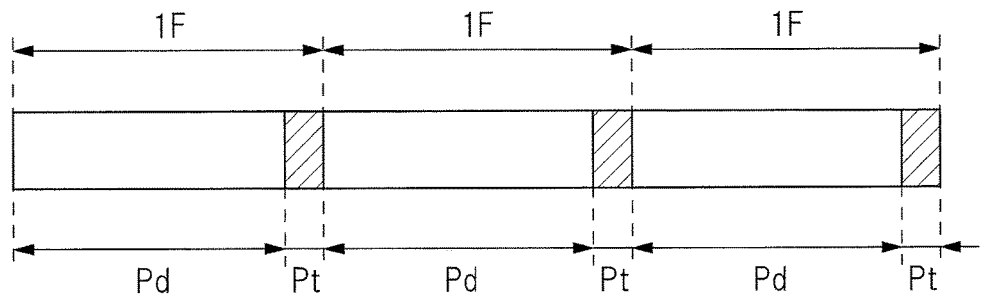
FIG. 12 is a diagram schematically showing a relationship between display periods and touch detection periods.

FIG. 12 is a diagram schematically showing a relationship between display periods and touch detection periods. As shown in FIG. 12, one frame period 1F is made up of display periods Pd and touch detection periods Pt. In each of the touch detection periods Pt, the display device 1 performs touch detection of, for example, the entire display region Ad, namely, touch detection of one screen. Note that the present invention is not limited to this, and the display device 1 may perform the touch detection of, for example, one or more screen of the display region Ad in each touch detection period Pt, and may perform the touch detection of a part of the display region Ad, namely, the touch detection of one screen or less.

In the touch detection period Pt during which the touch detection operation is performed, various signals for performing display operations such as the scanning signals Vscan and the pixel signals Vpix (see FIG. 1) are not applied to the liquid crystal display device 20. Accordingly, during the touch detection period Pt, the scanning lines GCL and the signal lines SGL (see FIG. 10) are in a floating state or a state in which DC potential is applied. In this manner, it is possible to reduce the possibility that noise is transmitted from the scanning lines GCL and the signal lines SGL to the detecting electrodes TDL via parasitic capacitance. More specifically, it is possible to reduce the influences of internal noise on the touch detection operation.

Figure 13:
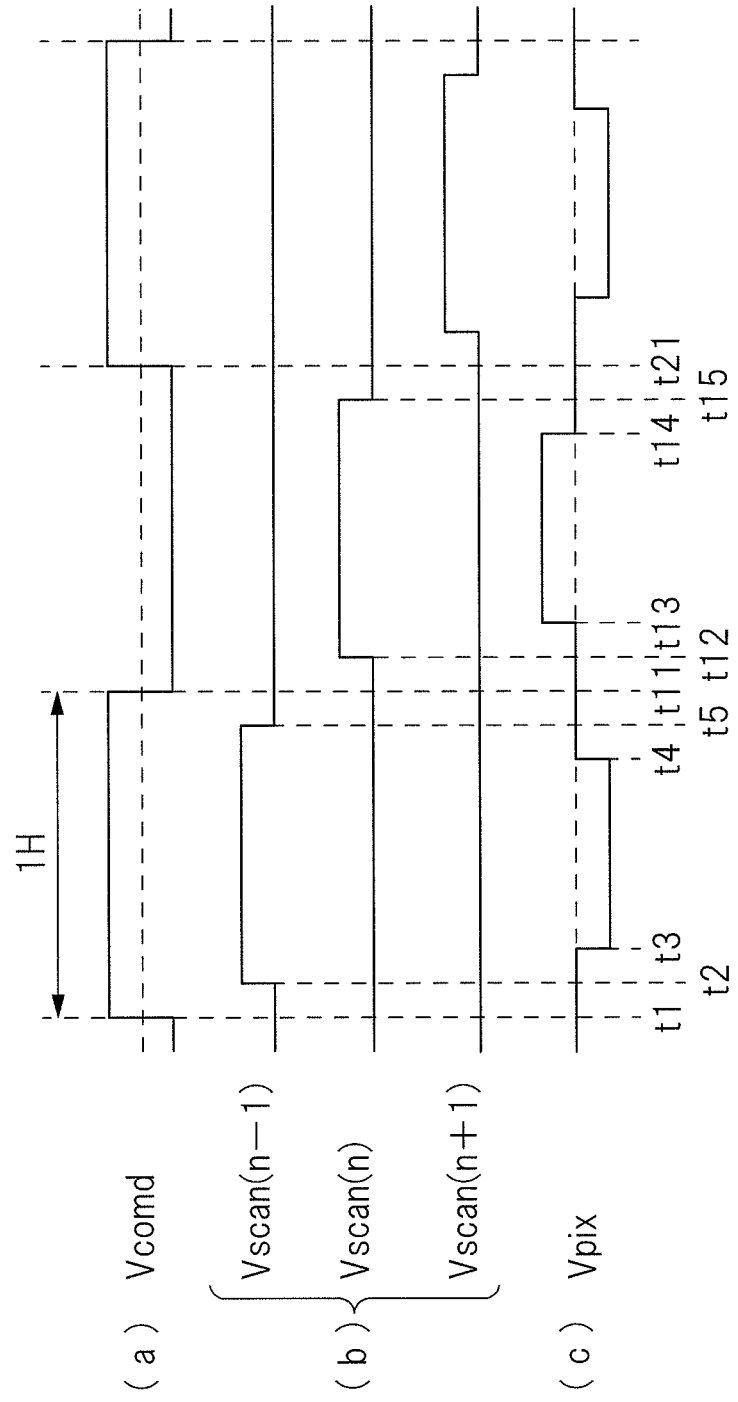
FIG. 13 is a timing waveform chart showing various signals during the display period.

FIG. 13 is a timing waveform chart showing various signals during the display period. In FIG. 13, (a) shows a waveform of the display driving signal Vcomd, (b) shows a waveform of the scanning signal Vscan and (c) shows a waveform of the pixel signal Vpix.

The display device 1 performs the display operation during the display period Pd based on the display driving signal Vcomd, the scanning signal Vscan and the pixel signal Vpix.

First, the driving electrode driver 14 applies the display driving signal Vcomd to, for example, a certain driving signal application block including a plurality of driving electrodes COML at timing t1, and its voltage level changes from low level to high level. In this manner, one horizontal period 1H is started. The gate driver 12 applies the scanning signal Vscan to the scanning line GCL of the pixels on the (n−1)th row included in the driving signal application block at timing t2. Consequently, the scanning signal Vscan(n−1) changes from low level to high level. Also, the source driver 13 applies the pixel signal Vpix to the signal line SGL during a period between timing t3 and timing t4. In this manner, display for one horizontal line is started. Then, after the supply of the pixel signal Vpix by the source driver 13 is finished, the gate driver 12 changes the scanning signal Vscan(n−1) from high level to low level at timing t5.

Next, the driving electrode driver 14 changes the voltage level of the display driving signal Vcomd from high level to low level at timing t11. In this manner, the next one horizontal period (1H) is started. The gate driver 12 applies the scanning signal Vscan to the scanning line GCL of the pixels on the n-th row included in the driving signal application block at timing t12, and the scanning signal Vscan(n) changes from low level to high level. Also, the source driver 13 applies the pixel signal Vpix to the signal line SGL during a period between timing t13 to timing t14 to start display for one horizontal line. Note that, in this example, since the display device 1 performs inversion driving, the polarity of the pixel signal Vpix applied by the source driver 13 is inverted with respect to the polarity of the pixel signal Vpix in the previous one horizontal period 1H. Then, after the supply of the pixel signal Vpix by the source driver 13 is finished, the gate driver 12 changes the scanning signal Vscan(n) from high level to low level at timing t15.

By repeating the above-described operation for the scanning lines GCL of the pixels on each row in the inclusion of the scanning line GCL of the pixels on the (n+1)th row, the display device 1 performs the display operations for all of the driving electrodes COML included in the driving signal application block within the display region Ad. Then, the display device 1 performs the display operations for all of the driving electrodes COML included in another driving signal application block within the display region Ad. By repeating the operation in the same manner, the display device 1 performs the display operation for the entire display region Ad during the display period Pd.

Figure 14:
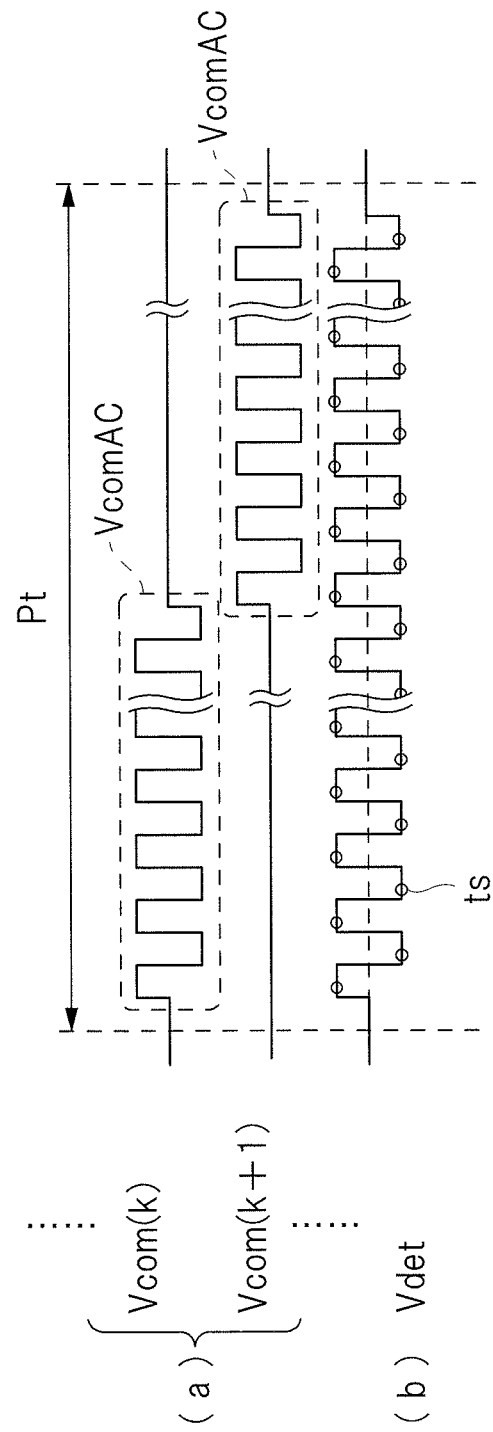
FIG. 14 is a timing waveform chart showing waveforms of various signals during the touch detection period.

FIG. 14 is a timing waveform chart showing waveforms of various signals during the touch detection period. In FIG. 14, (a) shows a waveform of the driving signal Vcom and (b) shows a waveform of the detecting signal Vdet.

The driving electrode driver 14 performs the touch detection operation based on driving signals during the touch detection period Pt.

First, the driving electrode driver 14 supplies the AC driving signal VcomAC to the driving electrodes COML on the k-th row as the driving signal Vcom(k). The AC driving signal VcomAC is transmitted to the detecting electrode TDL via the electrostatic capacitance, and the detecting signal Vdet changes (see FIG. 6). The A/D converting unit 43 performs A/D conversion of the output signal of the touch detecting signal amplifying unit 42 to which the detecting signal Vdet is input, at the sampling timing ts which is in synchronization with the AC driving signal VcomAC. Consequently, the touch detection operation is performed in a region in which the driving electrodes COML on the k-th row are formed within the display region Ad.

Next, the driving electrode driver 14 supplies the AC driving signal VcomAC to the driving electrodes COML on the (k+1)th row as the driving signal Vcom(k+1). The AC driving signal VcomAC is transmitted to the detecting electrode TDL via the electrostatic capacitance, and the detecting signal Vdet changes. The A/D converting unit 43 performs A/D conversion of the output signal of the touch detecting signal amplifying unit 42 to which the detecting signal Vdet is input, at the sampling timing ts which is in synchronization with the AC driving signal VcomAC. Consequently, the touch detection operation is performed in a region in which the driving electrodes COML on the (k+1)th row are formed within the display region Ad.

By repeating the above-described operation, the display device 1 performs the touch detection operation for the entire display region Ad.

<Positional Relationship Between Driving Electrodes and Pixel Electrodes>

Next, the positional relationship between the driving electrode and the pixel electrode will be described with reference to FIG. 15 and FIG. 16.

Figure 15:
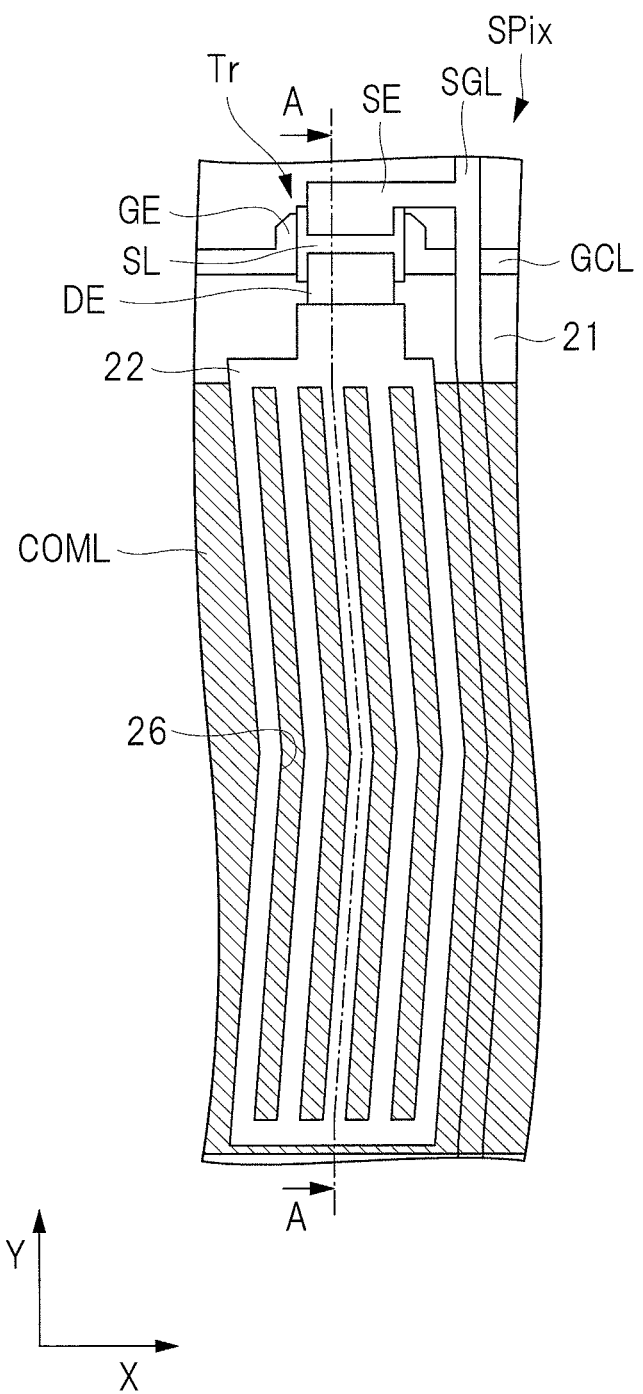
FIG. 15 is a plan view showing a driving electrode together with a pixel electrode in the display device according to the first embodiment.

FIG. 15 is a plan view showing a driving electrode together with a pixel electrode in the display device according to the first embodiment. FIG. 16 is a sectional view showing the driving electrode together with the pixel electrode in the display device according to the first embodiment. FIG. 15 shows a configuration of one pixel electrode 22 provided within one sub-pixel SPix and its periphery. FIG. 16 is a sectional view taken along the line A-A in FIG. 15. Note that, in FIG. 15, the illustration of parts other than the TFT substrate 21, the driving electrode COML, the pixel electrode 22, electrodes included in the TFT element Tr, the scanning line GCL and the signal line SGL is omitted, and in FIG. 16, the illustration of parts above the pixel electrode 22 is omitted.

The scanning line GCL which operates as a gate wiring is formed on the TFT substrate 21. As described above, the scanning line GCL extends in the row direction (X axis direction) and is made of, for example, opaque metal such as aluminum (Al) or molybdenum (Mo). The gate electrode GE is provided near an intersecting portion of the scanning line GCL at which it intersects the signal line SGL when seen in a plan view.

A transparent gate insulating film GI made of, for example, silicon nitride or silicon oxide is formed so as to cover the scanning line GCL and the gate electrode GE. Further, a semiconductor layer SL made of, for example, amorphous silicon or polycrystalline silicon is formed on the gate insulating film GI which overlaps the gate electrode GE when seen in a plan view.

On the gate insulating film GI, for example, the signal line SGL serving as a source wiring is formed. As described above, the signal line SGL extends in the column direction (Y axis direction), and is made of opaque metal such as Al or Mo, like the scanning line GCL.

Figure 16:
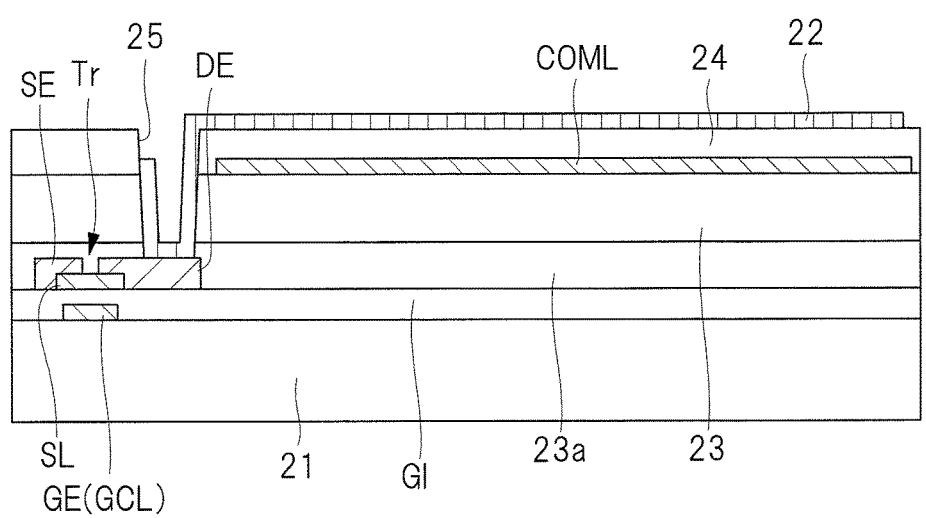
FIG. 16 is a sectional view showing the driving electrode together with the pixel electrode in the display device according to the first embodiment.

In the example shown in FIG. 15 and FIG. 16, a source electrode SE is connected near the intersecting portion of the signal line SGL at which it intersects the scanning line GCL when seen in a plan view. The source electrode SE is in partial contact with the surface of the semiconductor layer SL.

A drain electrode DE, which is made of the same material as the signal line SGL and formed simultaneously with the signal line SGL, is provided on the gate insulating film GI.

The drain electrode DE is disposed near the source electrode SE and is in partial contact with the semiconductor layer SL.

The gate electrode GE, the gate insulating film GI, the semiconductor layer SL, the source electrode SE and the drain electrode DE constitute the TFT element Tr serving as a switching element.

Further, an interlayer resin film 23 made of a transparent resin material such as a photoresist is formed so as to cover exposed portions of the signal line SGL, the TFT element Tr and the gate insulating film GI. More specifically, the interlayer resin film 23 is formed on the TFT element Tr including the drain electrode DE. The interlayer resin film 23 not only covers the exposed portions of the signal line SGL, the TFT element Tr and the gate insulating film GI, but is also a planarization film which planarizes uneven surfaces of the signal line SGL, the TFT element Tr and the gate insulating film GI.

Note that it is also possible to form a transparent passivation film 23a made of, for example, silicon nitride or silicon oxide so as to cover a part or all of the exposed portions of the signal line SGL, the TFT element Tr and the gate insulating film GI as an underlying layer of the interlayer resin film 23. Further, it is also possible to form the interlayer resin film 23 so as to cover the passivation film 23a. FIG. 16 shows an example in which the passivation film 23a is formed.

The driving electrode COML made of a conductive material with translucency with respect to visible light such as ITO or IZO (indium zinc oxide) is formed so as to cover the interlayer resin film 23. In the present first embodiment, the driving electrode COML operates as a driving electrode which drives the liquid crystal layer 6 (see FIG. 9). Further, in the present first embodiment, since the driving voltage for touch panel detection is applied, namely, the driving signal for measuring the electrostatic capacitance between the driving electrode COML and the detecting electrode TDL to detect an input position is input to the driving electrode COML, the driving electrode COML operates also as a driving electrode of the touch panel.

The driving electrode COML is integrally and continuously formed in the X axis direction so as to overlap the plurality of sub-pixels SPix arranged in the X axis direction when seen in a plan view. More specifically, one driving electrode COML is provided as a common electrode for a plurality of sub-pixels SPix. Accordingly, the driving electrode COML is also referred to as a common electrode.

A transparent insulating film 24 made of, for example, silicon nitride or silicon oxide is formed so as to cover the driving electrode COML. Then, a plurality of pixel electrodes 22 made of a conductive material with translucency with respect to visible light such as ITO or IZO are formed so as to cover the insulating film 24. The plurality of pixel electrodes 22 are formed so as to respectively overlap the driving electrode COML within each of the plurality of sub-pixels SPix when seen in a plan view. In other words, the driving electrode COML is provided so as to overlap the plurality of pixel electrodes 22 arranged in the X axis direction when seen in a plan view. More specifically, the driving electrode COML and the pixel electrode 22 oppose each other with the insulating film 24 interposed therebetween in each of the plurality of sub-pixels SPix.

A contact hole 25 which penetrates through the insulating film 24, the interlayer resin film 23 and the passivation film 23a to reach the drain electrode DE of the TFT element Tr is formed at a position which overlaps the drain electrode DE when seen in a plan view. The drain electrode DE is exposed on a bottom surface portion of the contact hole 25.

The pixel electrode 22 is formed on the insulating film 24 with the inclusion of the side surface portion and the bottom surface portion of the contact hole 25, and is electrically connected with the drain electrode DE which is exposed on the bottom surface portion of the contact hole 25.

Note that a slit-like aperture 26 extending in the extending direction of the signal line SGL (Y axis direction) as a whole may be formed in the pixel electrode 22 formed within each sub-pixel SPix. The slit-like apertures 26 may also be bent in the middle. Further, as will be described with reference to FIG. 27, light-shielding portions BM1 and BM2 may be formed so as to overlap each of the plurality of scanning lines GCL and the plurality of signal lines SGL when seen in a plan view.

<Detecting Electrodes>

Next, the shape and arrangement of the detecting electrodes seen in a plan view will be described. In the following, the case in which the detecting electrode has a conductive line with a so-called zigzag shape will be described.

Figure 17:
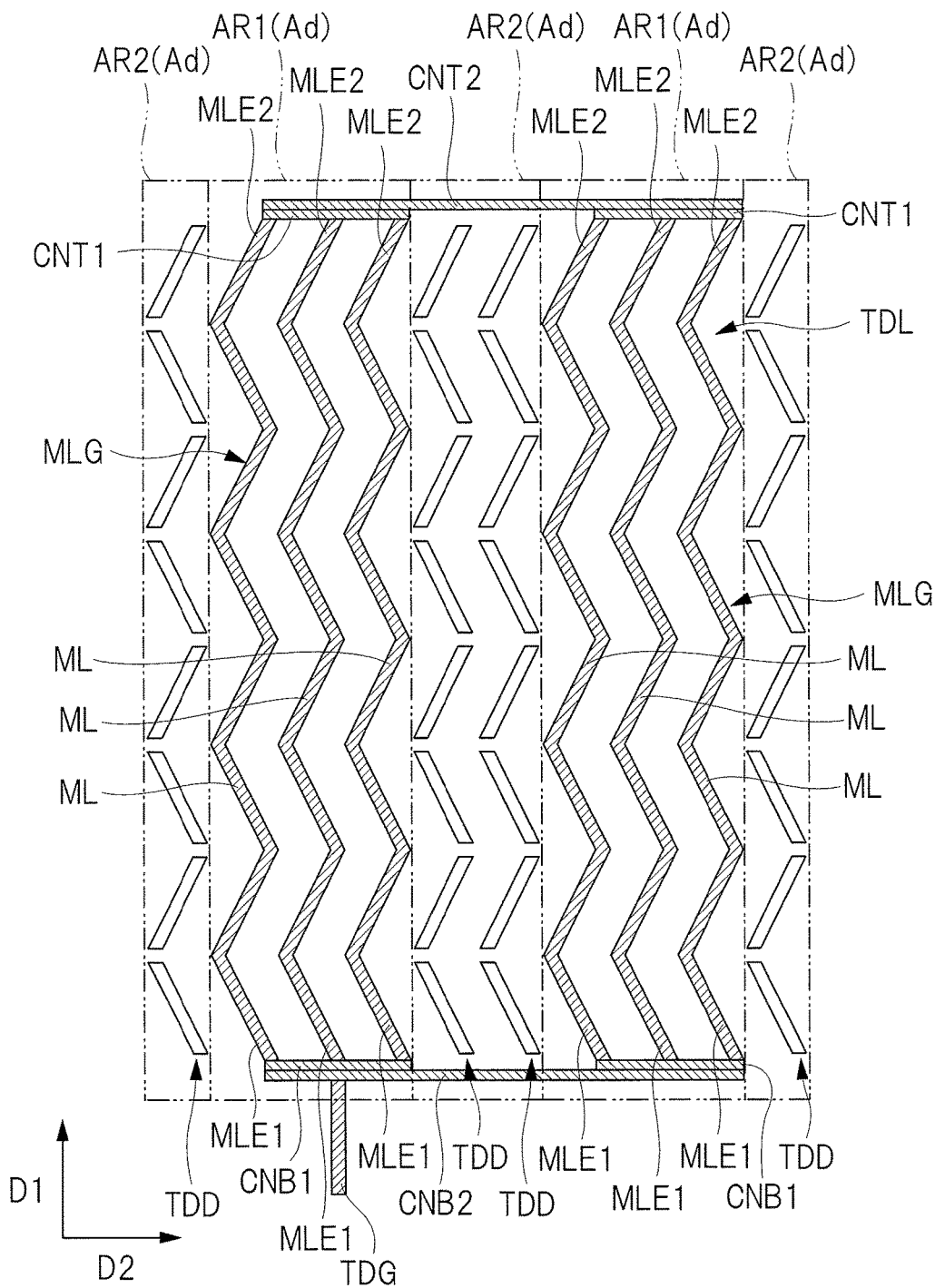
FIG. 17 is a plan view schematically showing one example of a configuration of a detecting electrode in the display device according to the first embodiment.
Figure 18:
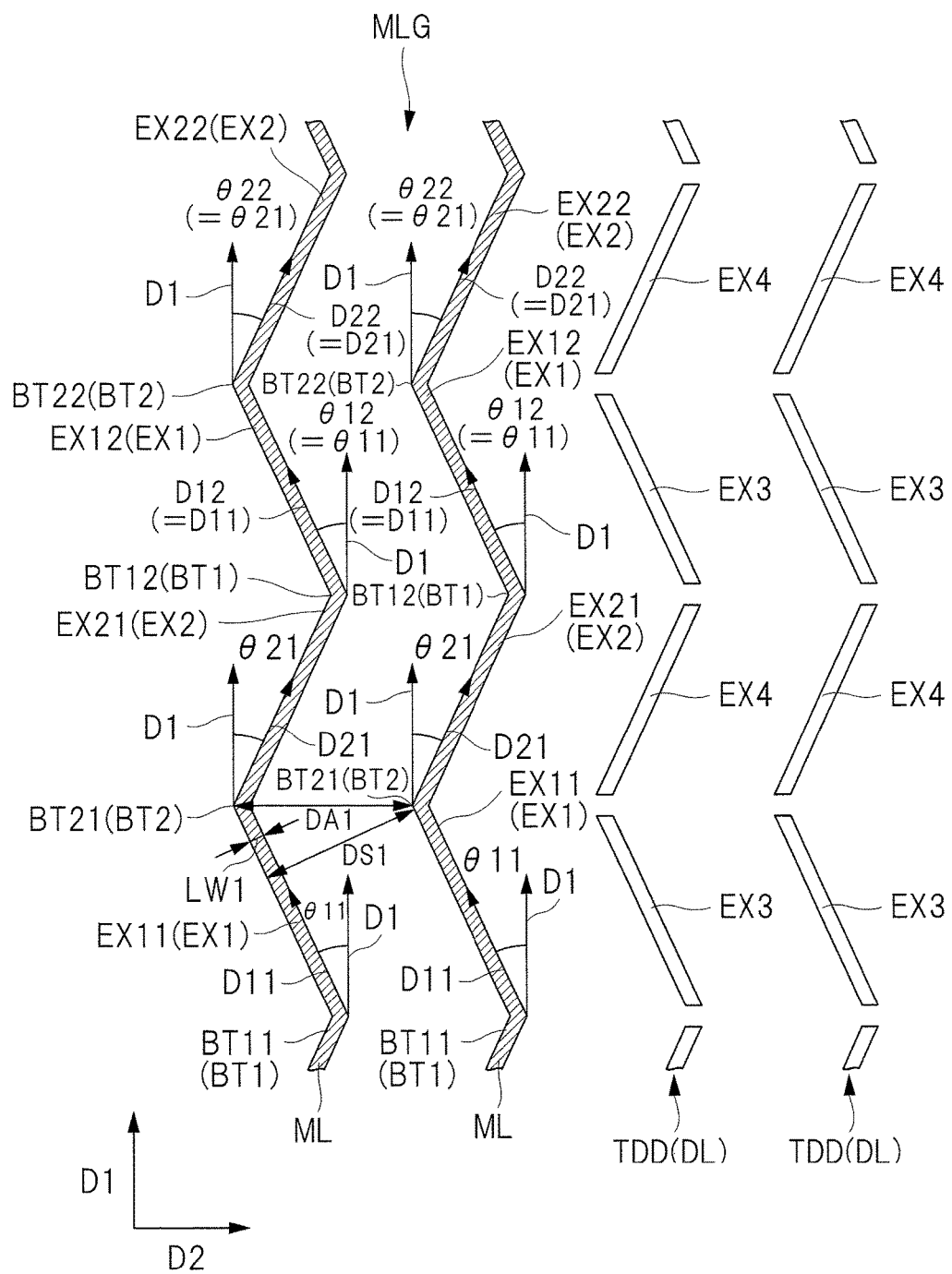
FIG. 18 is a plan view schematically showing one example of a configuration of a detecting electrode in the display device according to the first embodiment.

FIG. 17 and FIG. 18 are plan views schematically showing one example of a configuration of a detecting electrode in the display device according to the present first embodiment. FIG. 17 shows one detecting electrode TDL from among the plurality of detecting electrodes TDL. Also, in FIG. 18, a part of the detecting electrode TDL is shown in an enlarged manner.

Each of the plurality of detecting electrodes TDL includes conductive lines ML. In the example shown in FIG. 17, one detecting electrode TDL includes six conductive lines ML. The conductive line ML has a zigzag shape which extends in a certain direction as a whole while alternately bending in opposite directions when seen in a plan view. The direction in which the conductive lines ML extend as a whole when seen in a plan view is defined as a direction D1, and a direction which intersects the direction D1 is defined as a direction D2. At this time, the conductive line ML has a zigzag shape which extends in the direction D1 as a whole while alternately bending in opposite directions when seen in a plan view. Also, the conductive lines ML are arranged in the direction D2 when seen in a plan view.

As shown in FIG. 18, the conductive line ML includes a plurality of extending portions EX1 and a plurality of extending portions EX2. Each of the plurality of extending portions EX1 extends while inclining to one side (left side in FIG. 18) in the direction D2 with respect to the direction D1 when seen in a plan view. Also, each of the plurality of extending portions EX2 extends while inclining to the side opposite to the one side (right side in FIG. 18) in the direction D2 with respect to the direction D1 when seen in a plan view. The extending portions EX1 and the extending portions EX2 are alternately arranged in the direction D1 when seen in a plan view. Further, end portions of the extending portions EX1 and the extending portions EX2 which are adjacent to each other in the direction D1 are coupled to each other. Consequently, the plurality of extending portions EX1 and the plurality of extending portions EX2 are integrated as conductive lines ML.

As shown in FIG. 18, the conductive line ML includes a plurality of bent portions BT1 and a plurality of bent portions BT2. Each of the plurality of bent portions BT1 bends in a direction which is inclined to one side (left side in FIG. 18) in the direction D2 with respect to the direction D1 when seen in a plan view. Also, each of the plurality of bent portions BT2 bends in a direction which is inclined to the side opposite to the one side (right side in FIG. 18) in the direction D2 with respect to the direction D1 when seen in a plan view. In the conductive line ML, the bent portions BT1 and the bent portions BT2 are alternately disposed in the direction D1 when seen in a plan view.

FIG. 18 shows two conductive lines ML. Each of the two conductive lines ML includes a bent portion BT11 and a bent portion BT12 as the plurality of bent portions BT1 and a bent portion BT21 and a bent portion BT22 as the plurality of bent portions BT2. The bent portion BT11 bends in a direction D11 which is inclined to one side (left side in FIG. 18) in the direction D2 with respect to the direction D1 when seen in a plan view. The bent portion BT21 bends in a direction D21 which is inclined to the side opposite to the one side (right side in FIG. 18) in the direction D2 with respect to the direction D1 when seen in a plan view. The bent portion BT12 bends in a direction D12 which is inclined to one side (left side in FIG. 18) in the direction D2 with respect to the direction D1 when seen in a plan view. The bent portion BT22 bends in a direction D22 which is inclined to the side opposite to the one side (right side in FIG. 18) in the direction D2 with respect to the direction D1 when seen in a plan view. In the example shown in FIG. 18, the direction D12 is an identical direction, namely, parallel direction to the direction D11, and the direction D22 is an identical direction, namely, parallel direction to the direction D21.

Note that an angle formed by the direction D11 and the direction D1 is defined as an angle θ11, an angle formed by the direction D12 and the direction D1 is defined as an angle θ12, an angle formed by the direction D21 and the direction D1 is defined as an angle θ21 and an angle formed by the direction D22 and the direction D1 is defined as an angle θ22.

Further, in the example shown in FIG. 18, the conductive line ML includes an extending portion EX11 and an extending portion EX12 as the plurality of extending portions EX1 and an extending portion EX21 and an extending portion EX22 as the plurality of extending portions EX2. The extending portion EX11 extends in the direction D11 when seen in a plan view, the extending portion EX21 extends in the direction D21 when seen in a plan view, the extending portion EX12 extends in the direction D12 when seen in a plan view, and the extending portion EX22 extends in the direction D22 when seen in a plan view. In the example shown in FIG. 18, as described above, the direction D12 is an identical direction, namely, parallel direction to the direction D11, and the direction D22 is an identical direction, namely, parallel direction to the direction D21. Accordingly, the extending portion EX11 and the extending portion EX12 are parallel to each other and the extending portion EX21 and the extending portion EX22 are parallel to each other.

Further, in the example shown in FIG. 18, the extending portions EX11 included in adjacent conductive lines ML are parallel to each other and the extending portions EX12 included in adjacent conductive lines ML are parallel to each other. Moreover, the extending portions EX21 included in adjacent conductive lines ML are parallel to each other and the extending portions EX22 included in adjacent conductive lines ML are parallel to each other.

Figure 19:
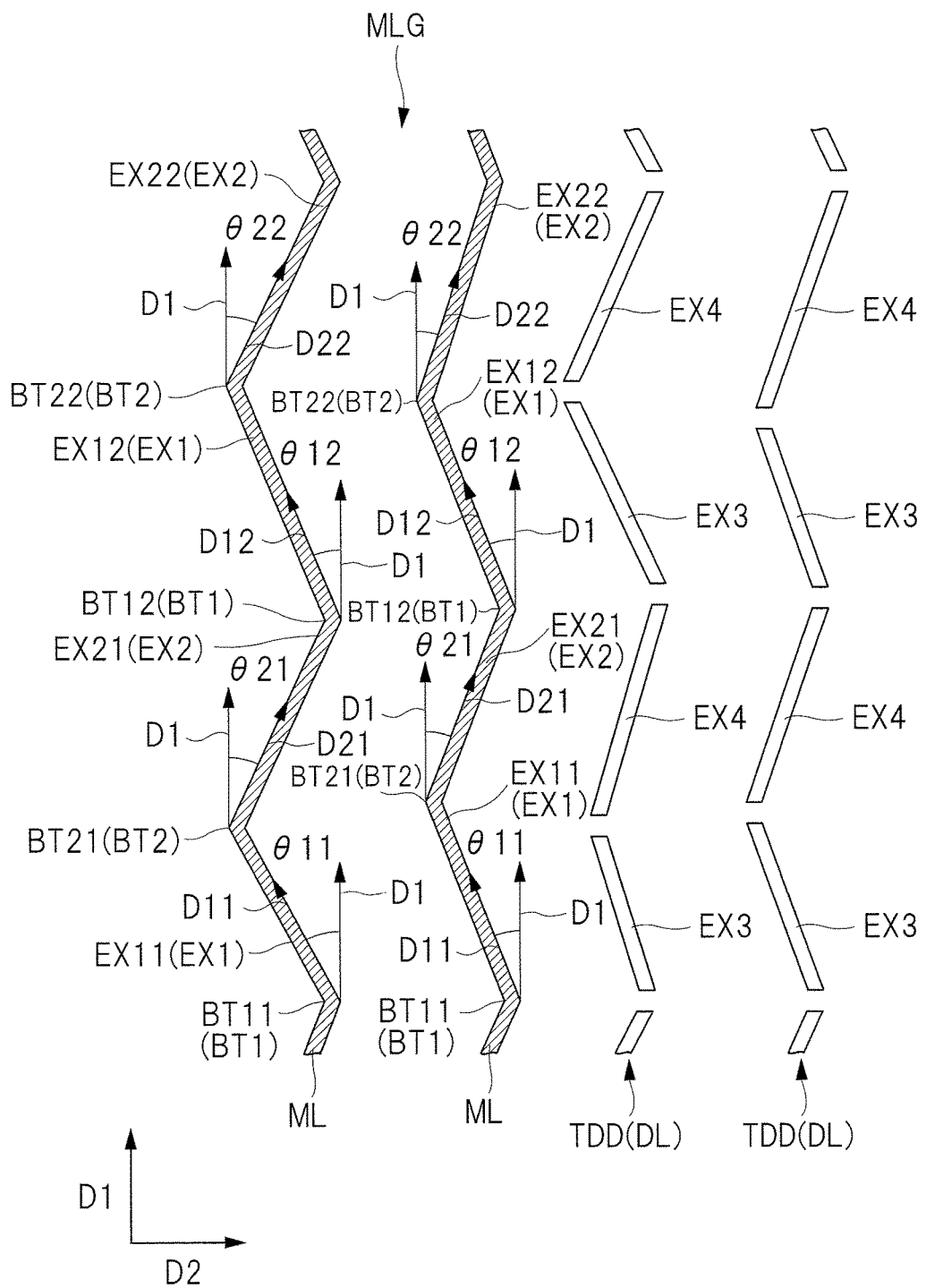
FIG. 19 is a plan view schematically showing another example of a configuration of a detecting electrode in the display device according to the first embodiment.

Note that the direction D12 may be a direction different from the direction D11, namely, a direction which intersects the direction D11, and the direction D22 may be a direction different from the direction D21, namely, a direction which intersects the direction D21. More specifically, the extending portion EX11 and the extending portion EX12 need not to be parallel to each other, and the extending portion EX21 and the extending portion EX22 need not to be parallel to each other. The example like this is shown in FIG. 19. FIG. 19 is a plan view schematically showing another example of the configuration of the detecting electrode in the display device according to the first embodiment.

In the example shown in FIG. 19, the extending portions EX11 included in adjacent conductive lines ML are not parallel to each other, and the extending portions EX12 included in adjacent conductive lines ML are not parallel to each other. Further, the extending portions EX21 included in adjacent conductive lines ML are not parallel to each other and the extending portions EX22 included in adjacent conductive lines ML are not parallel to each other.

Each of the plurality of conductive lines ML includes a metal layer or an alloy layer formed in the same layer. More specifically, each of the plurality of conductive lines ML includes a metal layer or an alloy layer of the same kind. Accordingly, each of the plurality of detecting electrodes includes a metal layer or an alloy layer. Consequently, since it is possible to improve the conductivity of each of the plurality of conductive lines ML, the detecting sensitivity or the detecting speed of the detecting electrodes TDL can be improved.

Preferably, each of the plurality of conductive lines ML includes a metal layer or an alloy layer made of one or more metal selected from a group made up of aluminum (Al), copper (Cu), silver (Ag), molybdenum (Mo), chromium (Cr) and tungsten (W). Consequently, since it is possible to further improve the conductivity of each of the plurality of conductive lines ML, the detecting sensitivity or the detecting speed of the detecting electrodes TDL can be further improved.

When the display device 1 is a so-called in-cell liquid crystal display device like the present first embodiment and one frame period 1F is divided into the display periods Pd and the touch detection periods Pt as described above, it is necessary to improve the detection speed by the detecting electrodes TDL. Accordingly, when each of the plurality of conductive lines ML includes a metal layer or an alloy layer, the effect of improving the detection performance because of the improvement in the detection speed becomes larger when compared with the case where each of the plurality of conductive lines ML does not include a metal layer or an alloy layer.

Each of the plurality of conductive lines ML may include, in addition to the above-mentioned metal layer or alloy layer, an oxide layer made of an oxide of one or more metal selected from a group made up of aluminum (Al), copper (Cu), silver (Ag), molybdenum (Mo), chromium (Cr) and tungsten (W). More specifically, each of the plurality of conductive lines ML may be a stacked body in which the above-mentioned metal layer or alloy layer and the oxide layer are stacked.

Alternatively, each of the plurality of conductive lines ML may be a stacked body in which the above-mentioned metal layer or alloy layer and a translucent conductive layer made of a conductive oxide having translucency with respect to visible light such as ITO are stacked. In this case, the conductivity of each of the plurality of conductive lines ML can be improved when compared with the case where each of the conductive lines ML is made up of only the translucent conductive layer.

Note that, in the present specification, the expression "with translucency with respect to visible light" indicates that the transmittance with respect to visible light is, for example, 90% or more, and the transmittance with respect to visible light indicates an average value of the transmittance with respect to light having a wavelength of, for example, 400 to 800 nm. Further, the transmittance indicates a ratio of light, which has transmitted to reach the surface on the opposite side of the rear surface of the display device 10 with a touch detection function (see FIG. 9) in the display region Ad, out of the light which has been irradiated to the rear surface of the display device 10 with a touch detection function.

On the other hand, each of the plurality of conductive lines ML may have light-shielding properties with respect to visible light. That is, each of the plurality of detecting electrodes TDL may have light-shielding properties with respect to visible light. Here, the expression "have light-shielding properties with respect to visible light" indicates that the transmittance with respect to visible light is, for example, 10% or less. Accordingly, the transmittance with respect to visible light of each of the plurality of conductive lines ML may be 10% or less. As will be described later, in the present first embodiment, a ratio of total sum of the areas of portions of the plurality of sub-pixels SPix which overlap any of the plurality of detecting electrodes TDL and the plurality of dummy electrodes TDD when seen in a plan view to total sum of the areas of the plurality of sub-pixels SPix is 1 to 22%. In such a case, even when the transmittance of the plurality of conductive lines ML themselves with respect to visible light is 10% or less, the transmittance of the entire display region Ad, namely, the transmittance of the display device 1 can be made to be 90% or more.

Further, when the detecting electrodes TDL include a metal layer or an alloy layer, a low reflection layer having a reflectance with respect to visible light which is lower than the reflectance of the metal layer or the alloy layer with respect to visible light may be formed on the surface of the metal layer or the alloy layer or on the meal layer or the alloy layer. More specifically, a low reflection layer having a reflectance with respect to visible light which is lower than the reflectance of the detecting electrode TDL with respect to visible light may be formed on the surface of the detecting electrode TDL or on the detecting electrode TDL. In this manner, since the ratio of visible light which is reflected by the detecting electrodes TDL out of the visible light which has been incident on the detecting electrodes TDL is reduced, it is possible to reduce the reflectance of the detecting electrodes TDL with respect to visible light, and to reduce glares of images displayed in the display region Ad.

As a method of forming a low reflection layer on the surface of the metal layer or the alloy layer, for example, a method of roughening the surface of the metal layer or the alloy layer has been known. On the other hand, as a method of forming a low reflection layer on the metal layer or the alloy layer, for example, a method of forming another black-colored layer on the metal layer or the alloy layer has been known.

In the example shown in FIG. 17, each of the plurality of detecting electrodes TDL includes a plurality of connecting portions CNB1, a plurality of connecting portions CNT1, a connecting portion CNB2 and a connecting portion CNT2. Each of the plurality of connecting portions CNB1 electrically connects end portions MLE1 of adjacent conductive lines ML on one side in the direction D1 (lower side in FIG. 17). Each of the plurality of connecting portions CNT1 electrically connects end portions MLE2 of adjacent conductive lines ML on the side opposite to the one side in the direction D1 (upper side in FIG. 17). The connecting portion CNB2 electrically connects the plurality of connecting portions CNB1 with each other, and the connecting portion CNT2 electrically connects the plurality of connecting portions CNT1 with each other. Accordingly, the conductive lines ML which are adjacent to each other in the direction D2 are electrically connected in parallel between the connecting portion CNB2 and the connecting portion CNT2.

The connecting portion CNB2 is connected with the touch detection unit 40 shown in FIG. 1 via a detection wiring TDG. Also, the plurality of conductive lines ML included in each of the detecting electrodes TDL are electrically connected with the connecting portion CNB2 via the connecting portion CNB1. Accordingly, the plurality of conductive lines ML included in each of the detecting electrodes TDL are connected with the touch detection unit 40 shown in FIG. 1 via the connecting portion CNB1, the connecting portion CNB2 and the detection wiring TDG.

In this manner, the detecting electrodes TDL can include a conductive line group MLG made up of a plurality of conductive lines ML which are arranged in the direction D2 and connected in parallel to each other. Consequently, since it is possible to reduce the electric resistance of the detecting electrodes TDL, it is possible to improve the detecting sensitivity or the detecting speed in performing the detection operations by the detecting electrodes TDL.

The display device 1 according to the present first embodiment preferably includes a plurality of dummy electrodes TDD. Each of the plurality of dummy electrodes TDD is provided in a region AR2 corresponding to the region other than a region AR1 in which the conductive line group MLG made up of the conductive lines ML is formed in the display region Ad, that is, in the region AR2 in which the conductive line group MLG is not formed in the display region Ad. In other words, each of the plurality of dummy electrodes TDD is provided in the display region Ad between two conductive lines ML which are formed apart from each other. Alternatively, each of the plurality of dummy electrodes TDD is provided so as to be separate from all of the plurality of detecting electrodes TDL in the display region Ad. Note that it is not necessary to provide a plurality of dummy electrodes TDD, and only one dummy electrode may be provided.

As shown in FIG. 18, the dummy electrode TDD includes a plurality of extending portions EX3 and a plurality of extending portions EX4. Each of the plurality of extending portions EX3 extends while inclining to one side (left side in FIG. 17) in the direction D2 with respect to the direction D1 when seen in a plan view. Also, each of the plurality of extending portions EX4 extends while inclining to the side opposite to the one side (right side in FIG. 17) in the direction D2 with respect to the direction D1 when seen in a plan view. The extending portions EX3 and the extending portions EX4 are alternately arranged in the direction D1 when seen in a plan view.

Further, unlike the conductive lines ML, end portions of the extending portions EX3 and the extending portions EX4 which are adjacent to each other in the direction D1 are not coupled in the dummy electrodes TDD. In other words, the plurality of extending portions EX3 and the plurality of extending portions EX4 are formed by cutting and dividing conductive lines DL having a zigzag shape, which extend in the direction D1 as a whole while alternately bending in opposite directions when seen in a plan view, at respective bent portions. Note that, as shown in FIG. 17 and FIG. 18, the plurality of dummy electrodes TDD may be arranged in the direction D2.

As described above, the conductive lines ML preferably have light-shielding properties. Further, as will be described later, the dummy electrodes TDD are preferably made of the same metal layer or alloy layer as the metal layer or alloy layer included in the conductive lines ML. Accordingly, when the dummy electrodes TDD are not formed in the region AR2 in which the conductive lines ML with light-shielding properties are not formed, the transmittance of the entire region AR2 with respect to visible light becomes larger than the transmittance of the entire region AR1 with respect to visible light. Thus, since a difference in brightness occurs between the region AR1 and the region AR2, it becomes easier to recognize the detecting electrodes TDL.

On the other hand, by forming the dummy electrodes TDD in the region AR2 in which the conductive lines ML with light-shielding properties are not formed, it is possible to prevent or suppress the occurrence of the case in which the transmittance with respect to visible light in the entire region AR2 becomes larger than the transmittance with respect to visible light in the entire region AR1. Consequently, it becomes possible to prevent or suppress the difference in brightness from occurring between the region AR1 and the region AR2, and it is possible to prevent or suppress the detecting electrodes TDL from being recognized.

Preferably, each of the plurality of dummy electrodes TDD includes a metal layer or an alloy layer made of one or more metal selected from a group made up of aluminum (Al), copper (Cu), silver (Ag), molybdenum (Mo), chromium (Cr) and tungsten (W) like each of the plurality of conductive lines ML. More specifically, each of the plurality of dummy electrodes TDD may have light-shielding properties with respect to visible light. In this case, since the difference in transmittance with respect to visible light between each of the plurality of dummy electrodes TDD and each of the plurality of conductive lines ML can be further reduced, it is possible to further prevent or suppress the difference in brightness from occurring between the region AR1 and the region AR2.

Each of the plurality of dummy electrodes TDD may include, in addition to the above-mentioned metal layer or alloy layer, an oxide layer made of an oxide of one or more metal selected from a group made up of aluminum (Al), copper (Cu), silver (Ag), molybdenum (Mo), chromium (Cr) and tungsten (W). More specifically, each of the plurality of dummy electrodes TDD may be a stacked body in which the above-mentioned metal layer or alloy layer and the oxide layer are stacked.

Further, each of the plurality of dummy electrodes TDD may be a stacked body in which the above-mentioned metal layer or alloy layer and a translucent conductive layer made of a conductive oxide with translucency with respect to visible light such as ITO are stacked.

Preferably, the plurality of dummy electrodes TDD are made of a metal layer or an alloy layer which is formed in the same layer as the plurality of conductive lines ML. Consequently, it is possible to form the plurality of dummy electrodes TDD and the plurality of conductive lines ML in the same process. Also, since it is possible to reduce the difference in transmittance with respect to visible light between each of the plurality dummy electrodes TDL and each of the plurality of conductive lines ML, it is possible to further prevent or suppress the difference in brightness from occurring between the region AR1 and the region AR2.

Note that, in the present first embodiment, end portions of the extending portions EX3 and the extending portions EX4 which are adjacent to each other in the direction D1 are not coupled in one dummy electrode TDD. Therefore, even when a finger has approached both of the detecting electrode TDL and the dummy electrode TDD when performing the detection operation by the detecting electrode TDL, the influence of the dummy electrode TDD on the absolute value |ΔV| shown in FIG. 6 can be reduced. More specifically, by dividing one dummy electrode TDD into a plurality of extending portions EX3 and a plurality of extending portions EX4 and electrically insulating each of the plurality of divided extending portions EX3 and the plurality of divided extending portions EX4 with respect to each other, the positional accuracy detected when the detection operation is performed by the detecting electrode TDL can be improved.

Figure 20:
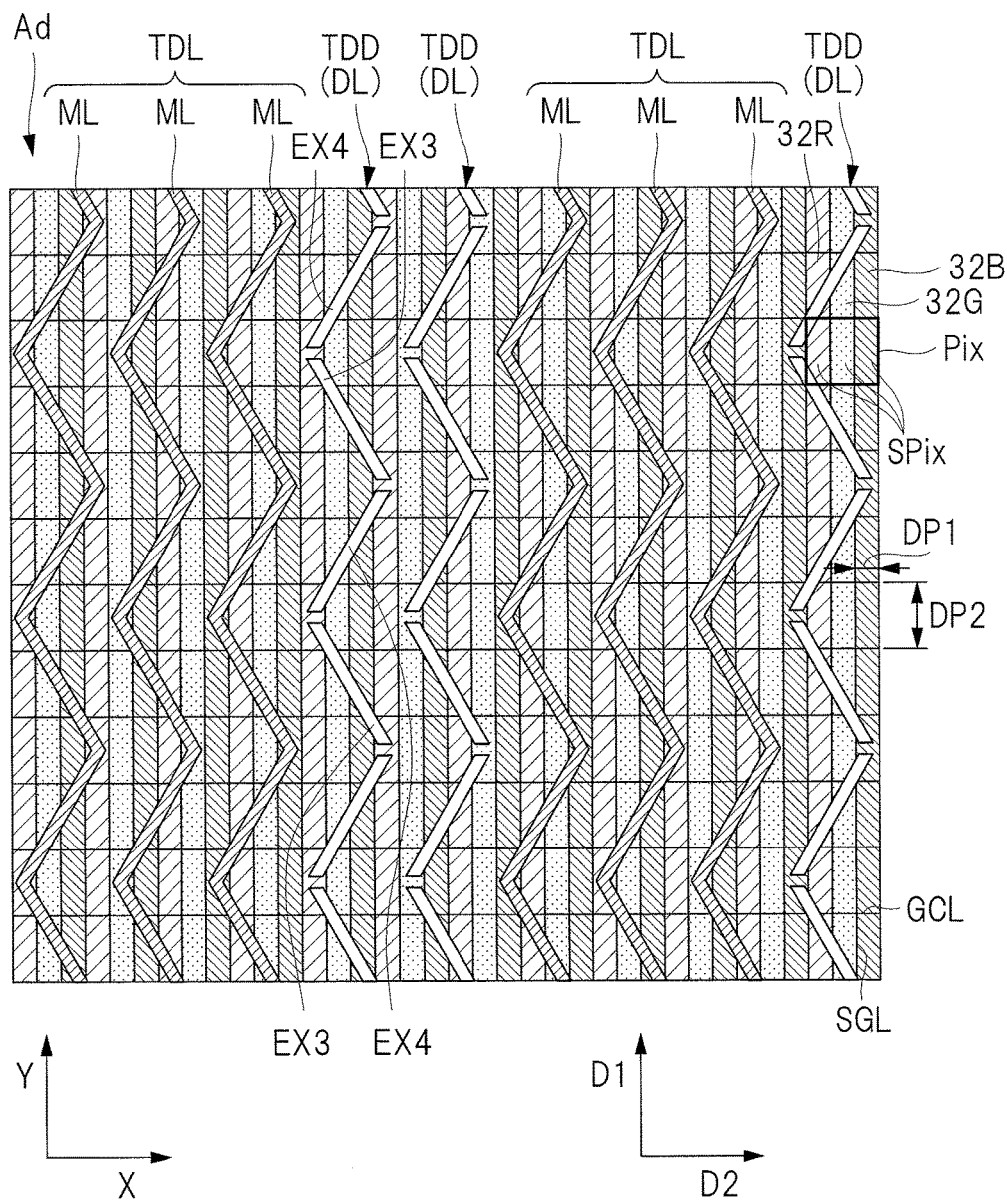
FIG. 20 is a plan view schematically showing one example of a relationship between positions of the detecting electrodes and positions of pixels in the display device according to the first embodiment.

FIG. 20 is a plan view schematically showing one example of a relationship between positions of the detecting electrodes and positions of pixels in the display device according to the first embodiment.

In the display region Ad, a plurality of pixels Pix are arranged in a matrix form in the X axis direction and the Y axis direction. Each of the plurality of pixels Pix includes a plurality of sub-pixels SPix arranged in the X axis direction. Accordingly, the plurality of sub-pixels SPix are arranged in a matrix form in the X axis direction and the Y axis direction in the display region Ad. In the example shown in FIG. 20, the pixel Pix includes three types of sub-pixels SPix displaying each of the three colors of R (red), G (green) and B (blue). Accordingly, the pixel Pix includes a plurality of sub-pixels SPix respectively corresponding to each of the color regions 32R, 32G and 32B of the three colors of R, G and B. Note that the kinds of colors displayed by the sub-pixels SPix are not limited to three kinds. For example, the pixel Pix may include four types of sub-pixels SPix displaying each of the four colors of R (red), G (green), B (blue) and W (white).

The plurality of sub-pixels SPix are arranged in a matrix form in the direction in which the scanning lines GCL extend (X axis direction) and the direction in which the signal lines SGL extend (Y axis direction). The scanning lines GCL and the signal lines SGL or light-shielding portions BM1 and BM2 (see FIG. 27 to be described later) which are formed so as to cover the scanning lines GCL and the signal lines SGL suppress the transmission of light.

Accordingly, in the image displayed in the display region Ad, a pattern formed of a plurality of lines which extend in the direction in which the scanning lines GCL extend (X axis direction) and are arranged in the direction which intersects the direction in which the scanning lines GCL extend (Y axis direction), that is, a pattern of the scanning lines GCL is observed. Further, in the image displayed in the display region Ad, a pattern formed of a plurality of lines which extend in the direction in which the signal lines SGL extend (Y axis direction) and are arranged in the direction which intersects the direction in which the signal lines SGL extend (X axis direction), that is, a pattern of the signal lines SGL is observed. Then, in the image displayed in the display region Ad, the pattern of the scanning lines GCL or the pattern of the signal lines SGL may interfere with the pattern of the detecting electrodes TDL, so that a light and shade stripe pattern such as a moire pattern is observed, and there is the fear that the visibility of the image displayed in the display region Ad is degraded.

In the example shown in FIG. 20, the direction D1 in which the conductive lines ML extend as a whole is identical to, namely, parallel to the Y axis direction in which the sub-pixels SPix are arranged. However, in the display device 1 according to the present first embodiment, the conductive lines ML preferably include the extending portions EX11 (see FIG. 18) which extend in, for example, the direction D11 which intersects both of the X axis direction and the Y axis direction. Also, an angle which is formed by the direction D11 in which the extending portions EX11 extend and the Y axis direction in which the sub-pixels SPix are arranged is the angle θ11 (see FIG. 18).

This angle θ11 is set to a proper angle which is larger than 0 degree and smaller than 90 degrees. At this time, the conductive lines ML include a portion which extends in the direction D11 which intersects both of the X axis direction and the Y axis direction when seen in a plan view. Consequently, it is possible to prevent or suppress the occurrence of the case in which the pattern of the scanning lines GCL or the pattern of the signal lines SGL interferes with the pattern of the detecting electrodes TDL and a light and shade stripe pattern such as a moire pattern is observed.

Note that, in the example shown in FIG. 20, the extending portions EX3 and the extending portions EX4 included in the dummy electrodes TDD intersect both of the X axis direction and the Y axis direction. Consequently, it is possible to prevent or suppress the occurrence of the case in which the pattern of the scanning lines GCL or the pattern of the signal lines SGL interferes with the pattern of the dummy electrodes TDD, and a light and shade stripe pattern such as a moire pattern is observed.

Figure 21:
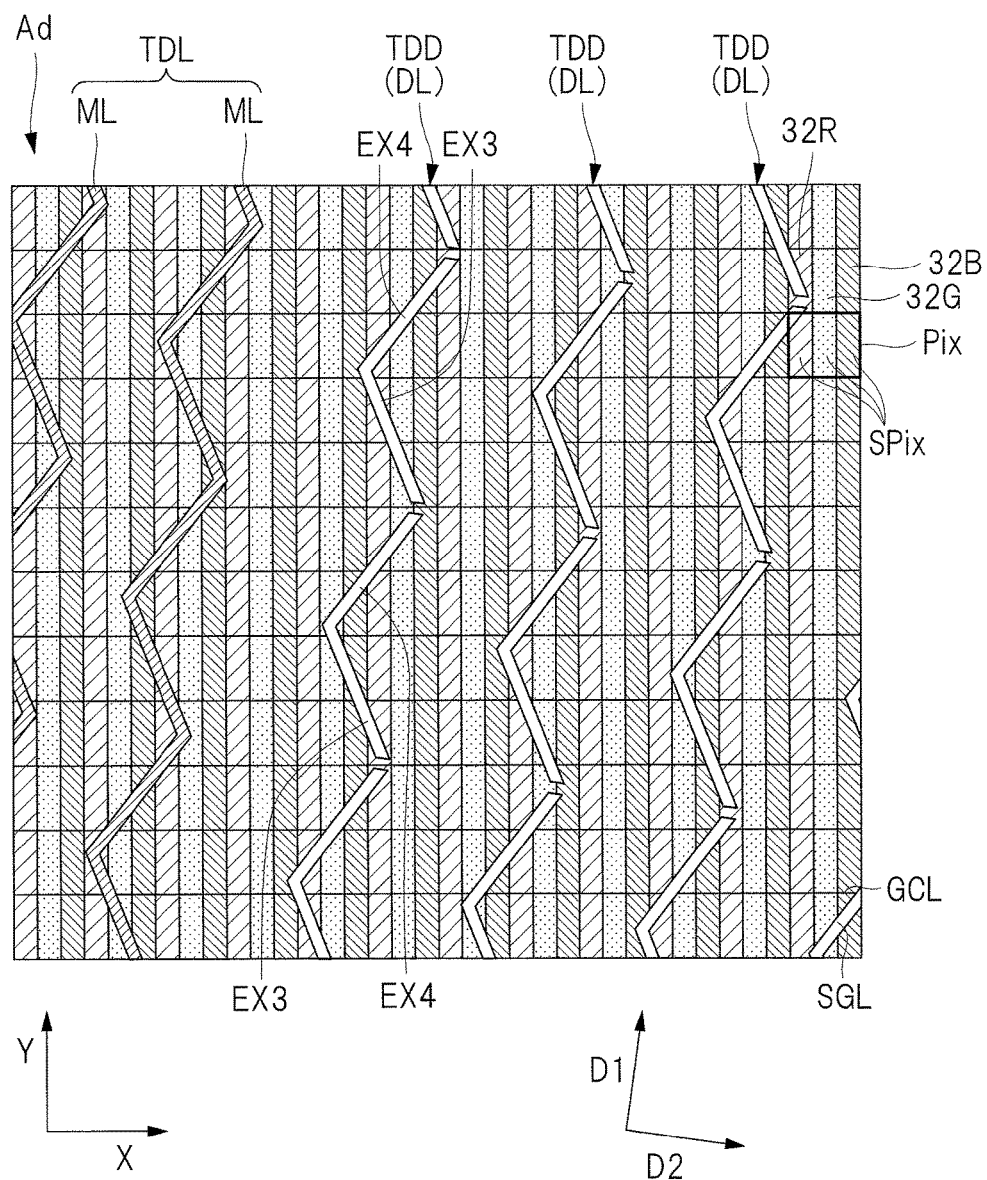
FIG. 21 is a plan view schematically showing another example of a relationship between positions of the detecting electrodes and positions of pixels in the display device according to the first embodiment.

On the other hand, the direction D1 in which the conductive lines ML extend as a whole may be a direction which is different from the Y axis direction in which the sub-pixels SPix are arranged, namely, a direction which intersects the Y axis direction. The example like this is shown in FIG. 21. FIG. 21 is a plan view schematically showing another example of a relationship between positions of the detecting electrodes and positions of pixels in the display device according to the first embodiment.

In the example shown in FIG. 21, the direction D2 in which the conductive lines ML are arranged is a direction which is different from the X axis direction in which the sub-pixels SPix are arranged, namely, a direction which intersects the X axis direction. Consequently, a direction of periodicity of color distribution based on the arrangement of the plurality of sub-pixels SPix differs from a direction of periodicity of transmittance distribution based on the arrangement of the plurality of conductive lines ML. Accordingly, by arranging the conductive lines ML with light-shielding properties, it is possible to prevent or suppress the occurrence of the case in which only the pixels expressing one of the plurality of colors are shielded, resulting in the variations in color tone.

Further, as shown in FIG. 21, end portions of the extending portions EX3 and the extending portions EX4 which are adjacent to each other in the direction D1 may be coupled with each other in a part of the display region Ad. In such a case, the positional accuracy detected by the detecting electrodes TDL is slightly degraded when compared with the case in which the end portions of the extending portions EX3 and the extending portions EX4 which are adjacent to each other in the direction D1 are not coupled with each other in the entire display region Ad as shown in FIG. 20. However, the positional accuracy detected by the detecting electrodes TDL can be improved when compared with the case in which the end portions of the extending portions EX3 and the extending portions EX4 which are adjacent to each other in the direction D1 are coupled with each other in the entire display region Ad.

In the example shown in FIG. 21, in one dummy electrode TDD, one end of the extending portion EX3 in the direction D1 is connected with an end portion of the extending portion EX4 which is positioned on the one side of the extending portion EX3 in the direction D1. However, an end of the extending portion EX3 on the side opposite to the one side in the direction D1 is not connected with an end portion of the extending portion EX4 which is positioned on the side opposite to the one side of the extending portion EX3 in the direction D1.

<Modified Example of Detecting Electrode>

Next, a modified example of the shape and arrangement of the detecting electrodes seen in a plan view will be described. In the following, the case in which the detecting electrode is provided with a conductive line having a so-called mesh-like shape will be described.

Figure 22:
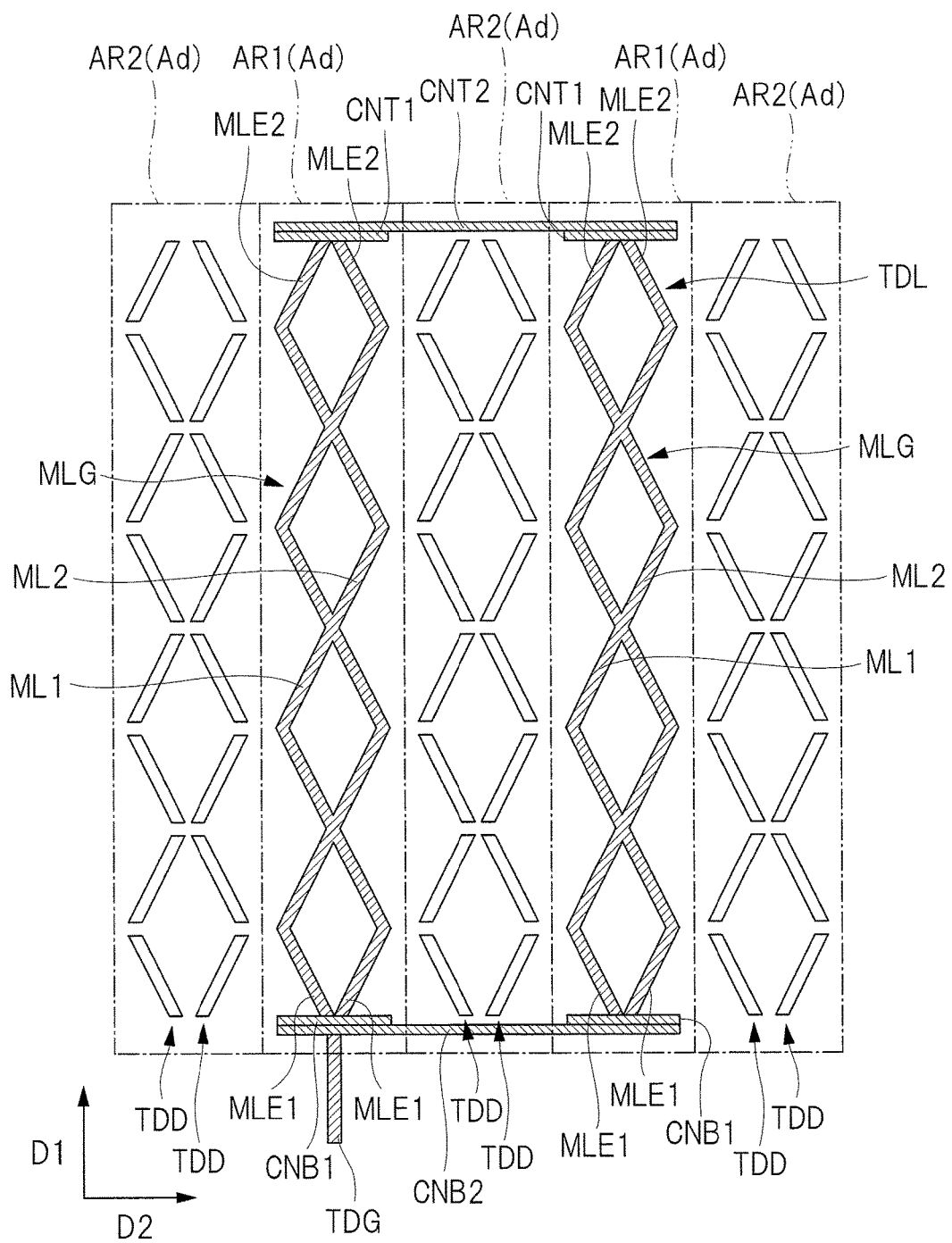
FIG. 22 is a plan view schematically showing one example of a configuration of a detecting electrode in a display device according to a first modified example of the first embodiment.
Figure 23:
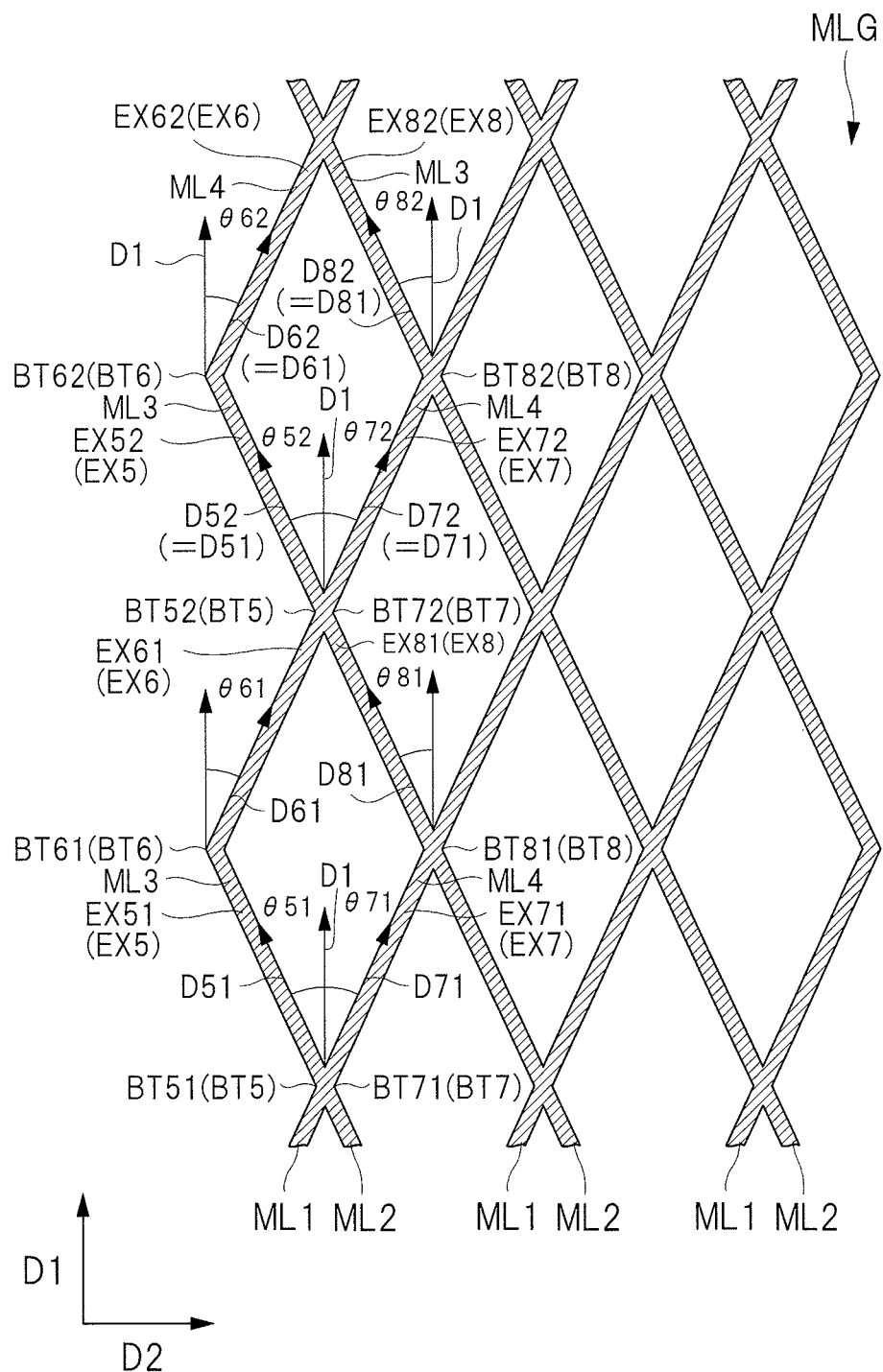
FIG. 23 is a plan view schematically showing one example of a configuration of a detecting electrode in a display device according to the first modified example of the first embodiment.

FIG. 22 and FIG. 23 are plan views schematically showing one configuration example of the detecting electrode in a display device according to a first modified example of the first embodiment. FIG. 22 shows one detecting electrode TDL from among the plurality of detecting electrodes. Also, FIG. 23 shows a part of the detecting electrode TDL in an enlarged manner. However, the example of FIG. 23 is another example different from the example shown in FIG. 22, and is an example in which six conductive lines are coupled.

Note that, since the conductive line included in the detecting electrode of the present first modified example may be similar to the conductive line ML included in the above-mentioned detecting electrodes TDL in the points of, for example, including a metal layer or an alloy layer, except for the shape seen in a plan view, namely, the planar shape, the descriptions thereof will be omitted.

Each of the plurality of detecting electrodes TDL includes conductive lines ML1 and conductive lines ML2. In the example shown in FIG. 22, one detecting electrode TDL includes two conductive lines ML1 and two conductive lines ML2. Each of the conductive lines ML1 and the conductive lines ML2 has a zigzag shape which extends in a certain direction as a whole while alternately bending in opposite directions when seen in a plan view. Also in the present first modified example, similar to the first embodiment, the direction in which each of the conductive lines ML1 and the conductive lines ML2 extends as a whole when seen in a plan view is defined as the direction D1, and the direction which intersects the direction D1 is defined as the direction D2. At this time, each of the conductive lines ML1 and the conductive lines ML2 has a zigzag shape which extends in the direction D1 as a whole while alternately bending in opposite directions when seen in a plan view. Further, portions which are bent in mutually opposite directions in the conductive lines ML1 and the conductive lines ML2 adjacent to each other in the direction D2 are coupled with each other.

As shown in FIG. 23, the conductive line ML1 includes a plurality of bent portions BT5 and a plurality of bent portions BT6. Each of the plurality of bent portions BT5 bends in a direction which is inclined to one side (left side in FIG. 23) in the direction D2 with respect to the direction D1 when seen in a plan view. Each of the plurality of bent portions BT6 bends in a direction which is inclined to the side opposite to the one side (right side in FIG. 22) in the direction D2 with respect to the direction D1 when seen in a plan view.

As shown in FIG. 23, the conductive line ML2 includes a plurality of bent portions BT7 and a plurality of bent portions BT8. Each of the plurality of bent portions BT7 bends in a direction which is inclined to the side opposite to the one side (right side in FIG. 23) in the direction D2 with respect to the direction D1 when seen in a plan view. Each of the plurality of bent portions BT8 bends in a direction which is inclined to the one side (left side in FIG. 23) in the direction D2 with respect to the direction D1 when seen in a plan view.

In the conductive line ML1, the bent portion BT5 and the bent portion BT6 are alternately disposed in the direction D1 when seen in a plan view. In the conductive line ML2, the bent portion BT7 and the bent portion BT8 are alternately disposed in the direction D1 when seen in a plan view.

As shown in FIG. 23, the conductive line ML1 includes a plurality of extending portions EX5 and a plurality of extending portions EX6. Each of the plurality of extending portions EX5 extends while inclining to one side (left side in FIG. 23) in the direction D2 with respect to the direction D1 when seen in a plan view. Also, each of the plurality of extending portions EX6 extends while inclining to the side opposite to the one side (right side in FIG. 23) in the direction D2 with respect to the direction D1 when seen in a plan view. The extending portions EX5 and the extending portions EX6 are alternately arranged in the direction D1 when seen in a plan view. Further, end portions of the extending portions EX5 and the extending portions EX6 which are adjacent to each other in the direction D1 are coupled. In this manner, the plurality of extending portions EX5 and the plurality of extending portions EX6 are integrated as conductive lines ML1.

As shown in FIG. 23, the conductive line ML2 includes a plurality of extending portions EX7 and a plurality of extending portions EX8. Each of the plurality of extending portions EX7 extends while inclining to the side opposite to the one side (right side in FIG. 23) in the direction D2 with respect to the direction D1 when seen in a plan view. Also, each of the plurality of extending portions EX8 extends while inclining to the one side (left side in FIG. 23) in the direction D2 with respect to the direction D1 when seen in a plan view. The extending portions EX7 and the extending portions EX8 are alternately arranged in the direction D1 when seen in a plan view. Further, end portions of the extending portions EX7 and the extending portions EX8 which are adjacent to each other in the direction D1 are coupled. In this manner, the plurality of extending portions EX7 and the plurality of extending portions EX8 are integrated as conductive lines ML2.

Further, each of the plurality of bent portions BT7 of the conductive line ML2 is coupled to each of the plurality of bent portions BT5 of the conductive line ML1. Consequently, the conductive line ML1 and the conductive line ML2 are integrated.

In FIG. 23, three conductive lines ML1 and three conductive lines ML2 are shown. In the example shown in FIG. 23, each of the three conductive lines ML1 includes a bent portion BT51 and a bent portion BT52 as the plurality of bent portions BT5 and a bent portion BT61 and a bent portion BT62 as the plurality of bent portions BT6. The bent portion BT51 bends in a direction D51 which is inclined to one side (left side in FIG. 23) in the direction D2 with respect to the direction D1 when seen in a plan view. The bent portion BT61 bends in a direction D61 which is inclined to the side opposite to the one side (right side in FIG. 23) in the direction D2 with respect to the direction D1 when seen in a plan view. The bent portion BT52 bends in a direction D52 which is inclined to one side (left side in FIG. 23) in the direction D2 with respect to the direction D1 when seen in a plan view. The bent portion BT62 bends in a direction D62 which is inclined to the side opposite to the one side (right side in FIG. 23) in the direction D2 with respect to the direction D1 when seen in a plan view.

In the example shown in FIG. 23, the direction D52 is an identical, namely, parallel direction to the direction D51, and the direction D62 is an identical, namely, parallel direction to the direction D61.

Note that an angle formed by the direction D51 and the direction D1 is defined as an angle θ51, an angle formed by the direction D52 and the direction D1 is defined as an angle θ52, an angle formed by the direction D61 and the direction D1 is defined as an angle θ61 and an angle formed by the direction D62 and the direction D1 is defined as an angle θ62.

Further, in the example shown in FIG. 23, each of the three conductive lines ML2 includes a bent portion BT71 and a bent portion BT72 as the plurality of bent portions BT7 and a bent portion BT81 and a bent portion BT82 as the plurality of bent portions BT8. The bent portion BT71 bends in a direction D71 which is inclined to the side opposite to the one side (right side in FIG. 23) in the direction D2 with respect to the direction D1 when seen in a plan view. The bent portion BT81 bends in a direction D81 which is inclined to the one side (left side in FIG. 23) in the direction D2 with respect to the direction D1 when seen in a plan view. The bent portion BT72 bends in a direction D72 which is inclined to the side opposite to the one side (right side in FIG. 23) in the direction D2 with respect to the direction D1 when seen in a plan view. The bent portion BT82 bends in a direction D82 which is inclined to the one side (left side in FIG. 23) in the direction D2 with respect to the direction D1 when seen in a plan view.

In the example shown in FIG. 23, the direction D72 is an identical, namely, parallel direction to the direction D71, and the direction D82 is an identical, namely, parallel direction to the direction D81.

Note that an angle formed by the direction D71 and the direction D1 is defined as an angle θ71, an angle formed by the direction D72 and the direction D1 is defined as an angle θ72, an angle formed by the direction D81 and the direction D1 is defined as an angle θ81 and an angle formed by the direction D82 and the direction D1 is defined as an angle θ82.

Further, in the example shown in FIG. 23, each of the conductive lines ML1 includes an extending portion EX51 and an extending portion EX52 as the plurality of extending portions EX5 and an extending portion EX61 and an extending portion EX62 as the plurality of extending portions EX6. The extending portion EX51 extends in the direction D51 when seen in a plan view, the extending portion EX61 extends in the direction D61 when seen in a plan view, the extending portion EX52 extends in the direction D52 when seen in a plan view and the extending portion EX62 extends in the direction D62 when seen in a plan view. In the example shown in FIG. 23, the direction D52 is an identical, namely, parallel direction to the direction D51, and the direction D62 is an identical, namely, parallel direction to the direction D61 as described above. Therefore, the extending portion EX51 and the extending portion EX52 are parallel to each other and the extending portion EX61 and the extending portion EX62 are parallel to each other.

Further, in the example shown in FIG. 23, each of the conductive lines ML2 includes an extending portion EX71 and an extending portion EX72 as the plurality of extending portions EX7 and an extending portion EX81 and an extending portion EX82 as the plurality of extending portions EX8. The extending portion EX71 extends in the direction D71 when seen in a plan view, the extending portion EX81 extends in the direction D81 when seen in a plan view, the extending portion EX72 extends in the direction D72 when seen in a plan view and the extending portion EX82 extends in the direction D82 when seen in a plan view. In the example shown in FIG. 23, the direction D72 is an identical, namely, parallel direction to the direction D71, and the direction D82 is an identical, namely, parallel direction to the direction D81 as described above. Therefore, the extending portion EX71 and the extending portion EX72 are parallel to each other and the extending portion EX81 and the extending portion EX82 are parallel to each other.

In such a case, as shown in FIG. 23, the conductive line group MLG formed by integrating the conductive lines ML1 and the conductive lines ML2 has a diamond-like shape formed by the extending portions EX51, the extending portions EX61, the extending portions EX71 and the extending portions EX81. Further, the conductive line group MLG formed by integrating the conductive lines ML1 and the conductive lines ML2 has a diamond-like shape formed by the extending portions EX52, the extending portions EX62, the extending portions EX72 and the extending portions EX82.

Figure 24:
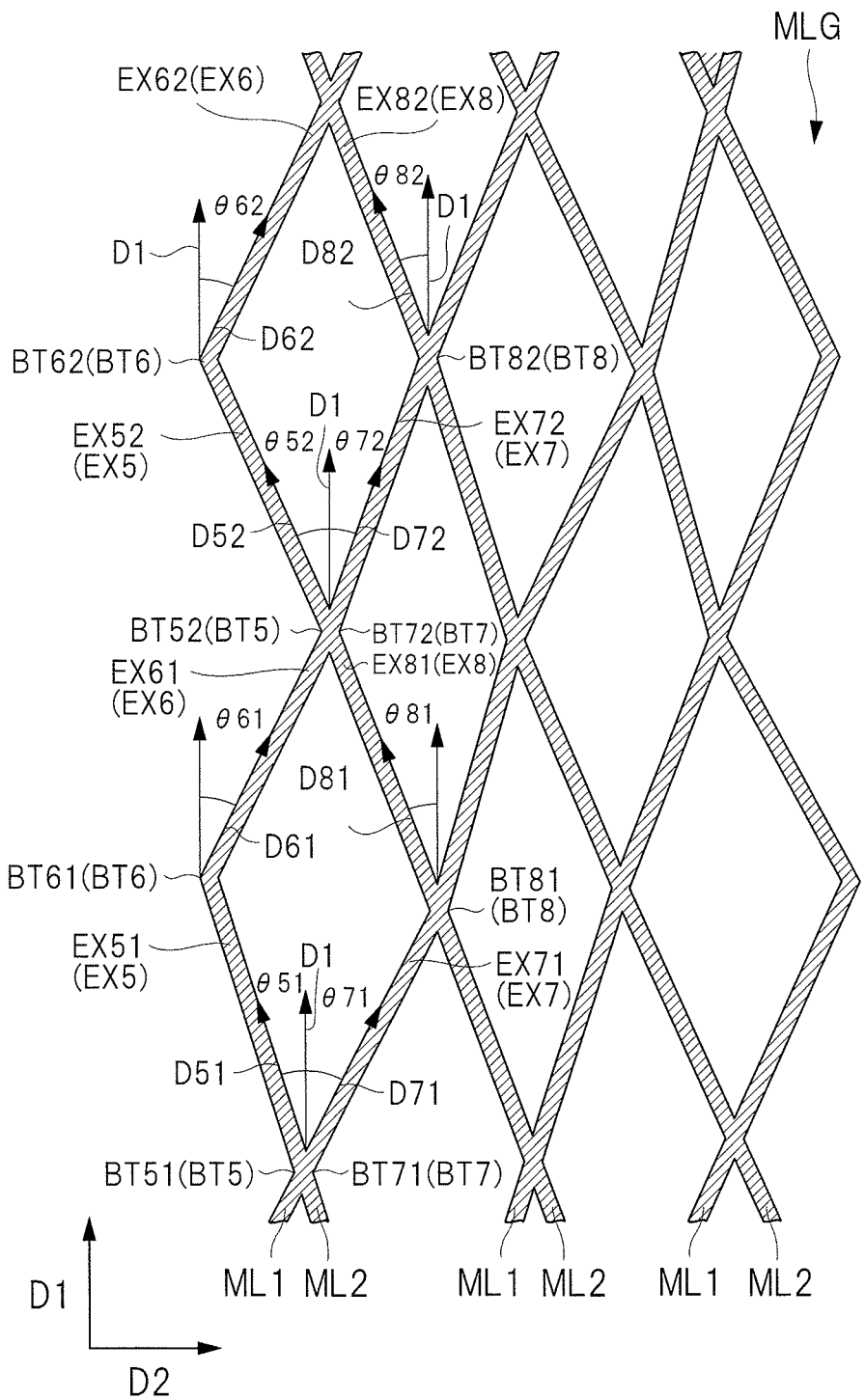
FIG. 24 is a plan view schematically showing another example of a configuration of a detecting electrode in a display device according to the first modified example of the first embodiment.

Note that the direction D52 may also be a direction different from the direction D51, namely, a direction which intersects the direction D51, and the direction D62 may also be a direction different from the direction D61, namely, a direction which intersects the direction D61. More specifically, the extending portion EX51 and the extending portion EX52 need not to be parallel to each other and the extending portion EX61 and the extending portion EX62 need not to be parallel to each other. Alternatively, the direction D72 may also be a direction different from the direction D71, namely, a direction which intersects the direction D71, and the direction D82 may also be a direction different from the direction D81, namely, a direction which intersects the direction D81. More specifically, the extending portion EX71 and the extending portion EX72 need not to be parallel to each other and the extending portion EX81 and the extending portion EX82 need not to be parallel to each other. The example like this is shown in FIG. 24. FIG. 24 is a plan view schematically showing another example of the detecting electrode in the display device according to the first modified example of the first embodiment.

By coupling and integrating the conductive lines ML1 and the conductive lines ML2 in this manner, for example, even when the conductive lines ML1 are partially disconnected, it is possible to make current flow while bypassing the conductive lines ML2, and the detection by the detecting electrodes TDL can be performed. Alternatively, even when the conductive lines ML2 are partially disconnected, it is possible to make current flow while bypassing the conductive lines ML1, and the detection by the detecting electrodes TDL can be performed. It is accordingly possible to prevent or suppress the degradation in the detecting sensitivity by the detecting electrodes TDL due to the partial disconnection of the conductive lines ML1 or the conductive lines ML2.

Alternatively, in the example shown in FIG. 23, the extending portions EX51 may be defined as conductive lines ML3 which extend in the direction D51, the extending portions EX81 and the extending portions EX52 may be integrated and defined as conductive lines ML3 which extend in the direction D51 which is identical to the direction D81 and the direction D52, and the extending portions EX82 may be defined as conductive lines ML3 which extend in the direction D51 which is identical to the direction D82. On the other hand, the extending portions EX71 may be defined as conductive lines ML4 which extend in the direction D71, the extending portions EX61 and the extending portions EX72 may be integrated and defined as conductive lines ML4 which extend in the direction D71 which is identical to the direction D61 and the direction D72, and the extending portions EX62 may be defined as conductive lines ML4 which extend in the direction D71 which is identical to the direction D62.

At this time, each of the plurality of detecting electrodes TDL includes a plurality of conductive lines ML3 which extend in the direction D51 and are arranged in the direction D1 which intersects the direction D51 and a plurality of conductive lines ML4 which extend in the direction D71 which intersects both of the direction D51 and the direction D1 and are arranged in the direction D1. The plurality of conductive lines ML3 and the plurality of conductive lines ML4 intersect each other when seen in a plan view. Further, each of the plurality of detecting electrodes TDL has a mesh-like shape formed by the plurality of conductive lines ML3 and the plurality of conductive lines ML4 which intersect each other when seen in a plan view.

For example, it is also possible to form the plurality of conductive lines ML3 and then form the plurality of conductive lines ML4. At this time, it is preferable that each of the plurality of conductive lines ML3 includes a metal layer or an alloy layer like the conductive lines ML of the first embodiment and each of the plurality of conductive lines ML4 includes a metal layer or an alloy layer like the conductive lines ML of the first embodiment. Further, it is preferable that each of the plurality of conductive lines ML3 and each of the plurality of conductive lines ML4 are electrically connected at intersecting portions at which each of the plurality of conductive lines ML3 and each of the plurality of conductive lines ML4 intersect each other when seen in a plan view. Accordingly, each of the metal layer or alloy layer included in each of the plurality of conductive lines ML4 may be formed in the same layer as the metal layer or alloy layer included in each of the plurality of conductive lines ML3, and may be formed in, for example, a layer immediately above the metal layer or alloy layer included in each of the plurality of conductive lines ML3.

In the example shown in FIG. 22, each of the plurality of detecting electrodes TDL includes a plurality of connecting portions CNB1, a plurality of connecting portions CNT1, a connecting portion CNB2 and a connecting portion CNT2. Each of the plurality of connecting portions CNB1 electrically connects end portions MLE1 of adjacent conductive lines ML1 and conductive lines ML2 on one side (lower side in FIG. 22) in the direction D1. Each of the plurality of connecting portions CNT1 electrically connects end portions MLE2 of adjacent conductive lines ML1 and conductive lines ML2 on the side opposite to the one side (upper side in FIG. 22) in the direction D1. The connecting portion CNB2 electrically connects the plurality of connecting portions CNB1 and the connecting portion CNT2 electrically connects the plurality of connecting portions CNT1.

The connecting portion CNB2 is connected with the touch detection unit 40 shown in FIG. 1 via the detection wiring TDG. Also, the conductive lines ML1 and the conductive lines ML2 included in the detecting electrodes TDL are electrically connected with the connecting portion CNB2 via the connecting portion CNB1. Accordingly, the conductive lines ML1 and the conductive lines ML2 included in the detecting electrodes TDL are connected with the touch detection unit 40 shown in FIG. 1 via the connecting portions CNB1, the connecting portion CNB2 and the detection wiring TDG.

As described above, the detecting electrodes TDL can include the conductive line group MLG made up of the conductive lines ML1 and the conductive lines ML2 arranged in the direction D2. Consequently, since it is possible to reduce the electric resistance of the detecting electrodes TDL, the detecting sensitivity or the detecting speed when performing the detection operations by the detecting electrodes TDL can be improved.

The display device 1 of the present first modified example also preferably includes a plurality of dummy electrodes TDD like the display device 1 of the first embodiment. Each of the plurality of dummy electrodes TDD is provided in a region AR2 corresponding to the region other than a region AR1 in which the conductive line group MLG made up of the conductive lines ML1 and the conductive lines ML2 is formed in the display region Ad, that is, in the region AR2 in which the conductive line group MLG is not formed in the display region Ad. In other words, each of the plurality of dummy electrodes TDD is provided in the display region Ad between the conductive lines ML1 and the conductive lines ML2 which are formed apart from each other. Alternatively, each of the plurality of dummy electrodes is provided so as to be separate from all of the plurality of detecting electrodes TDL in the display region Ad. Note that it is not necessary to provide a plurality of dummy electrodes TDD, and only one dummy electrode may be provided. Further, the shape and material of the dummy electrodes TDD may be similar to the shape and material of the dummy electrodes TDD of the display device 1 of the first embodiment, and the descriptions thereof will be omitted.

Also in the display device 1 of the present first modified example, by forming the dummy electrodes TDD in the region AR2 in which the conductive lines ML1 and the conductive lines ML2 with light-shielding properties are not formed, it is possible to prevent or suppress the occurrence of the case in which the transmittance with respect to visible light in the entire region AR2 becomes larger than the transmittance with respect to visible light in the entire region AR1. Consequently, it becomes possible to prevent or suppress the difference in brightness from occurring between the region AR1 and the region AR2, and it is possible to prevent or suppress the detecting electrodes TDL from being recognized.

Figure 25:
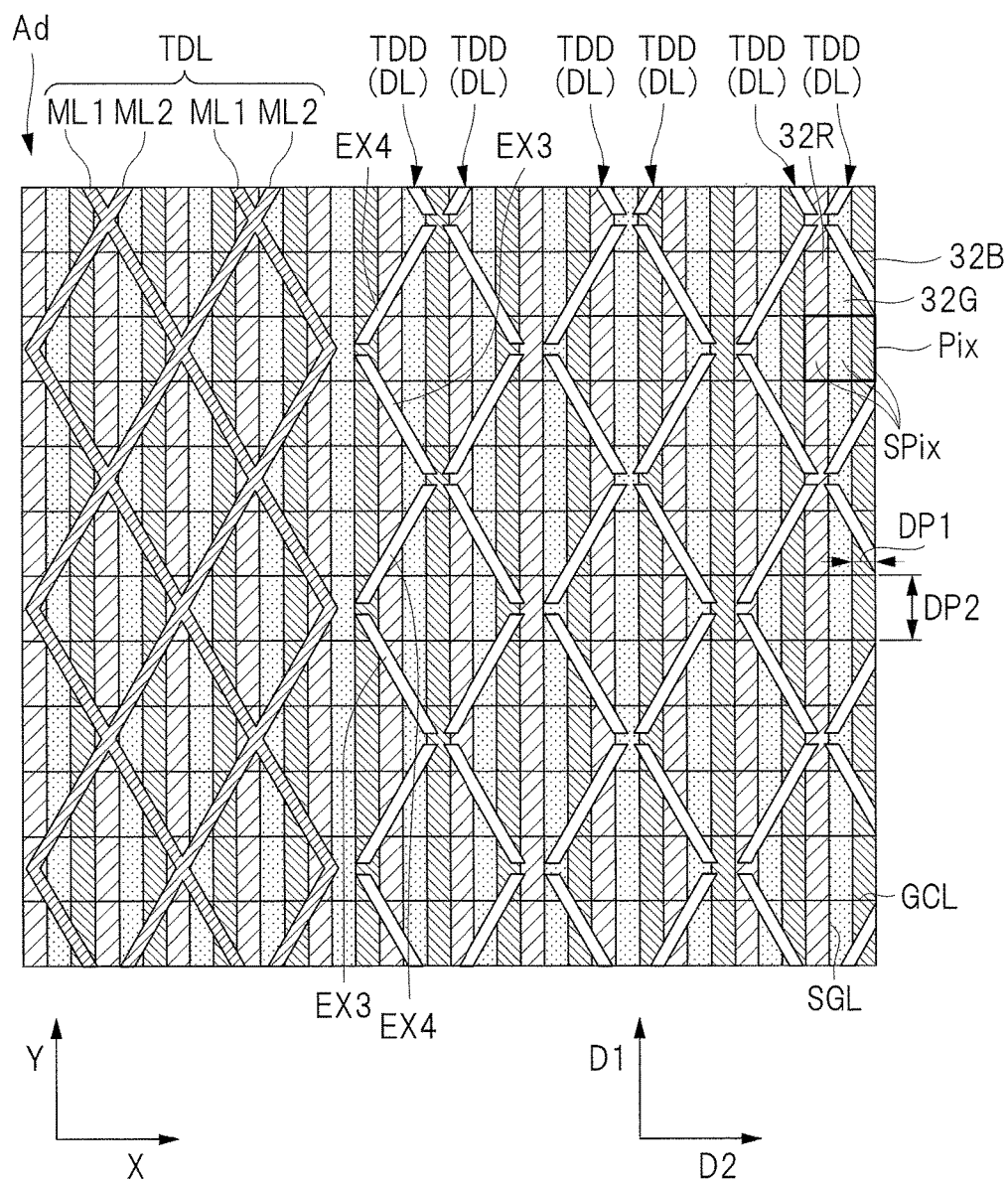
FIG. 25 is a plan view schematically showing one example of a relationship between positions of detecting electrodes and positions of pixels in the display device according to the first modified example of the first embodiment.

FIG. 25 is a plan view schematically showing one example of a relationship between positions of detecting electrodes and positions of pixels in the display device according to the first modified example of the first embodiment.

Also in the present first modified example, the plurality of pixels Pix are arranged in a matrix form in the X axis direction and the Y axis direction in the display region Ad like the first embodiment. In the example shown in FIG. 25, the pixel Pix includes a plurality of sub-pixels SPix respectively corresponding to each of the color regions 32R, 32G and 32B of the three colors of R (red), G (green) and B (blue). Accordingly, the plurality of sub-pixels SPix are arranged in a matrix form in the X axis direction and the Y axis direction in the display region Ad. Note that the kinds of colors displayed by the sub-pixels SPix are not limited to three kinds. For example, the pixel Pix may include four types of sub-pixels SPix displaying each of the four colors of R (red), G (green), B (blue) and W (white).

The plurality of sub-pixels SPix are arranged in a matrix form in the direction in which the scanning line GCL extends (X axis direction) and the direction in which the signal line SGL extends (Y axis direction). The scanning lines GCL and the signal lines SGL or light-shielding portions BM1 and BM2 (see FIG. 27 to be described later) which are formed so as to cover the scanning lines GCL and the signal lines SGL suppress the transmission of light. Accordingly, in the images displayed in the display region Ad, the pattern of the scanning lines GCL or the pattern of the signal lines SGL may interfere with the pattern of the detecting electrodes TDL, so that a light and shade stripe pattern such as a moire pattern is observed, and there is the fear that the visibility of the image displayed in the display region Ad is degraded.

In the example shown in FIG. 25, the direction D1 in which the conductive lines ML extend as a whole is a direction which is identical, namely, parallel to the Y axis direction in which the sub-pixels SPix are arranged. However, in the display device 1 according to the present first modified example of the first embodiment, the conductive lines ML1 preferably include extending portions EX51 (see FIG. 23) which extend in, for example, the direction D51 which intersects both of the X axis direction and the Y axis direction. Further, the conductive lines ML2 include extending portions EX71 (see FIG. 23) which extend in, for example, the direction D71 which intersects both of the X axis direction and the Y axis direction. Then, an angle formed by the direction D51 in which the extending portions EX51 extend and the Y axis direction in which the sub-pixels SPix are arranged is an angle θ51, and an angle formed by the direction D71 in which the extending portions EX71 extend and the Y axis direction in which the sub-pixels SPix are arranged is an angle θ71.

The angle θ51 and the angle θ71 are set to proper angles which are larger than 0 degree and smaller than 90 degrees. At this time, the conductive lines ML1 include portions which extend in the direction D51 which intersects both of the X axis direction and the Y axis direction when seen in a plan view, and the conductive lines ML2 include portions which extend in the direction D71 which intersects both of the X axis direction and the Y axis direction when seen in a plan view. Consequently, it is possible to prevent or suppress the occurrence of the case in which the pattern of the scanning lines GCL or the pattern of the signal lines SGL interferes with the pattern of the detecting electrodes TDL and a light and shade stripe pattern such as a moire pattern is observed.

Figure 26:
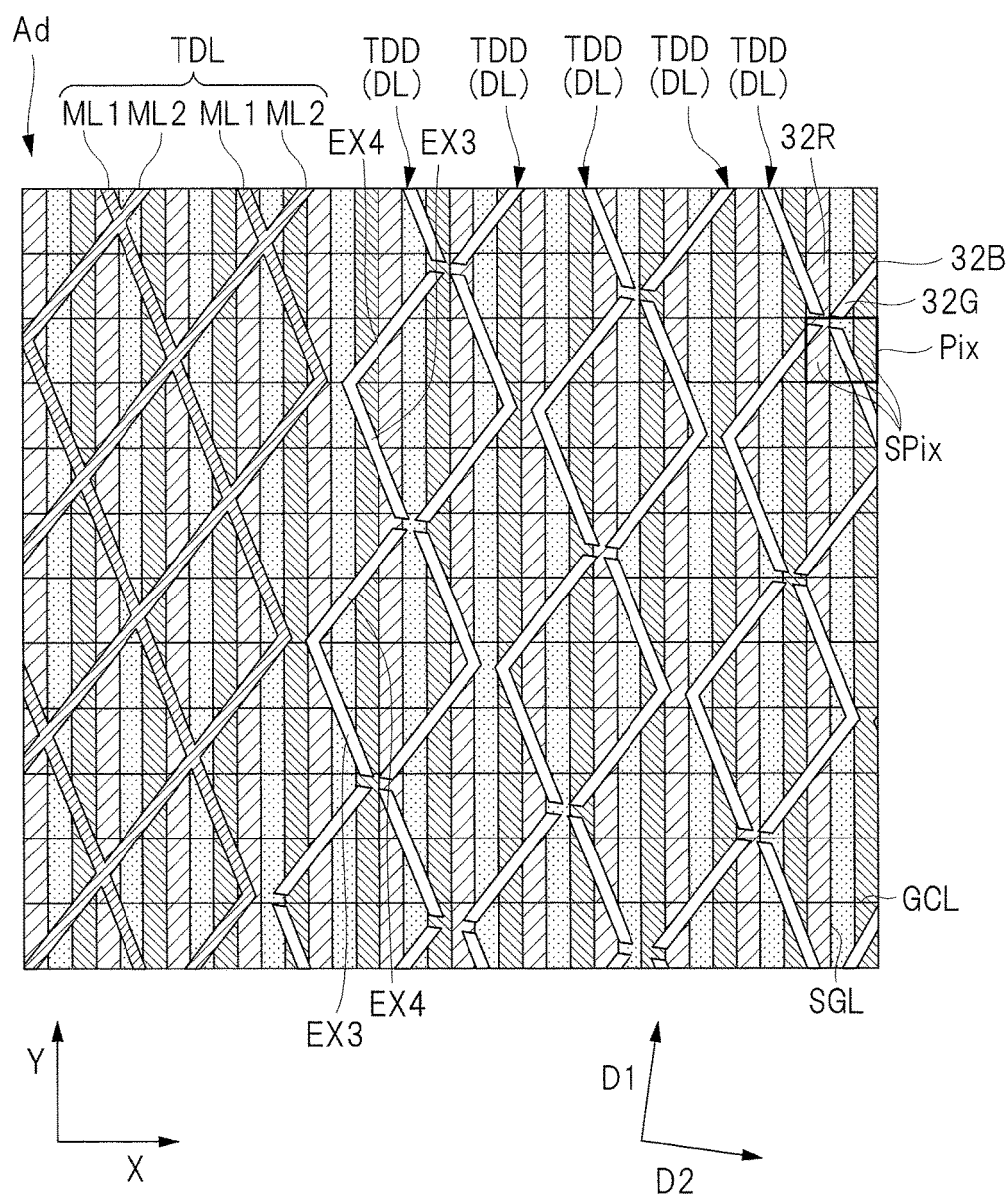
FIG. 26 is a plan view schematically showing another example of a relationship between positions of detecting electrodes and positions of pixels in the display device according to the first modified example of the first embodiment.

On the other hand, the direction D1 in which each of the conductive lines ML1 and the conductive lines ML2 extend as a whole may also be a direction different from the Y axis direction in which the sub-pixels SPix are arranged, namely, a direction which intersects the Y axis direction. The example like this is shown in FIG. 26. FIG. 26 is a plan view schematically showing another example of a relationship between positions of detecting electrodes and positions of pixels in the display device according to the first modified example of the first embodiment.

In the example shown in FIG. 26, the direction D2 in which the conductive lines ML1 and the conductive lines ML2 are arranged is a direction different from the X axis direction in which the sub-pixels SPix are arranged, namely, a direction which intersects the X axis direction. Consequently, a direction of periodicity of color distribution based on the arrangement of the sub-pixels SPix differs from a direction of periodicity of transmittance distribution based on the arrangement of the conductive lines ML1 and the conductive lines ML2. Accordingly, by arranging the conductive lines ML1 and the conductive lines ML2 with light-shielding properties, it is possible to prevent or suppress the occurrence of the case in which only the pixels expressing one of the plurality of colors are shielded, resulting in the variations in color tone.

Further, as shown in FIG. 26, end portions of the extending portions EX3 and the extending portions EX4 which are adjacent to each other in the direction D1 may be coupled with each other in a part of the display region Ad. In such a case, the positional accuracy detected by the detecting electrodes TDL is slightly degraded when compared with the case in which the end portions of the extending portions EX3 and the extending portions EX4 which are adjacent to each other in the direction D1 are not coupled with each other in the entire display region Ad as shown in FIG. 25. However, the positional accuracy detected by the detecting electrodes TDL can be improved when compared with the case in which the end portions of the extending portions EX3 and the extending portions EX4 which are adjacent to each other in the direction D1 are coupled with each other in the entire display region Ad.

In the example shown in FIG. 26, in one dummy electrode TDD, one end of the extending portion EX3 in the direction D1 is connected with an end portion of the extending portion EX4 which is positioned on the one side of the extending portion EX3 in the direction D1. However, an end of the extending portion EX3 on the side opposite to the one side in the direction D1 is not connected with an end portion of the extending portion EX4 which is positioned on the side opposite to the one side of the extending portion EX3 in the direction D1.

<Area Ratio of Detecting Electrodes and Dummy Electrodes>

Figure 27:
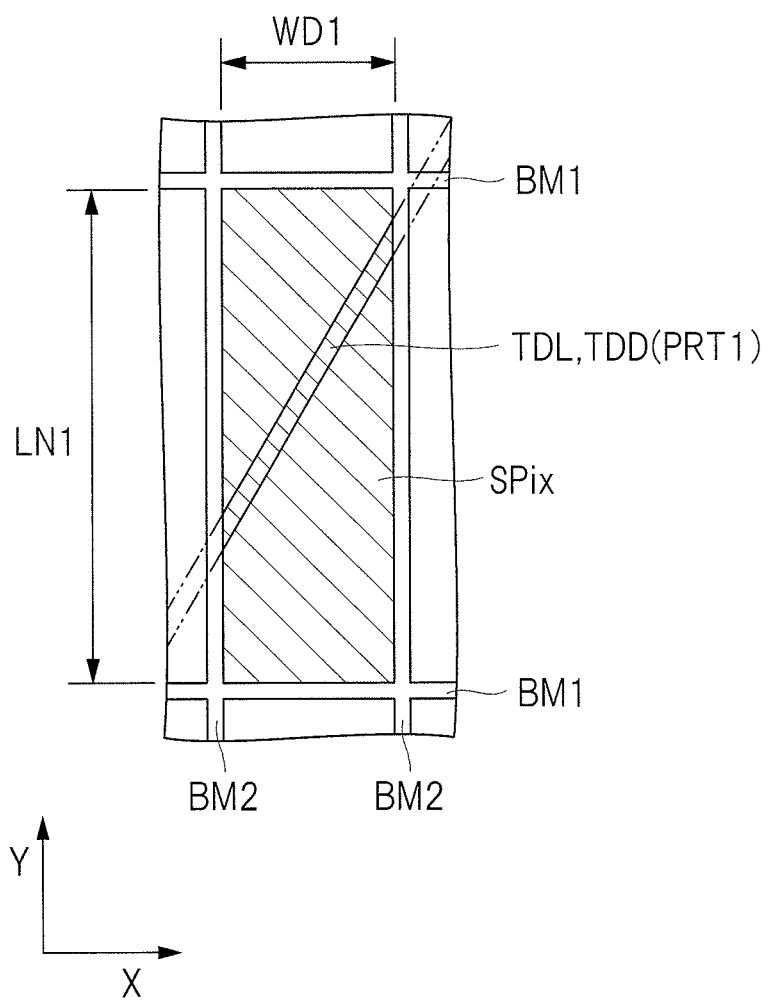
FIG. 27 is a plan view schematically showing one example of a relationship between positions of sub-pixels and positions of detecting electrodes in the display device according to the first embodiment.

FIG. 27 is a plan view schematically showing one example of a relationship between positions of sub-pixels and positions of detecting electrodes in the display device according to the first embodiment.

As shown in FIG. 27, a sub-pixel SPix which overlaps any of the plurality of detecting electrodes TDL and the plurality dummy electrodes TDD when seen in a plan view from among the plurality of sub-pixels SPix will be considered. A width of the sub-pixel SPix in the X axis direction is defined as a width WD1 and a length of the sub-pixel SPix in the Y axis direction is defined as a length LN1. Also, the width WD1 of the sub-pixel SPix in the X axis direction is defined to be smaller than the length LN1 of the sub-pixel SPix in the Y axis direction. At this time, an area S1 of one sub-pixel SPix is given by the following equation (1):

$$S1 = WD1 \times LN1 \quad (1)$$

On the other hand, an area of a portion PRT1 of the one sub-pixel SPix which overlaps any of the plurality of detecting electrodes TDL and the plurality dummy electrodes TDD when seen in a plan view is defined as an area S2, and an a ratio of the area S2 to the area S1 of the sub-pixel SPix is defined as a ratio R1. At this time, the ratio R1 is given by the following equation (2):

$$R1 = S2/S1 \quad (2)$$

Note that, as shown in FIG. 27, the display device 1 includes a plurality of light-shielding portions BM1 and a plurality of light-shielding portions BM2. Each of the plurality of light-shielding portions BM1 is formed so as to overlap the scanning lines GCL (see FIG. 15) when seen in a plan view, extends in the X axis direction and has light-shielding properties with respect to visible light. Each of the plurality of light-shielding portions BM2 is formed so as to overlap the signal lines SGL (see FIG. 15) when seen in a plan view, extends in the Y axis direction and has light-shielding properties with respect to visible light. The plurality of light-shielding portions BM1 and the plurality of light-shielding portions BM2 intersect each other when seen in a plan view, and the plurality of light-shielding portions BM1 and the plurality of light-shielding portions BM2 which intersect each other when seen in a plan view have a lattice-like shape. Also, each of the plurality of sub-pixels SPix is demarcated by the plurality of light-shielding portions BM1 and the plurality of light-shielding portions BM2 which intersect each other when seen in a plan view and have a lattice-like shape. Accordingly, the area S1 of the sub-pixel SPix indicates an area of a region which is surrounded by the light-shielding portions BM1 and the light-shielding portions BM2 and does not include the area of the light-shielding portions BM1 and the area of the light-shielding portions BM2.

Note that the area S2 of a sub-pixel SPix which does not overlap any of the plurality of detecting electrodes TDL and does not overlap any of the plurality of dummy electrodes TDD is zero. Accordingly, the ratio R1 which is given by the above equation (2) is zero.

In the entire display region Ad, the total sum of the areas S1 of each of the plurality of sub-pixels SPix arranged in a matrix form in the X axis direction and the Y axis direction is defined as an area S3. Then, in the entire display region Ad, the total sum of the areas of the portions PRT1 in the plurality of sub-pixels SPix which overlap any of the plurality of detecting electrodes TDL and the plurality dummy electrodes TDD when seen in a plan view is defined as an area S4, and a ratio of the area S4 to the area S3 is defined as an area ratio R2. At this time, the area ratio R2 is given by the following equation (3):

$$R2 = S4/S3 \quad (3)$$

In the display device 1 according to the present first embodiment, the area ratio R2 given by the above equation (3) is 1 to 22%. More specifically, in the display device 1 according to the present first embodiment, the ratio of total sum of the areas of portions of the plurality of sub-pixels SPix that overlap any of the plurality of detecting electrodes TDL and the plurality of dummy electrodes TDD when seen in a plan view to total sum of the areas of the plurality of sub-pixels SPix is 1 to 22%. Consequently, as described above, even when the transmittance of the plurality of conductive lines ML themselves with respect to visible light is 10% or less, the transmittance of the entire display region Ad, namely, the transmittance of the display device 1 can be made to be 90% or more. Further, it is possible to prevent or suppress the detected values of the detecting signals Vdet (see FIG. 6) from being small. Accordingly, in a display device provided with an input device, the transmittance of the display region with respect to visible light can be improved and the detection performance of the input device can be improved.

Note that it is also possible to provide only the detecting electrodes TDL in the display region Ad without providing any dummy electrodes TDD. At this time, the area S2 is an area of a portion PRT1 of one sub-pixel SPix which overlaps any of the plurality of detecting electrodes TDL when seen in a plan view, and the area S4 is total sum of the areas of portions PRT1 of the plurality of sub-pixels SPix which overlap any of the plurality of detecting electrodes TDL when seen in a plan view. Also, the area ratio R2 is a ratio of total sum of the areas of portions of the plurality of sub-pixels SPix which overlap any of the plurality of detecting electrodes TDL when seen in a plan view to total sum of the areas of the plurality of sub-pixels SPix. Further, also in the case where no dummy electrodes TDD are provided and only the detecting electrodes TDL are provided, the area ratio R2 is similarly 1 to 22%. More specifically, a preferable range for the area ratio R2 in the case where no dummy electrodes TDD are provided and only the detecting electrodes TDL are provided is the same as the preferable range for the area ratio R2 in the case where the detecting electrodes TDL and the dummy electrodes TDD are provided.

<Area Ratio in Display Device of First Embodiment>

Next, a preferable range for the area ratio in the case of the display device 1 according to the first embodiment, namely, in the case where the detecting electrodes include conductive lines having a zigzag shape will be described. Here, a plurality of display devices were prepared such that the area ratios R2 fell within the range from 0.49 to 24.58%. Then, the display devices were used to evaluate transmittance in the display region Ad, detected values of the detecting signals and visibility.

The cases with the area ratio R2 of less than 1% were defined as Comparative Examples 1 to 3, the cases with the area ratio R2 of 1 to 22% were defined as Examples 1 to 25 and the cases with the area ratio R2 of more than 22% were defined as Comparative Examples 4 to 6. For evaluating the visibility, whether or not the visibility was favorable without causing any problems in the image displayed in the display region Ad due to visible light being reflected by the detecting electrodes TDL or the dummy electrodes TDD, namely, whether or not the reflection appearance was favorable was evaluated.

Figure 28:
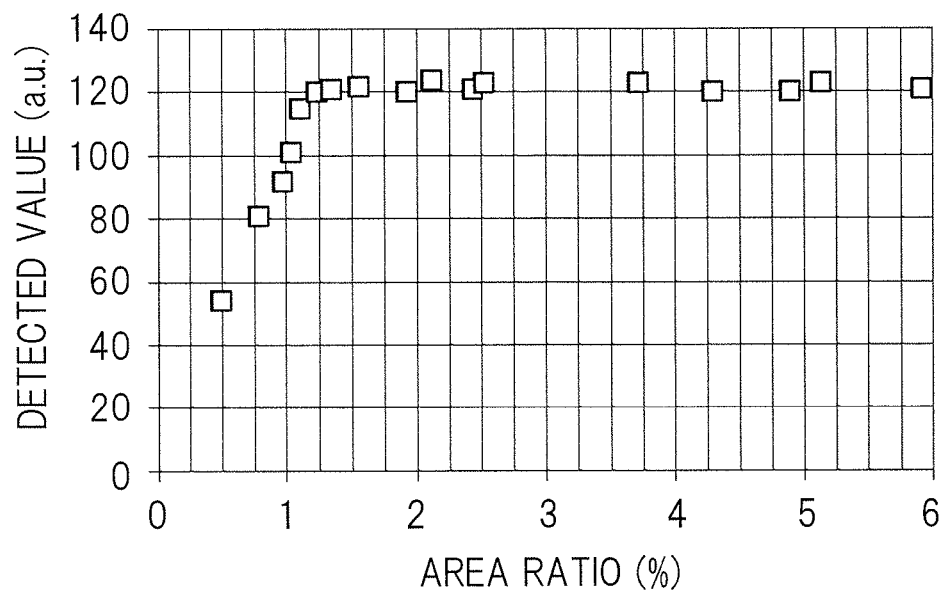
FIG. 28 is a graph showing a relationship between detected values and area ratios in Table 1.

Concretely, when the detecting electrodes TDL had a zigzag shape, it was evaluated whether or not the detecting electrodes TDL or the dummy electrodes TDD appeared in a stripe shape, that is, in a linear shape, namely, whether reflection stripes were observed in the image displayed in the display region Ad due to the reflection of the visible light by the detecting electrodes TDL or the dummy electrodes TDD. The evaluation results are shown in Table 1. Also, the relationship between the area ratios and the detected values in Table 1 is shown in the graph of FIG. 28. The horizontal axis of FIG. 28 represents the area ratio R2 and the longitudinal axis of FIG. 28 represents the detected value.

TABLE 1

| | Area ratio (%) | Transmittance (%) | Detected value (a.u.) | Evaluation of Visibility |
|---|---|---|---|---|
| Comparative Example 1 | 0.49 | 99.8 | 54 | ⊚ |
| Comparative Example 2 | 0.78 | 99.6 | 81 | ⊚ |
| Comparative Example 3 | 0.97 | 99.5 | 92 | ⊚ |
| Example 1 | 1.04 | 99.5 | 101 | ⊚ |
| Example 2 | 1.11 | 99.4 | 115 | ⊚ |
| Example 3 | 1.23 | 99.4 | 120 | ⊚ |
| Example 4 | 1.34 | 99.3 | 121 | ⊚ |
| Example 5 | 1.55 | 99.2 | 122 | ⊚ |
| Example 6 | 1.92 | 99.0 | 120 | ⊚ |
| Example 7 | 2.11 | 99.2 | 124 | ⊚ |
| Example 8 | 2.43 | 98.8 | 121 | ⊚ |
| Example 9 | 2.52 | 98.6 | 123 | ⊚ |
| Example 10 | 3.71 | 98.3 | 123 | ⊚ |
| Example 11 | 4.29 | 98.2 | 120 | ⊚ |
| Example 12 | 4.89 | 97.9 | 120 | ⊚ |
| Example 13 | 5.13 | 97.4 | 123 | ○ (Reflection stripe) |
| Example 14 | 5.91 | 97.7 | 121 | ○ (Reflection stripe) |
| Example 15 | 6.99 | 97.5 | 122 | ○ (Reflection stripe) |
| Example 16 | 8.06 | 97.2 | 124 | ○ (Reflection stripe) |
| Example 17 | 9.48 | 96.4 | 120 | ○ (Reflection stripe) |
| Example 18 | 10.31 | 95.8 | 123 | ○ (Reflection stripe) |
| Example 19 | 10.89 | 95.3 | 121 | ○ (Reflection stripe) |
| Example 20 | 11.41 | 95.2 | 120 | Δ (Reflection stripe) |
| Example 21 | 12.58 | 94.2 | 123 | Δ (Reflection stripe) |
| Example 22 | 14.99 | 93.5 | 121 | Δ (Reflection stripe) |
| Example 23 | 17.65 | 91.8 | 122 | Δ (Reflection stripe) |
| Example 24 | 19.61 | 91.1 | 124 | Δ (Reflection stripe) |
| Example 25 | 21.88 | 90.3 | 125 | Δ (Reflection stripe) |
| Comparative Example 4 | 22.13 | 89.9 | 124 | Δ (Reflection stripe) |
| Comparative Example 5 | 23.78 | 89.1 | 122 | Δ (Reflection stripe) |
| Comparative Example 6 | 24.58 | 88.7 | 123 | Δ (Reflection stripe) |

In Table 1, the cases in which no reflection stripes were observed in the image displayed in the display region Ad and the visibility of the image was favorable are indicated by double circle "⊚". Also, the cases in which some reflection stripes were observed in the image displayed in the display region Ad but the reflection stripes were not noticeable and the visibility of the image was acceptable are indicated by circle "○ (Reflection stripe)". Further, the cases in which reflection stripes were observed in the image displayed in the display region Ad, the reflection stripes were noticeable and the visibility of the images was not acceptable are indicated by triangle "Δ (Reflection stripe)".

As shown in Table 1, when the area ratio R2 is 0.49 to 24.58% (Comparative Examples 1 to 3, Examples 1 to 25 and Comparative Examples 4 to 6), the transmittance in the display region Ad decreases as the area ratio R2 increases. More specifically, as the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix increases, the transmittance in the display region Ad decreases. On the other hand, it is desirable that the transmittance in the display region Ad is 90% or more. Accordingly, the area ratio R2 is preferably 22% or less.

Further, as shown in Table 1 and FIG. 28, when the area ratio R2 is 1.2 to 24.58% (Examples 3 to 25 and Comparative Examples 4 to 6), the detected values are constant regardless of the area ratio R2. This is considered to be due to the fact that difference of electrostatic capacitance between the conductive lines ML and the driving electrodes COML due to presence/absence of touches is constant regardless of the area ratio R2 when the area ratio R2 is 1.2 to 24.58%.

However, when the area ratio R2 is 1.0% or more and less than 1.2% (Examples 1 and 2), the detected values start to decrease as the area ratio R2 decreases, and when the area ratio R2 is 0.49% or more and less than 1.0% (Comparative Examples 1 to 3), the detected values abruptly decrease as the area ratio R2 decreases. This is considered to be due to the fact that the electrostatic capacitance between the conductive lines ML and the driving electrodes COML is decreased due to the decrease of the area ratio R2 and the intensity of the detecting signals Vdet becomes small.

Moreover, as shown in Table 1, when the area ratio is 0.49 to 5% (Comparative Examples 1 to 3 and Examples 1 to 12), no reflection stripes are observed in the image displayed in the display region Ad, and the visibility is favorable. Also, when the area ratio is more than 5% and 11% or less (Examples 13 to 19), some reflection stripes are observed in the image displayed in the display region Ad, but the reflection stripes are not noticeable and the visibility of the image is acceptable. Further, when the area ratio is more than 11% (Examples 20 to 25 and Comparative Examples 4 to 6), reflection stripes are observed in the image displayed in the display region Ad, the reflection stripes are noticeable, and the visibility of the image is not acceptable.

From the results of the Comparative Examples 1 to 3, the Examples 1 to 25 and the Comparative Examples 4 to 6, the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix, namely, the area ratio R2 is preferably 1 to 22%.

When the area ratio R2 is less than 1%, there is the fear that the detected values of the detecting signals Vdet are extremely small. Further, when the area ratio R2 is more than 22%, there is the fear that the transmittance in the display region Ad becomes less than 90%. On the other hand, by setting the area ratio R2 to be 1 to 22%, it is possible to achieve the transmittance in the display region Ad of 90% or more while preventing the detected values of the detecting signals Vdet from being too small. Accordingly, in a display device provided with an input device, the transmittance of the display region with respect to visible light can be improved and the detection performance of the input device can be improved.

Further, when the detecting electrodes TDL include conductive lines ML with a zigzag shape, the area ratio R2 is more preferably 1 to 11%. Consequently, it is possible to prevent and suppress the occurrence of the case in which reflection stripes are observed in the image displayed in the display region Ad and the visibility of the image is degraded.

Further, when the detecting electrodes TDL include conductive lines ML with a zigzag shape, the area ratio R2 is even more preferably 1.2 to 5%. Consequently, it is possible to further prevent and suppress the occurrence of the case in which reflection stripes are observed in the image displayed in the display region Ad and the visibility of the image is degraded.

Note that, in the Examples 1 to 25 and the Comparative Examples 1 to 6, the area ratio R2 was changed in a state in which the ratio of the area of the detecting electrodes TDL and the area of the dummy electrodes TDD was set to 1:2. On the other hand, the same results as the above-described results were obtained also in the cases in which the ratio of the area of the detecting electrodes TDL and the area of the dummy electrodes TDD was changed to various values. Further, also in the cases in which no dummy electrodes TDD were provided and only the detecting electrodes TDL were provided, the same results as the above-described results were obtained. Accordingly, the preferable range for the area ratio R2 in the case in which no dummy electrodes TDD are provided and only the detecting electrodes TDL are provided is the same as the preferable range for the area ratio R2 in the case in which the detecting electrodes TDL and the dummy electrodes TDD are provided.

Also, the effects which the above-described preferable range for the area ratio R2 exhibits on transmittance, visibility and detected values are more remarkable when an arrangement interval DP1 of the plurality of sub-pixels SPix in the X axis direction (see FIG. 20) is 45 to 180 μm. Here, the arrangement interval DP1 of the plurality of sub-pixels SPix in the X axis direction (see FIG. 20) is smaller than the arrangement interval DP2 of the plurality of sub-pixels SPix in the Y axis direction (see FIG. 20). Accordingly, when the display device 1 according to the present first embodiment is applied to electronic devices having a relatively small arrangement interval of the sub-pixels SPix such as smartphones as will be described later in the fifth embodiment, the effects exhibited on visibility when the area ratio R2 is in the above-described range are extremely large.

<Area Ratio in Display Device of First Modified Example of First Embodiment>

Next, a preferable range for the area ratio in the case of the display device 1 according to the first modified example of the first embodiment, namely, the case in which the detecting electrodes include conductive lines having a mesh-like shape will be described. Here, a plurality of display devices were prepared such that the area ratios R2 fell within the range from 0.49 to 24.58%. Then, the display devices were used to evaluate transmittance in the display region Ad, detected values of the detecting signals and visibility.

The cases with the area ratio R2 of less than 1% were defined as Comparative Examples 7 to 9, the cases with the area ratio R2 of 1 to 22% were defined as Examples 26 to 50 and the cases with the area ratio R2 of more than 22% were defined as Comparative Examples 10 to 12. For evaluating the visibility, whether or not the visibility was favorable without causing any problems in the image displayed in the display region Ad due to visible light being reflected by the detecting electrodes TDL or the dummy electrodes TDD, namely, whether or not the reflection appearance was favorable was evaluated.

Figure 29:
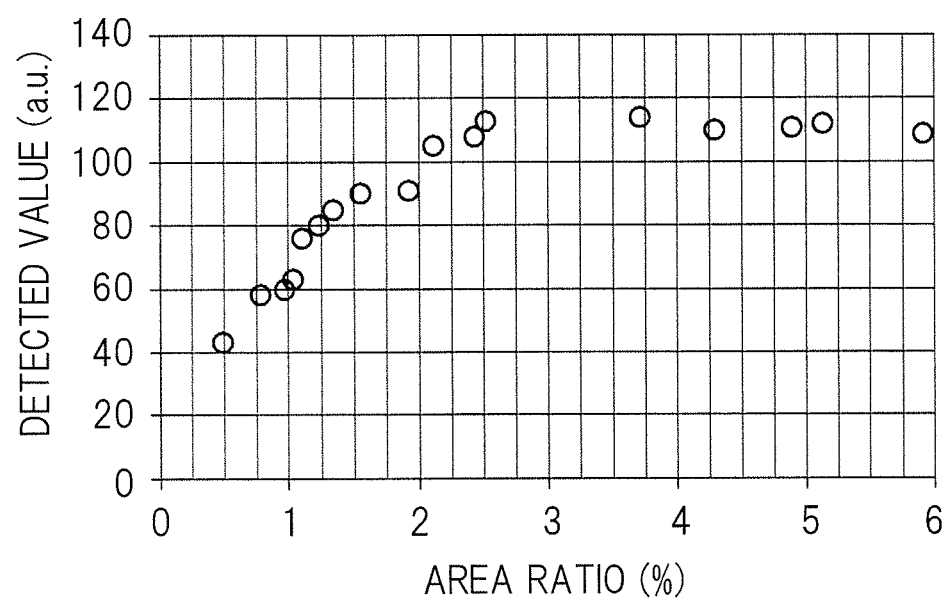
FIG. 29 is a graph showing a relationship between detected values and area ratios in Table 2.

Concretely, when the detecting electrodes had a mesh-like shape, it was evaluated whether or not the image displayed in the display region Ad appeared to be shiny due to reflection of visible light by the detecting electrodes TDL or the dummy electrodes TDD though no reflection stripes were observed, namely, whether or not glares were observed. The evaluation results are shown in Table 2. Also, the relationship between the area ratios and the detected values in Table 2 is shown in the graph of FIG. 29. The horizontal axis of FIG. 29 represents the area ratio R2 and the longitudinal axis of FIG. 29 represents the detected value.

TABLE 2

| | Area ratio (%) | Transmittance (%) | Detected value (a.u.) | Evaluation of Visibility |
|---|---|---|---|---|
| Comparative Example 7 | 0.49 | 99.8 | 43 | ◎ |
| Comparative Example 8 | 0.78 | 99.6 | 58 | ◎ |
| Comparative Example 9 | 0.97 | 99.5 | 60 | ◎ |
| Example 26 | 1.04 | 99.5 | 63 | ◎ |
| Example 27 | 1.11 | 99.4 | 76 | ◎ |
| Example 28 | 1.23 | 99.4 | 80 | ◎ |
| Example 29 | 1.34 | 99.3 | 85 | ◎ |
| Example 30 | 1.55 | 99.2 | 90 | ◎ |
| Example 31 | 1.92 | 99.0 | 91 | ◎ |
| Example 32 | 2.11 | 99.2 | 105 | ◎ |
| Example 33 | 2.43 | 98.8 | 108 | ◎ |
| Example 34 | 2.52 | 98.6 | 113 | ◎ |
| Example 35 | 3.71 | 98.3 | 114 | ◎ |
| Example 36 | 4.29 | 98.2 | 110 | ◎ |
| Example 37 | 4.89 | 97.9 | 111 | ◎ |
| Example 38 | 5.13 | 97.4 | 112 | ◎ |
| Example 39 | 5.91 | 97.7 | 109 | ◎ |
| Example 40 | 6.99 | 97.5 | 109 | ◎ |
| Example 41 | 8.06 | 97.2 | 112 | ◎ |
| Example 42 | 9.48 | 96.4 | 112 | ◎ |
| Example 43 | 10.31 | 95.8 | 114 | ◎ |
| Example 44 | 10.89 | 95.3 | 115 | ◎ |
| Example 45 | 11.41 | 95.2 | 112 | ○ (Glare) |
| Example 46 | 12.58 | 94.2 | 115 | ○ (Glare) |
| Example 47 | 14.99 | 93.5 | 118 | ○ (Glare) |
| Example 48 | 17.65 | 91.8 | 112 | ○ (Glare) |
| Example 49 | 19.61 | 91.1 | 119 | ○ (Glare) |

TABLE 2-continued

| | Area ratio (%) | Transmittance (%) | Detected value (a.u.) | Evaluation of Visibility |
|---|---|---|---|---|
| Example 50 | 21.88 | 90.3 | 111 | ◯ (Glare) |
| Comparative Example 10 | 22.13 | 89.9 | 113 | ◯ (Glare) |
| Comparative Example 11 | 23.78 | 89.1 | 114 | ◯ (Glare) |
| Comparative Example 12 | 24.58 | 88.7 | 116 | ◯ (Glare) |

In Table 2, the cases in which no glares were observed in the image displayed in the display region Ad and the visibility of the image was favorable are indicated by double circle "⊚". Also, the cases in which some glares were observed in the image displayed in the display region Ad but the glares were not noticeable and the visibility of the image was acceptable are indicated by circle "◯ (Glare)".

As shown in Table 2, when the area ratio R2 is 0.49 to 24.58% (Comparative Examples 7 to 9, Examples 26 to 50 and Comparative Examples 10 to 12), the transmittance in the display region Ad decreases as the area ratio R2 increases. More specifically, as the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix increases, the transmittance in the display region Ad decreases. On the other hand, it is desirable that the transmittance in the display region Ad is 90% or more. Accordingly, the area ratio R2 is preferably 22% or less.

Further, as shown in Table 2 and FIG. 29, when the area ratio R2 is 2.5 to 24.58% (Examples 34 to 50 and Comparative Examples 10 to 12), the detected values are constant regardless of the area ratio R2. This is considered to be due to the fact that difference of electrostatic capacitance between each of the conductive lines ML1 and the conductive lines ML2 and the driving electrodes COML due to presence/absence of touches is constant regardless of the area ratio R2 when the area ratio R2 is 2.5 to 24.58%.

However, when the area ratio R2 is 2.0% or more and less than 2.5% (Examples 32 and 33), the detected values start to decrease as the area ratio R2 decreases. Also, when the area ratio R2 is 1.0% or more and less than 2.0% (Examples 26 to 31), the detected values gradually decrease as the area ratio R2 decreases. Further, when the area ratio R2 is 0.49% or more and less than 1.0% (Comparative Examples 7 to 9), the detected values abruptly decrease as the area ratio R2 decreases. This is considered to be due to the fact that the electrostatic capacitance between each of the conductive lines ML1 and the conductive lines ML2 and the driving electrodes COML is decreased due to the decrease of the area ratio R2 and the intensity of the detecting signals Vdet becomes small.

Moreover, as shown in Table 2, when the area ratio is 0.49 to 11% (Comparative Examples 7 to 9 and Examples 26 to 44), no glares are observed in the image displayed in the display region Ad, and the visibility is favorable. Also, when the area ratio is more than 11% and 24.58% or less (Examples 45 to 50 and Comparative Examples 10 to 12), some glares are observed in the image displayed in the display region Ad but the glares are not noticeable and the visibility of the image is acceptable. This is considered to be due to the fact that, when the detecting electrodes TDL have a mesh-like shape, no reflection stripes are observed, so that the visibility of the image is likely to be acceptable.

From the results of the Comparative Examples 7 to 9, the Examples 26 to 50 and the Comparative Examples 10 to 12, the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix, namely, the area ratio R2 is preferably 1 to 22%.

When the area ratio R2 is less than 1%, there is the fear that the detected values of the detecting signals Vdet are extremely small. Further, when the area ratio R2 is more than 22%, there is the fear that the transmittance in the display region Ad becomes less than 90%. On the other hand, by setting the area ratio R2 to be 1 to 22%, it is possible to achieve the transmittance in the display region Ad of 90% or more while preventing the detected values of the detecting signals Vdet from being too small. Accordingly, in a display device provided with an input device, the transmittance of the display region with respect to visible light can be improved and the detection performance of the input device can be improved.

Also, when the detecting electrodes TDL include conductive lines ML with a mesh-like shape, the area ratio R2 is more preferably 2 to 22%. Consequently, the detected values of the detecting signals Vdet can be increased.

Further, when the detecting electrodes TDL include conductive lines ML with a mesh-like shape, the area ratio R2 is even more preferably 2.5 to 11%. Consequently, it is possible to prevent and suppress the occurrence of the case in which glares are observed in the image displayed in the display region Ad and the visibility of the image is degraded.

Note that, in the Examples 26 to 50 and the Comparative Examples 7 to 12, the area ratio R2 was changed in a state in which the ratio of the area of the detecting electrodes TDL and the area of the dummy electrodes TDD was set to 1:2. Also, the same results as the above-described results were obtained also in the cases in which the ratio of the area of the detecting electrodes TDL and the area of the dummy electrodes TDD was changed to various values. Further, also in the cases in which no dummy electrodes TDD were provided and only the detecting electrodes TDL were provided, the same results as the above-described results were obtained. Accordingly, the preferable range for the area ratio R2 in the case in which no dummy electrodes TDD are provided and only the detecting electrodes TDL are provided is the same as the preferable range for the area ratio R2 in the case in which the detecting electrodes TDL and the dummy electrodes TDD are provided.

Also, the effects which the above-described preferable range for the area ratio R2 exhibits on transmittance, visibility and detected values are more remarkable when an arrangement interval DP1 of the plurality of sub-pixels SPix in the X axis direction (see FIG. 25) is 45 to 180 µm. Here, the arrangement interval DP1 of the plurality of sub-pixels SPix in the X axis direction (see FIG. 25) is smaller than the arrangement interval DP2 of the plurality of sub-pixels SPix in the Y axis direction (see FIG. 25). Accordingly, when the display device 1 according to the present first modified example of the first embodiment is applied to electronic devices having a relatively small arrangement interval of the sub-pixels SPix such as smartphones as will be described later in the fifth embodiment, the effects exhibited on visibility when the area ratio R2 is in the above-described range are extremely large.

<Width of Conductive Lines>

Next, the range for the line width LW1 of the conductive lines ML in the case of the display device 1 according to the present first embodiment, namely, the case in which the detecting electrodes TDL include conductive lines ML with a zigzag shape will be described. Here, a plurality of display devices were prepared such that the line widths LW1 fell within the range from 1 to 7.5 μm. Then, the display devices were used to evaluate resistance values of the conductive lines and visibility.

The cases with the line width LW1 of less than 2 μm were defined as Comparative Examples 13 and 14, the cases with the line width LW1 of 2 to 7 μm were defined as Examples 51 to 57 and the case with the line width LW1 of more than 7 μm was defined as Comparative Example 15. Further, display devices whose intervals between conductive lines ML were changed to nine values in the range of 45 to 206 μm were prepared for each of the display devices of the Comparative Examples 13 and 14, the Examples 51 to 57 and the Comparative Example 15. Then, for evaluating the visibility, whether or not no moire patterns or conductive lines ML were observed and the visibility was favorable without causing any problems in the image displayed in the display region Ad was evaluated. The evaluation results are shown in Table 3.

an angle θ11, the interval DS1 between the conductive lines ML is given by the following equation (4):

$$DS1 = DA1 \times \cos\theta 11 \quad (4)$$

Further, in Table 3, the cases in which neither moire patterns nor conductive lines ML were observed in the image displayed in the display region Ad and the visibility of the image was favorable are indicated by double circle "◎". The cases in which some moire patterns were observed in the image displayed in the display region Ad but the moire patterns were not dense and the visibility of the image was acceptable are indicated by circle "○ (Moire)". Also, the cases in which moire patterns were observed in the image displayed in the display region Ad, the moire patterns were dense and the visibility of the image was not acceptable are indicated by triangle "△ (Moire)".

Further, the cases in which some conductive line ML were observed in the image displayed in the display region Ad but the conductive lines ML were not recognized as lines and the visibility of the image was acceptable are indicated by circle "○ (Conductive line)". The cases in which conductive lines ML were observed in the image displayed in the display region Ad, the conductive lines ML were recognized as lines and the visibility of the image was not acceptable are indicated by triangle "△ (Conductive line)".

TABLE 3

| | Line width (μm) | Interval between conductive lines (μm) | | | | | | | | |
|---|---|---|---|---|---|---|---|---|---|---|
| | | 45 | 51 | 77 | 83 | 116 | 175 | 186 | 193 | 206 |
| Comparative Example 13 | 1 | ◎ | ◎ | ◎ | ◎ | ◎ | ◎ | ◎ | ◎ | ◎ |
| Comparative Example 14 | 1.5 | ◎ | ◎ | ◎ | ◎ | ◎ | ◎ | ◎ | ◎ | ○ (Conductive line) |
| Example 51 | 2 | ◎ | ◎ | ◎ | ◎ | ◎ | ◎ | ◎ | ◎ | ○ (Conductive line) |
| Example 52 | 3 | ○ (Moire) | ◎ | ◎ | ◎ | ◎ | ◎ | ◎ | ○ (Conductive line) | △ (Conductive line) |
| Example 53 | 4.5 | ○ (Moire) | ○ (Moire) | ○ (Moire) | ◎ | ◎ | ◎ | ○ (Conductive line) | ○ (Conductive line) | △ (Conductive line) |
| Example 54 | 5 | ○ (Moire) | ○ (Moire) | ○ (Moire) | ○ (Moire) | ◎ | ○ (Conductive line) | ○ (Conductive line) | ○ (Conductive line) | △ (Conductive line) |
| Example 55 | 5.5 | ○ (Moire) | ○ (Moire) | ○ (Moire) | ○ (Moire) | ○ (Moire) | ○ (Conductive line) | ○ (Conductive line) | ○ (Conductive line) | △ (Conductive line) |
| Example 56 | 6.5 | △ (Moire) | ○ (Moire) | ○ (Moire) | ○ (Moire) | ○ (Moire) | ○ (Conductive line) | ○ (Conductive line) | ○ (Conductive line) | △ (Conductive line) |
| Example 57 | 7 | △ (Moire) | ○ (Moire) | ○ (Moire) | ○ (Moire) | ○ (Moire) | ○ (Moire) | ○ (Conductive line) | ○ (Conductive line) | △ (Conductive line) |
| Comparative Example 15 | 7.5 | △ (Moire) | △ (Moire) | △ (Moire) | △ (Moire) | △ (Moire) | △ (Moire) | ○ (Conductive line) | △ (Conductive line) | △ (Conductive line) |

Figure 30:
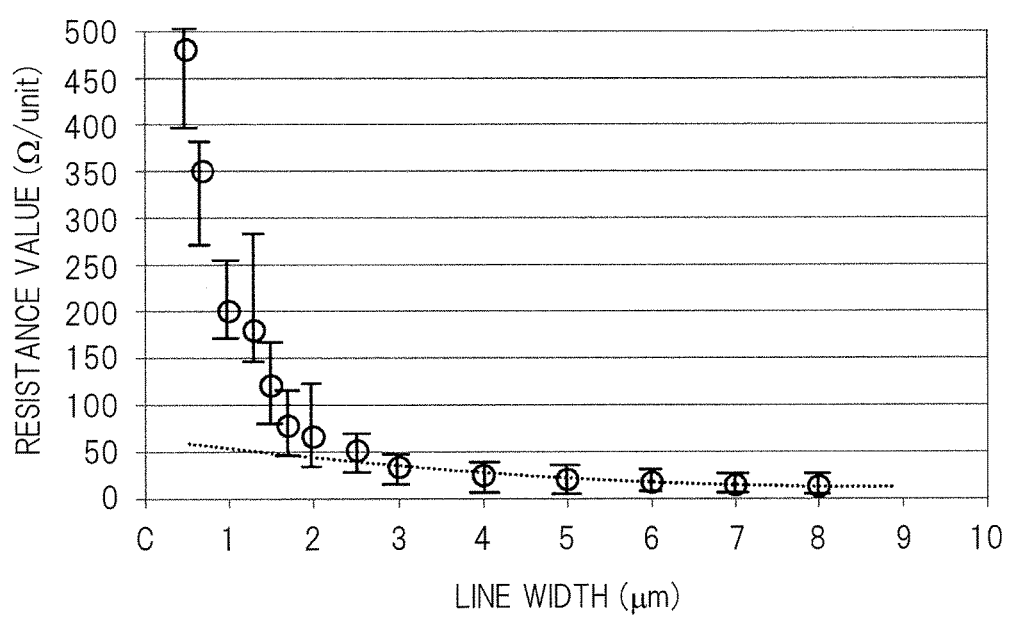
FIG. 30 is a graph showing a relationship between line widths of conductive lines and resistance values of conductive lines.

Note that, as shown in FIG. 18, the interval DS1 between the conductive lines ML indicates an arrangement interval of the conductive lines ML in the width direction of the conductive line ML. Accordingly, as shown in FIG. 18, when the arrangement interval of the conductive lines ML in the direction D2 seen in a plan view is defined as an arrangement interval DA1 and an angle formed by the direction D11 in which the extending portions EX11 extend and the direction D1 when seen in a plan view is defined as On the other hand, the relationship between the line width LW1 of the conductive lines ML and the resistance value of the conductive lines ML of the Comparative Examples 13 and 14, the Examples 51 to 57 and the Comparative Example 15 is shown in the graph of FIG. 30. The horizontal axis of FIG. 30 represents the line width LW1 of the conductive lines ML and the longitudinal axis of FIG. 30 represents the resistance value of the conductive lines ML. Here, a resistance value per extending portion EX1 or EX2

(Ω/unit) constituting the conductive line ML (see, for example, FIG. 18) is shown as the resistance value of the conductive line ML.

As shown in FIG. 30, when the line width LW1 of the conductive lines ML is 2 to 7.5 μm (Examples 51 to 57 and Comparative Example 15), the resistance value of the conductive lines ML gradually increases as the line width LW1 of the conductive lines ML decreases, but the change is moderate. Particularly, when the line width LW1 of the conductive lines ML is 2.5 to 7.5 μm (Examples 52 to 57 and Comparative Example 15), the resistance value of the conductive lines ML is small when compared with the case in which the line width LW1 is 2 μm or more and less than 2.5 μm (Example 51). On the other hand, as shown in FIG. 30, when the line width LW1 of the conductive lines ML is less than 2 μm (Comparative Examples 13 and 14), the resistance value of the conductive lines ML abruptly increases as the line width LW1 of the conductive lines ML decreases.

Further, as shown in Table 3, when the line width LW1 of the conductive lines ML is more than 7 μm (Comparative Example 15), moire patterns or conductive lines are observed in the image displayed in the display region Ad and the visibility of the image in not acceptable in all of the cases in which the interval DS1 of the conductive lines ML is 45 to 206 μm except the case in which the interval DS1 is 186 μm. Accordingly, in combination with the results of FIG. 30, the width of the conductive lines ML is preferably 2 to 7 μm.

Further, as shown in Table 3, when the line width LW1 of the conductive lines ML is more than 4.5 μm and 7 μm or less (Examples 54 to 57) and the interval DS1 of the conductive lines ML is in the range from 50 to 200 μm, moire patterns or conductive lines are observed in the image, but the moire patterns are not dense or the conductive lines ML are not recognized as lines. Accordingly, when the interval DS1 of the conductive lines ML is in the range from 50 to 200 μm, the visibility of the image displayed in the display region Ad is acceptable. On the other hand, when the interval DS1 of the conductive lines ML is less than 50 μm, the moire patterns become dense and the visibility of the image displayed in the display region Ad is sometimes not acceptable. Further, when the interval DS1 of the conductive lines ML is more than 200 μm, the conductive lines ML are recognized as lines and the visibility of the image displayed in the display region Ad is not acceptable.

Moreover, as shown in Table 3, when the line width LW1 of the conductive lines ML is 2 μm to 4.5 μm (Examples 51 to 53), neither moire patterns nor conductive lines ML are observed as the line width LW1 of the conductive lines ML decreases, and the range of the interval DS1 of the conductive lines ML with which the visibility of the image displayed in the display region Ad becomes favorable expands. More specifically, the visibility of the image displayed in the display region Ad improves as the line width LW1 of the conductive lines ML decreases. Particularly, when the interval DS1 of the conductive lines ML is in the range of 80 to 180 μm, the visibility of the image displayed in the display region Ad is extremely favorable.

The dependence of the interval DS1 of the conductive lines ML shown in Table 3 may be considered as follows. That is, even when the conductive lines ML1 have the same line width LW1, they are more likely to be recognized as lines with naked eyes as the interval DS1 of the conductive lines ML increases. Further, even when the conductive lines ML1 have the same line width LW1, moire patterns generated due to the difference between the intervals DS1 of the conductive lines ML and the arrangement intervals of the sub-pixels SPix become denser as the interval DS1 of the conductive lines ML decreases.

From the results of the Comparative Examples 13 and 14, the Examples 51 to 57 and the Comparative Example 15, there is the fear that the resistance value of the conductive lines ML is increased when the line width LW1 of the conductive lines ML is less than 2 μm. Further, when the line width LW1 of the conductive lines ML is more than 7 μm, there is the fear that moire patterns or conductive lines are observed in the image displayed in the display region Ad, and the visibility of the image displayed in the image region Ad is thus degraded.

Further, when the line width LW1 of the conductive lines ML is less than 2 μm, there is the fear that the resistance value of the conductive lines ML becomes large or the conductive lines ML are cut at the time of manufacturing the conductive lines ML. Alternatively, when the line width LW1 of the conductive lines ML is more than 7 μm, moire patterns are more likely to be observed or the conductive lines ML are more likely to be recognized as lines with naked eyes, so that the conductive lines ML are more likely to be observed.

On the other hand, in the present first embodiment, the line width LW1 of the conductive lines ML is preferably 2 to 7 μm. Consequently, the resistance value of the conductive lines ML can be reduced and the visibility of the image displayed in the image region Ad can be improved. Further, in a display device provided with an input device, the transmittance of the display region with respect to visible light can be improved and the detection performance of the input device can be improved.

Further, the interval DS1 of the conductive lines ML is preferably 50 to 200 μm. Consequently, although some moire patterns or conductive lines may be observed, the visibility of the image displayed in the display region Ad is acceptable.

More preferably, the line width LW1 of the conductive lines ML is 2.5 to 4.5 μm. Consequently, neither moire patterns nor conductive lines ML are less likely to be observed in the image displayed in the display region Ad, and the visibility of the image displayed in the display region Ad becomes more favorable. Particularly, when the interval DS1 of the conductive lines ML is 80 to 180 μm, neither moire patterns nor conductive lines ML are observed in the image displayed in the display region Ad, and the visibility of the image displayed in the display region Ad becomes extremely favorable.

Note that the line width of the dummy electrodes TDD is also preferably 2 to 7 μm, and more preferably 2.5 to 4.5 μm like the line width LW1 of the conductive lines ML.

Further, also in the case of the display device 1 according to the first modified example of the first embodiment, namely, when the detecting electrodes TDL include conductive lines ML1 and conductive lines ML2 having a mesh-like shape, the line width of each of the conductive lines ML1 and conductive lines ML2 is preferably 2 to 7 μm, and more preferably 2.5 to 4.5 μm like the display device 1 of the first embodiment. Moreover, the line width of the dummy electrodes TDD according to the first modified example of the first embodiment is also preferably 2 to 7 μm, and more preferably 2.5 to 4.5 μm.

Also, the effects which the above-described preferable ranges of the line width LW1 or the interval DS1 of the conductive lines ML exhibit on the visibility and the resistance values are more remarkable when the arrangement interval DP1 (see FIG. 20) of the plurality of sub-pixels SPix in the X axis direction is 45 to 180 μm. Here, the arrangement interval DP1 of the plurality of sub-pixels SPix in the X axis direction (see FIG. 20) is smaller than the arrangement interval DP2 of the plurality of sub-pixels SPix in the Y axis direction (see FIG. 20). Accordingly, when the display device 1 according to the present first embodiment or the first modified example of the first embodiment is applied to electronic devices having a relatively small arrangement interval of the sub-pixels SPix such as smartphones as will be described later in the fifth embodiment, the effects exhibited on visibility when the conductive lines ML have the line width in the above-described range become extremely large.

<Main Features and Effects of Present Embodiment>

In the present first embodiment and the first modified example of the first embodiment, the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix, namely, the area ratio R2 is preferably 1 to 22%. Further, when the detecting electrodes TDL have a zigzag shape, the area ratio R2 is more preferably 1 to 11%, and even more preferably 1.2 to 5%. On the other hand, when the detecting electrodes TDL have a mesh-like shape, the area ratio R2 is more preferably 2 to 22%, and even more preferably 2.5 to 11%.

Consequently, it is possible to achieve the transmittance in the display region Ad of 90% or more while preventing the detected values of the detecting signals from being too small. Also, in a display device provided with an input device, the transmittance of the display region with respect to visible light can be improved and the detection performance of the input device can be improved.

On the other hand, according to the present first embodiment and the first modified example of the first embodiment, the line width LW1 of the conductive lines ML is preferably 2 to 7 μm. Further, when the detecting electrodes TDL have a zigzag shape, the line width LW1 of the conductive lines ML is more preferably 2.5 to 4.5 μm. Moreover, when the detecting electrodes TDL have a mesh-like shape, the line width LW1 of the conductive lines ML is more preferably 2.5 to 4.5 μm. Consequently, it is possible to reduce the resistance value of the conductive lines ML, and it is possible to improve the visibility of the image displayed in the display region Ad. Also, in a display device provided with an input device, the transmittance of the display region with respect to visible light can be improved and the detection performance of the input device can be improved.

According to the present first embodiment and the first modified example of the first embodiment, the example in which the plurality of sub-pixels SPix are arranged in a matrix form in the display region Ad has been described. However, the plurality of sub-pixels SPix are need not be arranged in a matrix form, but may be arranged in, for example, a linear form. In such a case, the pixel electrodes 22 are respectively provided in each of the plurality of sub-pixels SPix arranged in a linear form, only one driving electrode COML is provided so as to overlap the plurality of pixel electrodes 22 when seen in a plan view, and a plurality of detecting electrodes TDL are provided at intervals so as to respectively overlap the driving electrode COML when seen in a plan view. Then, based on the electrostatic capacitance of the one driving electrode COML and each of the plurality of detecting electrodes TDL, input positions in the arrangement direction of the plurality of sub-pixels SPix arranged in a linear form are detected.

Also in such a case, by satisfying the above-described preferable range for the area ratio R2 or the above-described preferable range for the line width LW1, the detected values of the detecting signals can be increased without degrading the visibility of the image displayed in the display region Ad. Also, in a display device provided with an input device, the transmittance of the display region with respect to visible light can be improved and the detection performance of the input device can be improved.

Note that the present invention is not limited to the case in which driving signals for measuring electrostatic capacitance between the driving electrodes COML and the detecting electrodes TDL are input to the driving electrodes COML and detecting signals for detecting input positions are output from the detecting electrodes TDL. Accordingly, as will be described later in the fourth embodiment, driving signals for measuring the electrostatic capacitance of the detecting electrodes TDL may be input to the detecting electrodes TDL and detecting signals for detecting input positions may be output from the detecting electrodes TDL.

Second Embodiment

In the present first embodiment and the first modified example of the first embodiment, the case where driving electrodes for driving liquid crystal and touch panel are provided in the display region has been described. On the other hand, in the second embodiment, although it is an in-cell liquid crystal display device similar to the first embodiment, driving electrodes which drive the touch panel but do not drive the liquid crystal are provided apart from driving electrodes which drive the liquid crystal in the display region.

In the display device according to the second embodiment, respective components other than the driving electrodes, for example, the shape and arrangement of the detecting electrodes TDL and the dummy electrodes TDD seen in a plan view are similar to the respective components of the display device of the first embodiment and the first modified example of the first embodiment. Therefore, the descriptions thereof will be omitted.

<Positional Relationship Between Driving Electrodes and Pixel Electrodes>

Figure 31:
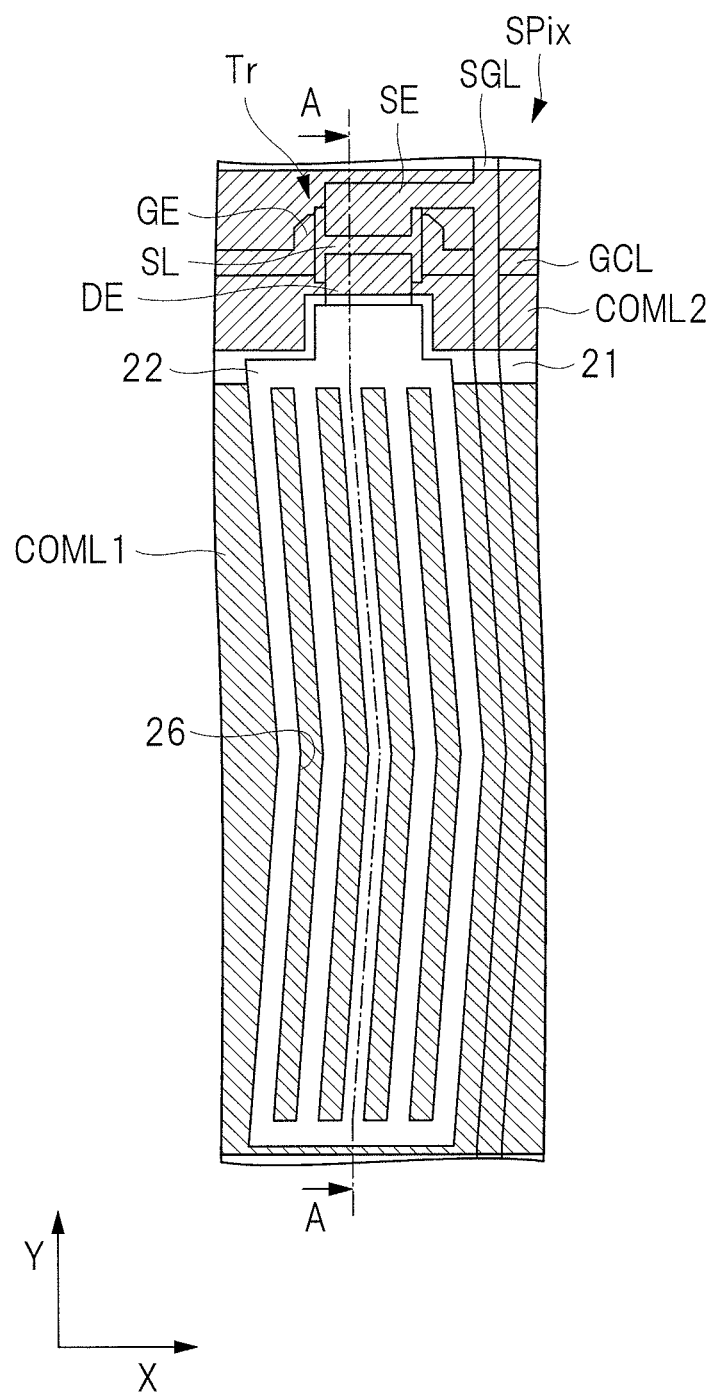
FIG. 31 is a plan view showing a driving electrode together with a pixel electrode in a display device according to the second embodiment.
Figure 32:
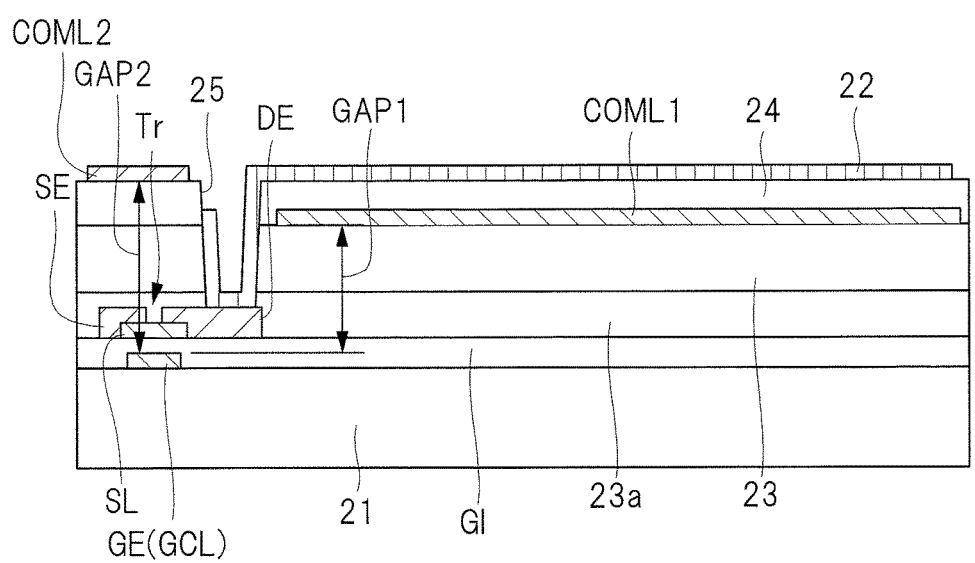
FIG. 32 is a sectional view showing a driving electrode together with a pixel electrode in the display device according to the second embodiment.

FIG. 31 is a plan view showing a driving electrode together with a pixel electrode in the display device according to the second embodiment. FIG. 32 is a sectional view showing the driving electrode together with the pixel electrode in the display device according to the second embodiment. FIG. 31 shows a configuration of one pixel electrode 22 provided within one sub-pixel SPix and its periphery. FIG. 32 is a sectional view taken along the line A-A in FIG. 31. Note that, in FIG. 31, the illustration of parts other than the TFT substrate 21, the driving electrode COML1, the driving electrode COML2, electrodes included in the TFT element Tr, the scanning line GCL and the signal line SGL is omitted, and in FIG. 32, the illustration of parts above the pixel electrode 22 and the driving electrode COML2 is omitted.

The configuration of respective layers between the TFT substrate 21 and the interlayer resin film 23 such as the TFT substrate 21 and the TFT elements Tr may be similar to the configuration of respective layers of the display device of the first embodiment described with reference to FIG. 15.

In the second embodiment, the driving electrode COML1 made of a conductive material with translucency with respect to visible light such as ITO or IZO is formed so as to cover the interlayer resin film 23. In the second embodiment, the driving element COML1 operates as a driving electrode which drives the liquid crystal layer 6 (see FIG. 9).

The driving electrode COML1 is integrally and continuously formed in the X axis direction so as to overlap the plurality of sub-pixels SPix arranged in the X axis direction when seen in a plan view. More specifically, one driving electrode COML1 is provided as a common electrode for a plurality of sub-pixels SPix. Accordingly, the driving electrode COML1 is also referred to as a common electrode.

A transparent insulating film 24 made of, for example, silicon nitride or silicon oxide is formed so as to cover the driving electrode COML1. Then, a plurality of pixel electrodes 22 made of a conductive material with translucency such as ITO or IZO are formed so as to cover the insulating film 24. The plurality of pixel electrodes 22 are formed so as to respectively overlap the driving electrode COML1 within each of the plurality of sub-pixels SPix when seen in a plan view. In other words, the driving electrode COML1 is provided so as to overlap the plurality of pixel electrodes 22 arranged in the X axis direction when seen in a plan view. More specifically, the driving electrode COML1 and the pixel electrode 22 oppose each other with the insulating film 24 interposed therebetween in each of the plurality of sub-pixels SPix.

A contact hole 25 which penetrates through the insulating film 24, the interlayer resin film 23 and the passivation film 23a to reach the drain electrode DE of the TFT element Tr is formed at a position which overlaps the drain electrode DE when seen in a plan view. The drain electrode DE is exposed on a bottom surface portion of the contact hole 25. The pixel electrode 22 is formed on the insulating film 24 with the inclusion of the side surface portion and the bottom surface portion of the contact hole 25, and is electrically connected with the drain electrode DE which is exposed on the bottom surface portion of the contact hole 25.

Note that a slit-like aperture 26 may be formed in the pixel electrode 22 formed within each sub-pixel SPix like the first embodiment.

Unlike the first embodiment, a driving electrode COML2 is formed in the second embodiment. The driving electrode COML2 is provided apart from the driving electrode COML1 in the display region Ad (see FIG. 7 or FIG. 8) so as not to overlap any of the plurality of pixel electrodes 22 when seen in a plan view. Accordingly, the driving electrode COML2 does not drive the liquid crystal layer 6 (see FIG. 9) in each of the sub-pixels SPix. On the other hand, to the driving electrode COML2, driving voltage for touch panel detection is supplied, namely, driving signals for measuring the electrostatic capacitance between the driving electrode COML2 and the detecting electrodes TDL and detecting input positions are input, and therefore the driving electrode COML2 operates as a driving electrode of the touch panel.

The driving electrode COML2 extends in the X axis direction like the driving electrode COML1. The driving electrode COML1 and the driving electrode COML2 are alternately arranged in, for example, the Y axis direction.

As described above, the driving electrode COML2 is formed on the insulating film 24 in a region which does not overlap the pixel electrodes 22 when seen in a plan view. Therefore, the driving electrode COML2 sometimes overlaps the scanning lines GCL when seen in a plan view. However, by forming the driving electrode COML2 on the insulating film 24, the driving electrode COML2 can be formed above the driving electrode COML1.

In this manner, an interval GAP2 between the driving electrode COML2 and the scanning lines GCL in a direction perpendicular to the surface of the TFT substrate 21 can be made larger than an interval GAP1 between the driving electrode COML1 and the scanning lines GCL in the direction perpendicular to the surface of the TFT substrate 21. Therefore, even when the driving electrode COML2 overlaps the scanning lines GCL when seen in a plan view, it is possible to prevent or suppress the increase of the electrostatic capacitance between the driving electrode COML2 and the scanning lines GCL. Particularly, when compared with the case in which a part of the driving electrode COML1 overlaps the scanning lines GCL, it is possible to substantially reduce the electrostatic capacitance between the driving electrode COML1 and the scanning lines GCL.

Note that driving signals may be input to the adjacent driving electrode COML1 and driving electrode COML2 at the same timing during the touch detection period Pt. Accordingly, the adjacent driving electrode COML1 and driving electrode COML2 may be electrically connected by, for example, connecting an end portion of the driving electrode COML1 in the X axis direction with an end portion of the driving electrode COML2 in the X axis direction through wiring or the like. Alternatively, the adjacent driving electrode COML1 and driving electrode COML2 need not to be electrically connected, and driving signals may be input to the driving electrode COML2 at a timing different from the timing at which driving signals are input to the driving electrode COML1.

In the second embodiment, each of the plurality of detecting electrodes TDL (see, for example, FIG. 20) intersects a plurality of driving electrodes COML1 and a plurality of driving electrodes COML2 which are alternately arranged in, for example, the Y axis direction when seen in a plan view. Further, each of the plurality of dummy electrodes TDD intersects the plurality of driving electrodes COML1 and the plurality of driving electrodes COML2 which are alternately arranged in, for example, the Y axis direction when seen in a plan view.

<Main Features and Effects of Present Embodiment>

Also in the present second embodiment, like the first embodiment and the first modified example of the first embodiment, the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix, namely, the area ratio R2 is preferably 1 to 22%. Further, when the detecting electrodes TDL have a zigzag shape, the area ratio R2 is more preferably 1 to 11%, and even more preferably 1.2 to 5%. On the other hand, when the detecting electrodes TDL have a mesh-like shape, the area ratio R2 is more preferably 2 to 22%, and even more preferably 2.5 to 11%.

Consequently, the same effects as those of the first embodiment and the first modified example of the first embodiment can be obtained, for example, it is possible to achieve the transmittance in the display region Ad of 90% or more while preventing the detected values of the detecting signals from being too small.

Further, also in the present second embodiment, like the first embodiment and the first modified example of the first embodiment, the line width LW1 of the conductive lines ML is preferably 2 to 7 μm. Further, when the detecting electrodes TDL have a zigzag shape, the line width LW1 of the conductive lines ML is more preferably 2.5 to 4.5 μm. On the other hand, when the detecting electrodes TDL have a mesh-like shape, the line width LW1 of the conductive lines ML is more preferably 2.5 to 4.5 μm. Consequently, the same effects as those of the first embodiment and the first modified example of the first embodiment can be obtained, for example, it is possible to reduce the resistance value of the conductive lines ML, and it is possible to improve the visibility of the image displayed in the display region Ad.

On the other hand, in the second embodiment, the driving electrodes COML2 are provided apart from the driving electrodes COML1 in the display region Ad. Further, the driving electrodes COML2 are formed within a region in which the light-shielding portions BM1 and the light-shielding portions BM2 (see FIG. 27) are formed, namely, outside the sub-pixels SPix.

Here, in the case in which the driving electrodes COML2 are formed above the driving electrodes COML1, it is possible to substantially reduce the electrostatic capacitance between the driving electrodes COML1 and the scanning lines GCL, when compared with the case in which no driving electrode COML2 is provided and a part of the driving electrodes COML1 overlaps the scanning lines GCL.

Alternatively, in the case in which the driving electrodes COML1 and the driving electrodes COML2 are electrically connected, it is possible to increase the area of electrodes which operate as driving electrodes of the touch panel, when compared with the case in which no driving electrode COML2 is provided. Accordingly, it is possible to increase the detected values of the detecting signals without degrading the visibility of the image displayed in the display region Ad. Also, it is possible to prevent or suppress the increase of the electrostatic capacitance between the driving electrodes COML1 and the scanning lines GCL.

Note that, also in the present second embodiment, the plurality of sub-pixels SPix need not to be arranged in a matrix form, but may be arranged in a linear form like the first embodiment. In such a case, the pixel electrodes 22 are respectively provided in each of the plurality of sub-pixels SPix arranged in a linear form and only one driving electrode COML1 and one driving electrode COML2 are provided so as to overlap the plurality of pixel electrodes 22 when seen in a plan view. Also, the plurality of detecting electrodes TDL are provided at intervals so as to respectively overlap the driving electrode COML1 and the driving electrode COML2 when seen in a plan view. Then, based on the electrostatic capacitance of the one driving electrode COML2 and each of the plurality of detecting electrodes TDL, input positions in the arrangement direction of the plurality of sub-pixels SPix arranged in a linear form are detected.

Also in such a case, by satisfying the preferable range for the area ratio R2 or the preferable range for the line width LW1 described in the first embodiment, the detected values of the detecting signals can be increased without degrading the visibility of the image displayed in the display region Ad. Also, in a display device provided with an input device, the transmittance of the display region with respect to visible light can be improved and the detection performance of the input device can be improved.

Third Embodiment

In the first embodiment and the second embodiment, the example in which the display device provided with a touch panel serving as an input device is applied to an in-cell liquid crystal display device with a touch detection function has been described. Meanwhile, in the third embodiment, the example in which the display device provided with a touch panel serving as an input device is applied to an on-cell liquid crystal display device with a touch detection function will be described. Note that an on-cell liquid crystal display device with a touch detection function indicates a liquid crystal display device with a touch detection function in which neither the driving electrodes nor the detecting electrodes included in the touch panel are incorporated in the liquid crystal display device.

Note that the display device of the third embodiment can be applied to on-cell display devices in which an input device is provided for various display devices such as an organic EL display device as well as a liquid crystal display device.

<Display Device with Touch Detection Function>

Figure 33:
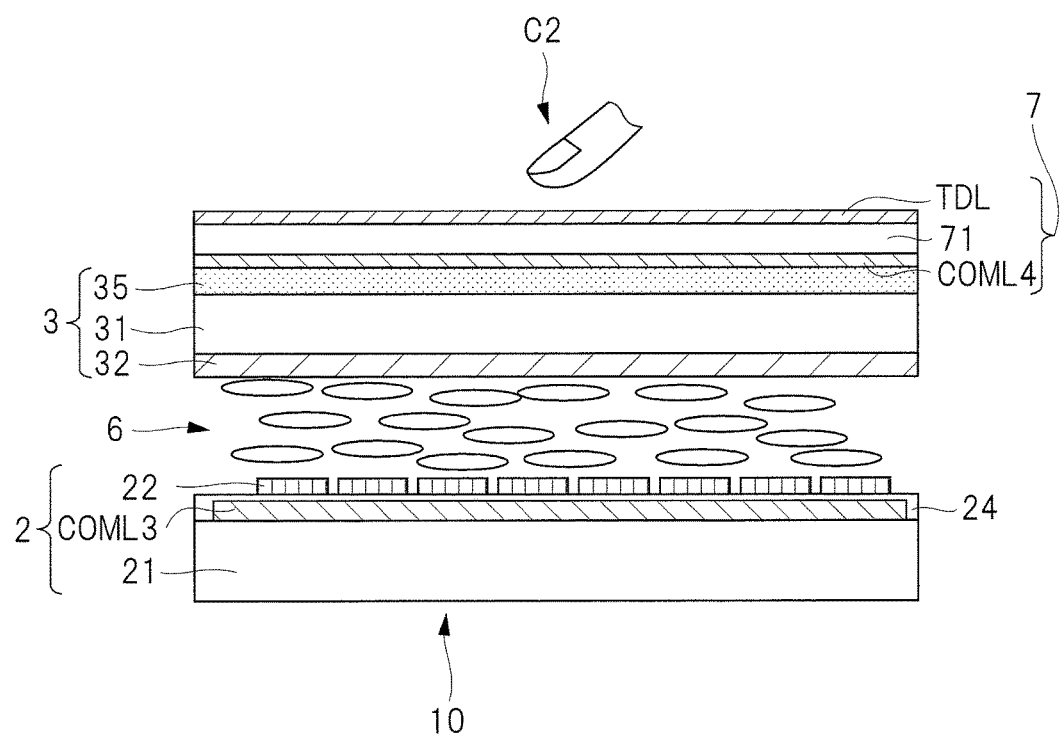
FIG. 33 is a sectional view showing a display device with a touch detection function in a display device according to the third embodiment.

FIG. 33 is a sectional view showing a display device with a touch detection function in the display device of the third embodiment.

In the display device according to the third embodiment, respective components other than the sectional structure of the opposing substrate and the touch panel substrate, for example, the shape and arrangement of the detecting electrodes TDL and the dummy electrodes TDD seen in a plan view are similar to the respective components of the display device of the first embodiment and the first modified example of the first embodiment other than the sectional structure of the opposing substrate. Therefore, the descriptions thereof will be omitted. Accordingly, parts which differ from those described in the first embodiment with reference to FIG. 9 and FIG. 10 will be mainly described with reference to FIG. 33.

The display device 10 with a touch detection function includes the pixel substrate 2, the opposing substrate 3 and the liquid crystal layer 6. The opposing substrate 3 is disposed so that a front surface serving as a main surface of the pixel substrate 2 and a rear surface serving as a main surface of the opposing substrate 3 oppose each other. The liquid crystal layer 6 is provided between the pixel substrate 2 and the opposing substrate 3.

In the third embodiment, the pixel substrate 2 includes driving electrodes COML3 instead of the plurality of driving electrodes COML in the first embodiment. The driving electrodes 3 operate as driving electrodes for the liquid crystal display device 20 (see FIG. 1), but do not operate as driving electrodes for the touch detection device 30 (see FIG. 1). Accordingly, unlike the first embodiment, a plurality of driving electrodes COML3 need not to be provided, and it is also possible to provide one driving electrode COML3 obtained by, for example, coupling and integrating the driving electrodes COML of the first embodiment.

Since parts of the pixel substrate 2 and the liquid crystal layer 6 of the display device of the third embodiment other than the driving electrodes COML3 are similar to respective parts of the pixel substrate 2 and the liquid crystal layer 6 of the display device of the first embodiment, the descriptions thereof will be omitted. A circuit diagram corresponding to the plurality of pixels of the display device of the third embodiment is similar to the circuit diagram corresponding to the plurality of pixels of the display device of the first embodiment shown in FIG. 10 except for the point that the driving electrodes COML3 are provided instead of the driving electrodes COML. Therefore, the descriptions of the parts of the display device of the third embodiment which are similar to the parts described with reference to FIG. 10 in the first embodiment will be omitted.

In the third embodiment, the opposing substrate 3 includes a glass substrate 31, a color filter 32, and a polarizing plate 35. The color filter 32 is formed on a rear surface serving as one main surface of the glass substrate 31. The polarizing plate 35 is formed on a front surface serving as the other main surface of the glass substrate 31.

In the third embodiment, unlike the first embodiment, a touch panel substrate 7 is provided on the side opposite to the pixel substrate 2 with the opposing substrate 3 being interposed therebetween. More specifically, unlike the first embodiment, the display device 10 with a touch detection function of the third embodiment is a display device in which the touch detection device 30 (see FIG. 1) is attached on the liquid crystal display device 20 (see FIG. 1).

The touch panel substrate 7 includes a glass substrate 71, a plurality of driving electrodes COML4 and a plurality of detecting electrodes TDL. The plurality of driving electrodes COML4 are driving electrodes of the touch detection device 30 and are formed on a rear surface serving as one main surface of the glass substrate 71. The plurality of detecting electrodes TDL are detecting electrodes of the touch detection device 30 and are formed on the front surface serving as the other main surface of the glass substrate 71.

The shape and arrangement of the driving electrodes COML3 seen in a plan view can be the same as the shape and arrangement of the driving electrodes COML of the first embodiment seen in a plan view. Further, the shape and arrangement of the driving electrodes COML4 seen in a plan view can be the same as the shape and arrangement of the driving electrodes COML of the first embodiment seen in a plan view.

Note that the dummy electrodes TDD (see, for example, FIG. 20) may be formed on the front surface serving as the other main surface of the glass substrate 71. The shape and arrangement of the dummy electrodes TDD seen in a plan view can be the same as the shape and arrangement of the dummy electrodes TDD of the first embodiment seen in a plan view.

In the third embodiment, the driving electrodes COML3 operate as driving electrodes of the liquid crystal display device 20, but do not operate as driving electrodes of the touch detection device 30. The driving electrodes COML4 operate as driving electrodes of the touch detection device 30, but do not operate as driving electrodes of the liquid crystal display device 20. Therefore, it is not necessary to separate the display period in which display operations are performed by the driving electrodes COML3 and the touch detection period in which touch detection operations are performed by the driving electrodes COML4 so that the driving signals Vcom are applied only during the touch detection period. In other words, it is possible to independently perform the display operations by the driving electrodes COML3 and the touch detection operations by the driving electrodes COML4 in parallel to each other.

Note that the driving electrodes COML4 may be electrically connected with the driving electrodes COML3 and need not to be electrically connected with the driving electrodes COML3. However, when the driving electrodes COML4 are electrically connected with the driving electrodes COML3, it is necessary to separate the display period in which display operations are performed by the driving electrodes COML3 and the touch detection period in which touch detection operations are performed by the driving electrodes COML4.

In the present third embodiment, like the first embodiment, each of the plurality of detecting electrodes TDL intersects the plurality of driving electrodes COML4 when seen in a plan view. Further, in the present third embodiment, like the first embodiment, each of the plurality of dummy electrodes TDD (see, for example, FIG. 20) intersects the plurality of driving electrodes COML4 when seen in a plan view.

<Main Features and Effects of Present Embodiment>

Also in the present third embodiment, like the first embodiment and the first modified example of the first embodiment, the ratio of total sum of areas of portions of the plurality of sub-pixels SPix which overlap any of the plurality of detecting electrodes TDL and the plurality of dummy electrodes TDD when seen in a plan view to total sum of areas of the plurality of sub-pixels SPix, namely, the area ratio R2 is preferably 1 to 22%. Further, when the detecting electrodes TDL have a zigzag shape, the area ratio R2 is more preferably 1 to 11%, and even more preferably 1.2 to 5%. On the other hand, when the detecting electrodes TDL have a mesh-like shape, the area ratio R2 is more preferably 2 to 22%, and even more preferably 2.5 to 11%.

Consequently, the same effects as those of the first embodiment and the first modified example of the first embodiment can be obtained, for example, it is possible to achieve the transmittance in the display region Ad of 90% or more while preventing the detected values of the detecting signals from being too small.

Further, also in the present third embodiment, like the first embodiment and the first modified example of the first embodiment, the line width LW1 of the conductive lines ML is preferably 2 to 7 μm. Further, when the detecting electrodes TDL have a zigzag shape, the line width LW1 of the conductive lines ML is more preferably 2.5 to 4.5 μm. On the other hand, when the detecting electrodes TDL have a mesh-like shape, the line width LW1 of the conductive lines ML is more preferably 2.5 to 4.5 μm. Consequently, the same effects as those of the first embodiment and the first modified example of the first embodiment can be obtained, for example, it is possible to reduce the resistance value of the conductive lines ML, and it is possible to improve the visibility of the image displayed in the display region Ad.

Moreover, in the present third embodiment, the touch panel serving as the input device is provided on an on-cell display device. Consequently, since it is not necessary to separate the display period in which display operations are performed by the driving electrodes COML3 and the touch detection period in which touch detection operations are performed by the driving electrodes COML4, the detection performance of touch detection can be improved, for example, the detection speed of touch detection can be apparently improved.

Fourth Embodiment

Self-Capacitance Touch Detection Function

In the first embodiment, an example in which a mutual-capacitance touch panel provided with common electrodes operating as driving electrodes and detecting electrodes is applied as the touch panel provided in the display device has been described. However, a self-capacitance touch panel in which only detecting electrodes are provided may be applied as the touch panel provided in the display device.

Figure 34:
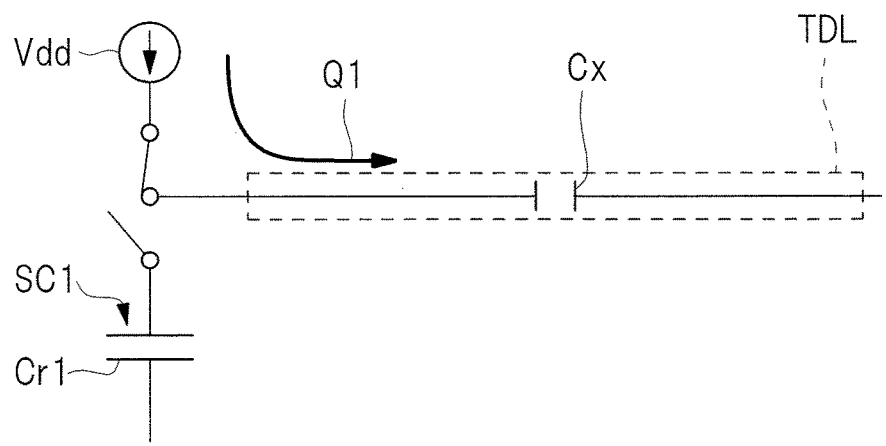
FIG. 34 is an explanatory diagram showing an electrically connected state of detecting electrodes of a self-capacitance method.
Figure 35:
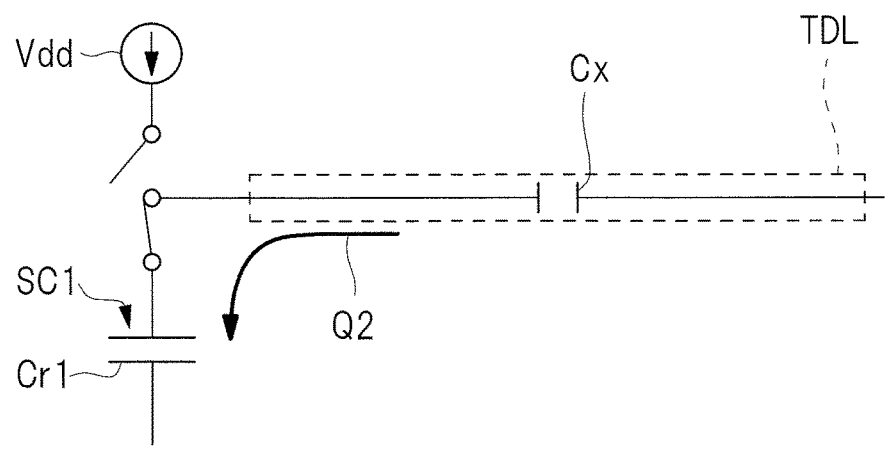
FIG. 35 is an explanatory diagram showing an electrically connected state of detecting electrodes of a self-capacitance method.

FIG. 34 and FIG. 35 are explanatory diagrams showing electrically connected states of the detecting electrodes of a self-capacitance method.

In a self-capacitance touch panel, as shown in FIG. 34, when the detecting electrode TDL having an electrostatic capacitance Cx is cut off from a detection circuit SC1 having an electrostatic capacitance Crl and is electrically connected with a power source Vdd, a charge quantity Q1 is accumulated in the detecting electrode TDL having the electrostatic capacitance Cx. Next, as shown in FIG. 35, when the detecting electrode TDL having the electrostatic capacitance Cx is cut off from the power source Vdd and is electrically connected with the detecting circuit SC1 having the electrostatic capacitance Cr1, a charge quantity Q2 flowing out to the detection circuit SC1 is detected.

Here, when a finger has contacted or approached the detecting electrode TDL, the electrostatic capacitance Cx of the detecting electrode TDL changes due to the capacitance of the finger, and when the detecting electrode TDL is connected with the detection circuit SC1, the charge quantity Q2 flowing out to the detection circuit SC1 also changes. Accordingly, by measuring the flowing-out charge quantity Q2 by the detection circuit SC1 and detecting the change in the electrostatic capacitance Cx of the detecting electrode TDL, whether or not a finger has contacted or approached the detecting electrode TDL can be determined.

For example, the case in which the display device according to the present fourth embodiment is the display device in which the display device of the first embodiment or the first modified example of the first embodiment is applied to a self-capacitance display device with a touch detection function will be considered. At this time, the display device includes, in addition to a plurality of detecting electrodes TDL which extend in the Y axis direction (see FIG. 7) and are arranged at intervals in the X axis direction (see FIG. 7), a plurality of detecting electrodes TDL which extend in the X axis direction and are arranged at intervals in the Y axis direction. Also in such a case, by detecting changes in electrostatic capacitance Cx of each of the plurality of detecting electrodes TDL extending in the Y axis direction and changes in electrostatic capacitance Cx of each of the plurality of detecting electrodes TDL extending in the X axis direction, the input positions can be detected in a two-dimensional manner. At this time, the driving electrodes COML (see FIG. 7) operate as driving electrodes of the liquid crystal display device 20 (see FIG. 1), but do not operate as driving electrodes of the touch detection device 30 (see FIG. 1).

Further, also in this case, the same effects as those of the first embodiment and the first modified example of the first embodiment can be obtained, for example, it is possible to achieve the transmittance in the display region Ad of 90% or more while preventing the detected values of the detecting signals from being too small.

Alternatively, the display device according to the present fourth embodiment may be the display device in which the display device of the third embodiment is applied to a self-capacitance display device with a touch detection function. Also in such a case, the same effects as those of the first embodiment and the first modified example of the first embodiment can be obtained, for example, it is possible to achieve the transmittance in the display region Ad of 90% or more while preventing the detected values of the detecting signals from being too small.

Fifth Embodiment

Next, electronic devices as application examples of the display devices described in the first embodiment, the first modified example of the first embodiment, the second embodiment, the third embodiment and the fourth embodiment will be described with reference to FIG. 36 to FIG. 42. The display devices of each of the first embodiment, the first modified example of the first embodiment, the second embodiment, the third embodiment and the fourth embodiment are applicable to electronic devices of all kinds of fields such as television apparatus, digital cameras, notebook PCs, portable terminal devices such as mobile phones and video cameras. In other words, the display devices of the first embodiment, the first modified example of the first embodiment, the second embodiment, the third embodiment and the fourth embodiment can be applied to electronic devices of all kinds of fields which display video signals input from outside or generated inside as images or video pictures.

<Television Apparatus>

Figure 36:
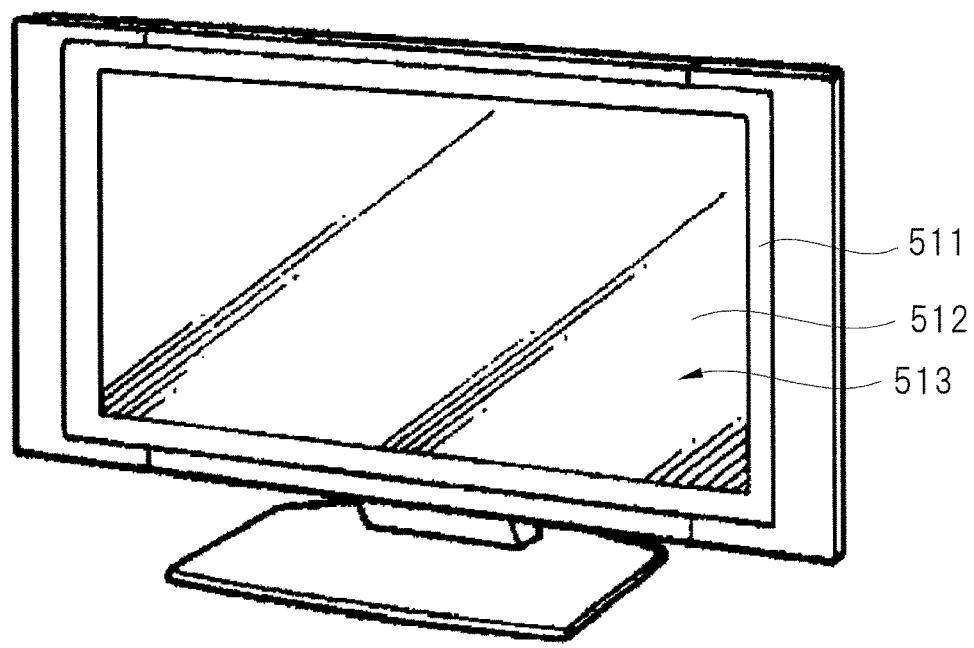
FIG. 36 is a perspective view showing an external appearance of a television apparatus as one example of an electronic device according to the fifth embodiment.

FIG. 36 is a perspective view showing an external appearance of a television apparatus as one example of an electronic device of the fifth embodiment. This television apparatus includes, for example, a video display screen unit 513 including a front panel 511 and a filter glass 512, and the video display screen unit 513 is made up of the in-cell display device with a touch detection function or the on-cell display device with a touch detection function described in the first embodiment, the first modified example of the first embodiment, the second embodiment, the third embodiment and the fourth embodiment.

<Digital Camera>

Figure 37:
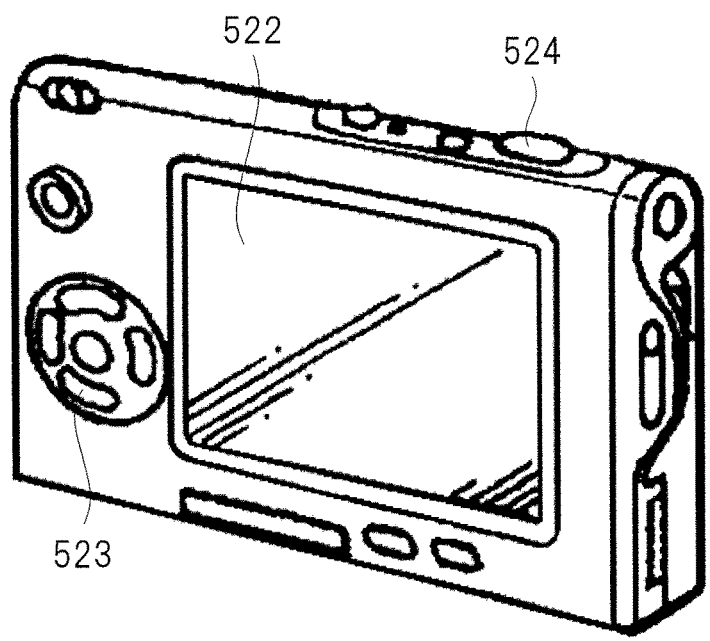
FIG. 37 is a perspective view showing an external appearance of a digital camera as one example of an electronic device according to the fifth embodiment.

FIG. 37 is a perspective view showing an external appearance of a digital camera as one example of an electronic device of the fifth embodiment. The digital camera includes, for example, a display unit 522, a menu switch 523 and a shutter button 524, and the display unit 522 is made up of the in-cell display device with a touch detection function or the on-cell display device with a touch detection function described in the first embodiment, the first modified example of the first embodiment, the second embodiment, the third embodiment and the fourth embodiment.

<Notebook PC>

Figure 38:
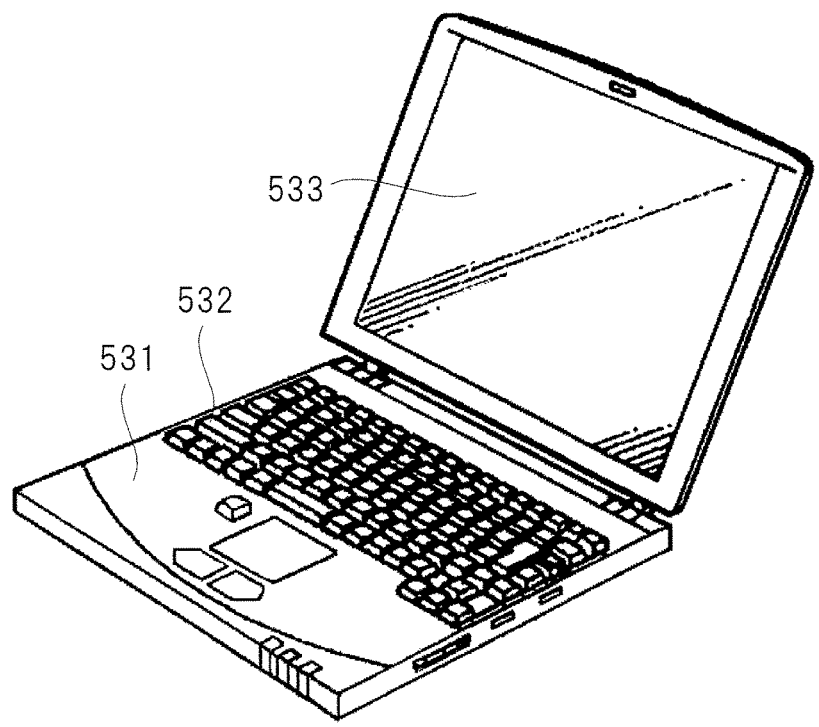
FIG. 38 is a perspective view showing an external appearance of a notebook PC as one example of an electronic device according to the fifth embodiment.

FIG. 38 is a perspective view showing an external appearance of a notebook PC as one example of an electronic device of the fifth embodiment. The notebook PC includes, for example, a main body 531, a keyboard 532 for input operations of characters or the like, and a display unit 533 for displaying images, and the display unit 533 is made up of the in-cell display device with a touch detection function or the on-cell display device with a touch detection function described in the first embodiment, the first modified example of the first embodiment, the second embodiment, the third embodiment and the fourth embodiment.

<Video Camera>

Figure 39:
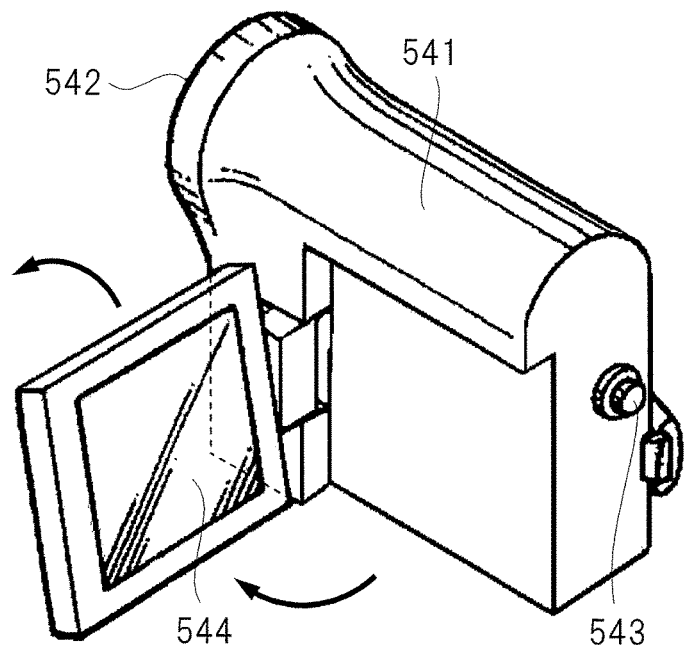
FIG. 39 is a perspective view showing an external appearance of a video camera as one example of an electronic device according to the fifth embodiment.

FIG. 39 is a perspective view showing an external appearance of a video camera as one example of an electronic device of the fifth embodiment. The video camera includes, for example, a main body portion 541, a lens 542 for shooting objects provided on a front surface of the main body portion 541, a start/stop switch 543 for shooting and a display unit 544, and the display unit 544 is made up of the in-cell display device with a touch detection function or the on-cell display device with a touch detection function described in the first embodiment, the first modified example of the first embodiment, the second embodiment, the third embodiment and the fourth embodiment.

<Mobile Phone>

Figure 40:
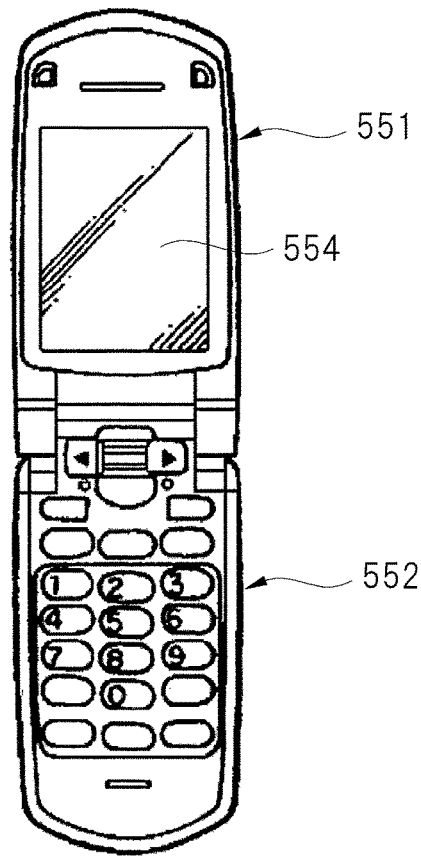
FIG. 40 is a front view showing an external appearance of a mobile phone as one example of an electronic device according to the fifth embodiment.
Figure 41:
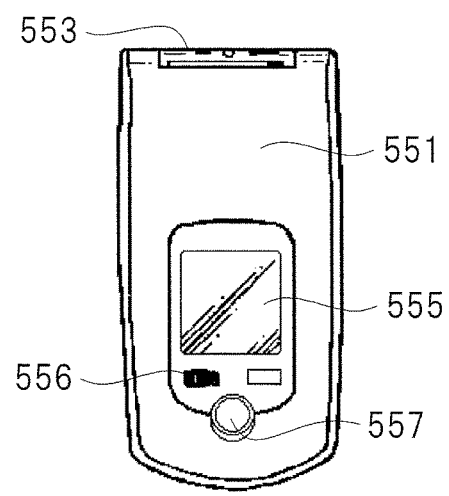
FIG. 41 is a front view showing an external appearance of a mobile phone as one example of an electronic device according to the fifth embodiment.

FIG. 40 and FIG. 41 are front views showing an external appearance of a mobile phone as one example of an electronic device of the fifth embodiment. FIG. 41 shows a state in which the mobile phone shown in FIG. 40 is folded. The mobile phone is composed of, for example, an upper housing 551 and a lower housing 552 coupled by a coupling portion (hinge portion) 553 and includes a display 554, a sub-display 555, a picture light 556 and a camera 557, and the display 554 or the sub-display 555 is made up of the display device with a touch detection function described in the first embodiment, the first modified example of the first embodiment, the second embodiment, the third embodiment and the fourth embodiment.

<Smartphone>

Figure 42:
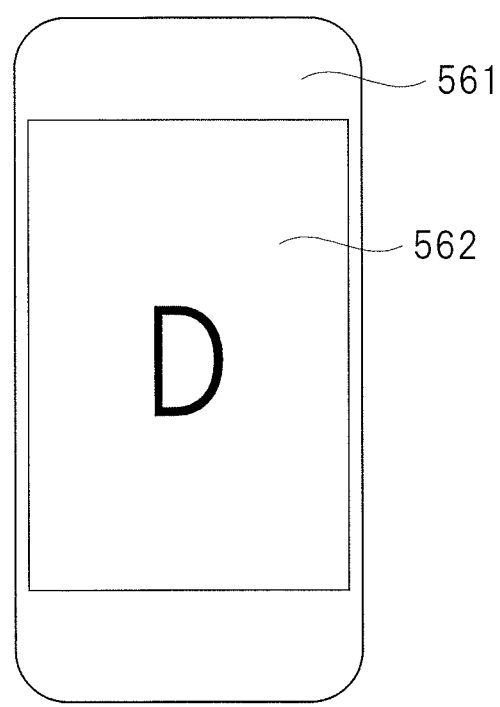
FIG. 42 is a front view showing an external appearance of a smartphone as one example of an electronic device according to the fifth embodiment.

FIG. 42 is a front view showing an external appearance of a smartphone as one example of an electronic device of the fifth embodiment. The mobile phone includes, for example, a housing 561 and a touch screen 562. The touch screen 562 includes, for example, a touch panel serving as an input device and a liquid crystal panel serving as a display unit, and is made up of the in-cell display device with a touch detection function or the on-cell display device with a touch detection function described in the first embodiment, the first modified example of the first embodiment, the second embodiment, the third embodiment and the fourth embodiment.

The touch panel of the touch screen 562 is, for example, the touch detection device 30 provided in the display device 10 with a touch detection function of the display device 1 described with reference to FIG. 1. When a user makes gesture operations such as a touch operation or a drag operation on the touch panel with a finger or a touch pen, the touch panel of the touch screen 562 detects coordinates of the positions corresponding to the gesture operations and outputs them to a control unit (not shown).

The liquid crystal panel of the touch screen 562 is, for example, the liquid crystal display device 20 provided in the display device 10 with a touch detection function of the display device 1 described with reference to FIG. 1. Further, the liquid crystal panel of the touch screen 562 made up of the display device 1 includes, for example, the driving electrode driver 14 of the display device 1 described with reference to FIG. 1. The driving electrode driver 14 applies voltage as image signals to the pixel electrodes 22 (see FIG. 9) provided in each of the plurality of sub-pixels SPix (see FIG. 10) arranged in a matrix form at respectively constant timings, thereby displaying images.

<Main Features and Effects of Present Embodiment>

In the present fifth embodiment, the display devices of each of the first embodiment, the first modified example of the first embodiment, the second embodiment, the third embodiment and the fourth embodiment can be used as the display devices provided in the above-described various electronic devices. Consequently, in the display devices provided in the above-described various electronic devices, the same effects as those of the first embodiment, the first modified example of the first embodiment, the second embodiment, the third embodiment and the fourth embodiment can be obtained, for example, the transmittance of the display region with respect to visible light can be improved and the detection performance of the input device can be improved. Accordingly, it is possible to improve the performance of the above-described various electronic devices.

Also, as described in the first embodiment, the effects which the area ratio R2 or the line width LW1 or interval DS1 of the conductive lines ML (see FIG. 18) exhibits on the transmittance, the visibility, the detected values and the resistance values are more remarkable when the arrangement interval DP1 (see FIG. 20) of the plurality of sub-pixels SPix in the X axis direction is 45 to 180 μm. Accordingly, when the display device of each of the first embodiment, the first modified example of the first embodiment, the second embodiment, the third embodiment and the fourth embodiment is applied to electronic devices having a relatively small arrangement interval of the sub-pixels SPix such as smartphones described in the fifth embodiment, the effects exhibited on visibility when the conductive lines ML have the line width in the above-described range become extremely large.

In the foregoing, the invention made by the inventors of the present invention has been concretely described based on the embodiments. However, it is needless to say that the present invention is not limited to the foregoing embodiments and various modifications and alterations can be made within the scope of the present invention.

Further, in the foregoing embodiments, the cases of a liquid crystal display device have been illustrated as disclosure examples, but all kinds of flat-panel display devices such as an organic EL display device, other self-luminous type display devices and electronic paper display devices having electrophoresis elements may be listed as other application examples. Further, it goes without saying that the present invention is applicable to small, medium and large sized devices without any particular limitation.

All of the display devices and electronic devices which can be embodied by the design change made by a person with ordinary skill in the art on the basis of the display devices and electronic devices described above as respective embodiments of the present invention also belong to the scope of the present invention as long as they include the effects of the present invention.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

Further, with respect to other actions and effects which are brought about by the aspects described in the above-described embodiments, those which are apparent from the descriptions of the present specification and those which can be properly conceived by a person with ordinary skill in the art are deemed to be brought about by the present invention as a matter of course.

The present invention includes at least the following embodiments.

APPENDIX 1

A display device including:

a substrate;

a plurality of pixels arranged in a first region on a first main surface side of the substrate;

a plurality of first electrodes each of which is provided in each of the plurality of pixels;

a second electrode provided so as to overlap the plurality of first electrodes when seen in a plan view;

a third electrode provided apart from the second electrode in the first region;

a plurality of fourth electrodes provided at intervals so as to respectively overlap the third electrode when seen in a plan view; and a fifth electrode provided apart from any of the plurality of fourth electrodes in the first region, wherein images are displayed by applying voltage between each of the plurality of first electrodes and the second electrode, wherein input positions are detected based on electrostatic capacitance between the third electrode and each of the plurality of fourth electrodes, wherein each of the plurality of fourth electrodes includes a first metal layer or a first alloy layer, wherein the fifth electrode includes a second metal layer or a second alloy layer, and wherein a ratio of total sum of areas of portions of the plurality of pixels which overlap any of the plurality of fourth electrodes and the fifth electrode when seen in a plan view to total sum of areas of the plurality of pixels is 1 to 220.

APPENDIX 2

The display device according to Appendix 1, wherein the plurality of pixels are arranged in a matrix form in a first direction and a second direction which intersects the first direction in the first region, wherein each of the plurality of fourth electrodes has a first conductive line including the first metal layer or the first alloy layer, and wherein the first conductive line extends in a third direction as a whole while alternately bending in opposite directions when seen in a plan view.

APPENDIX 3

The display device according to Appendix 2, wherein the ratio of total sum of areas of portions of the plurality of pixels which overlap any of the plurality of fourth electrodes and the fifth electrode when seen in a plan view to total sum of areas of the plurality of pixels is 1 to 11%.

APPENDIX 4

The display device according to Appendix 1, wherein the plurality of pixels are arranged in a matrix form in a first direction and a second direction which intersects the first direction in the first region, wherein each of the plurality of fourth electrodes has a plurality of first conductive lines, wherein each of the plurality of first conductive lines includes the first metal layer or the first alloy layer and extends in a third direction as a whole while alternately bending in opposite directions when seen in a plan view, and wherein portions of adjacent first conductive lines which are bent in mutually opposite directions are coupled with each other.

APPENDIX 5

The display device according to Appendix 4, wherein the ratio of total sum of areas of portions of the plurality of pixels which overlap any of the plurality of fourth electrodes and the fifth electrode when seen in a plan view to total sum of areas of the plurality of pixels is 2 to 22%.

APPENDIX 6

The display device according to Appendix 1, wherein the plurality of pixels are arranged in a matrix form in a first direction and a second direction which intersects the first direction in the first region, wherein each of the plurality of fourth electrodes includes:

a plurality of first conductive lines which extend in a third direction and are arranged in a fourth direction which intersects the third direction; and a plurality of second conductive lines which respectively extend in a fifth direction which intersects both of the third direction and the fourth direction and are arranged in the fourth direction, wherein each of the plurality of first conductive lines includes the first metal layer or the first alloy layer, wherein each of the plurality of second conductive lines includes a third metal layer or a third alloy layer, wherein the plurality of first conductive lines and the plurality of second conductive lines intersect each other, and wherein each of the plurality of fourth electrodes has a mesh-like shape formed by the plurality of first conductive lines and the plurality of second conductive lines which intersect each other.

APPENDIX 7

The display device according to Appendix 6, wherein the ratio of total sum of areas of portions of the plurality of pixels which overlap any of the plurality of fourth electrodes and the fifth electrode when seen in a plan view to total sum of areas of the plurality of pixels is 2 to 22%.

APPENDIX 8

A display device including:

a substrate;

a plurality of pixels arranged in a matrix form in a first direction and a second direction which intersects the first direction in a first region on a first main surface side of the substrate;

a plurality of first electrodes each of which is provided in each of the plurality of pixels;

a second electrode provided so as to overlap the plurality of first electrodes when seen in a plan view;

a third electrode provided apart from the second electrode in the first region; and a plurality of fourth electrodes provided at intervals so as to respectively overlap the third electrode when seen in a plan view, wherein images are displayed by applying voltage between each of the plurality of first electrodes and the second electrode, wherein input positions are detected based on electrostatic capacitance between the third electrode and each of the plurality of fourth electrodes, wherein each of the plurality of fourth electrodes has a first conductive line including a first metal layer or a first alloy layer, wherein the first conductive line has a portion extending in a third direction which intersects both of the first direction and the second direction when seen in a plan view, and wherein a width of the first conductive line is 2 to 7 μm.

APPENDIX 9

The display device according to Appendix 8, wherein the first conductive line extends in a fourth direction as a whole while alternately bending in opposite directions when seen in a plan view.

APPENDIX 10

The display device according to Appendix 9,
wherein a width of the first conductive line is 2.5 to 4.5 µm.

APPENDIX 11

The display device according to Appendix 8,
wherein each of the plurality of fourth electrodes includes a plurality of the first conductive lines,
wherein each of the plurality of first conductive lines extends in a fourth direction as a whole while alternately bending in opposite directions when seen in a plan view, and
wherein portions of adjacent first conductive lines which are bent in mutually opposite directions are coupled with each other.

APPENDIX 12

The display device according to Appendix 11,
wherein a width of each of the plurality of first conductive lines is 2.5 to 4.5 µm.

APPENDIX 13

The display device according to Appendix 8,
wherein each of the plurality of fourth electrodes includes:
the plurality of first conductive lines which extend in the third direction and are arranged in a fourth direction which intersects the third direction; and
a plurality of second conductive lines which extend in a fifth direction which intersects both of the third direction and the fourth direction and are arranged in the fourth direction,
wherein each of the plurality of second conductive lines includes a second metal layer or a second alloy layer,
wherein the plurality of first conductive lines and the plurality of second conductive lines intersect each other, and
wherein each of the plurality of fourth electrodes has a mesh-like shape formed by the plurality of first conductive lines and the plurality of second conductive lines which intersect each other.

APPENDIX 14

The display device according to Appendix 13,
wherein a width of each of the plurality of first conductive lines and the plurality of second conductive lines is 2.5 to 4.5 µm.

APPENDIX 15

A display device including:
a substrate;
a plurality of pixels arranged in a first region on a first main surface side of the substrate;
a plurality of first electrodes each of which is provided in each of the plurality of pixels;
a second electrode provided so as to overlap the plurality of first electrodes when seen in a plan view;
a third electrode provided apart from the second electrode in the first region; and
a plurality of fourth electrodes provided so as to respectively overlap the third electrode when seen in a plan view,
wherein images are displayed by applying voltage between each of the plurality of first electrodes and the second electrode,
wherein input positions are detected based on electrostatic capacitance between the third electrode and each of the plurality of fourth electrodes,
wherein each of the plurality of fourth electrodes includes a first metal layer or a first alloy layer, and
wherein a ratio of total sum of areas of portions of the plurality of pixels which overlap any of the plurality of fourth electrodes when seen in a plan view to total sum of areas of the plurality of pixels is 1 to 22%.

APPENDIX 16

The display device according to Appendix 1, Appendix 8 or Appendix 15,
wherein each of the plurality of fourth electrodes has light-shielding properties with respect to visible light.

APPENDIX 17

The display device according to Appendix 1, Appendix 8 or Appendix 15,
wherein the first electrodes are pixel electrodes,
wherein the second electrode is a common electrode,
wherein the fourth electrodes are detecting electrodes to which detecting signals for detecting the input positions are output, and
wherein driving signals for measuring the electrostatic capacitance between the third electrode and the detecting electrodes are input to the third electrode.

APPENDIX 18

The display device according to Appendix 2 or Appendix 8,
wherein an arrangement interval of the plurality of pixels in the first direction is smaller than an arrangement interval of the plurality of pixels in the second direction, and
wherein the arrangement interval of the plurality of pixels in the first direction is 45 to 180 µm.

APPENDIX 19

The display device according to Appendix 8,
wherein an arrangement interval of the plurality of pixels in the first direction is smaller than an arrangement interval of the plurality of pixels in the second direction,
wherein the arrangement interval of the plurality of pixels in the first direction is 45 to 180 µm, and
wherein an interval of adjacent first conductive lines is 50 to 200 µm.

APPENDIX 20

The display device according to Appendix 1, Appendix 8 or Appendix 15,
wherein a low reflection layer having a lower reflectance with respect to visible light than a reflectance of the fourth electrodes with respect to visible light is formed on a surface of the fourth electrodes or on the fourth electrodes.

APPENDIX 21

The display device according to Appendix 1,
wherein the third electrode is provided in the first region so as not to overlap any of the plurality of first electrodes when seen in a plan view.

APPENDIX 22

The display device according to Appendix 21,
wherein the third electrode is electrically connected with the second electrode, and
wherein the plurality of fourth electrodes are provided so as to overlap the second electrode when seen in a plan view.

APPENDIX 23

The display device according to Appendix 1,
wherein the plurality of pixels are arranged in a matrix form in a first direction and a second direction which intersects the first direction when seen in a plan view,
wherein the third electrode includes a plurality of sixth electrodes which extend in the first direction and are arranged in the second direction when seen in a plan view,
wherein each of the plurality of fourth electrodes has a first conductive line including the first metal layer or the first alloy layer,
wherein the first conductive line includes:
a plurality of first extending portions each of which extends while inclining to a first side in a fourth direction, which intersects a third direction, with respect to the third direction when seen in a plan view; and
a plurality of second extending portions each of which extends while inclining to a side opposite to the first side in the fourth direction with respect to the third direction when seen in a plan view,
wherein the first extending portions and the second extending portions are alternately arranged in the third direction,
wherein end portions of the first extending portions and the second extending portions which are adjacent to each other in the third direction are coupled, and
wherein the fifth electrode includes:
a plurality of third extending portions each of which extends while inclining to the first side in the fourth direction with respect to the third direction when seen in a plan view; and
a plurality of fourth extending portions each of which extends while inclining to the side opposite to the first side in the fourth direction with respect to the third direction when seen in a plan view.

APPENDIX 24

The display device according to Appendix 1,
wherein the plurality of pixels are arranged in a matrix form in a first direction and a second direction which intersects the first direction when seen in a plan view,
wherein the third electrode includes a plurality of sixth electrodes which extend in the first direction and are arranged in the second direction when seen in a plan view,
wherein each of the plurality of fourth electrodes includes:
a first conductive line including the first metal layer or the first alloy layer; and
a second conductive line including a third metal layer or a third alloy layer,
wherein the first conductive line includes:
a plurality of first bent portions each of which bends in a direction which is inclined to a first side in a fourth direction, which intersects a third direction, with respect to the third direction when seen in a plan view; and
a plurality of second bent portions each of which bends in a direction which is inclined to a side opposite to the first side in the fourth direction with respect to the third direction when seen in a plan view,
wherein the second conductive line includes:
a plurality of third bent portions each of which bends in a direction which is inclined to the side opposite to the first side in the fourth direction with respect to the third direction when seen in a plan view; and
a plurality of fourth bent portions each of which bends in a direction which is inclined to the first side in the fourth direction with respect to the third direction when seen in a plan view,
wherein the first bent portions and the second bent portions are alternately arranged in the third direction,
wherein the third bent portions and the fourth bent portions are alternately arranged in the third direction,
wherein each of the plurality of third bent portions of the second conductive line is coupled to each of the plurality of first bent portions of the first conductive line, and
wherein the fifth electrode includes:
a plurality of first extending portions each of which extends while inclining to the first side in the fourth direction with respect to the third direction when seen in a plan view; and
a plurality of second extending portions each of which extends while inclining to the side opposite to the first side in the fourth direction with respect to the third direction when seen in a plan view.

APPENDIX 25

An electronic device provided with the display device according to Appendix 1, Appendix 8 or Appendix 15.

The present invention is effective when applied to a display device.

What is claimed is:
1. A display device, comprising:
a substrate;
a plurality of pixels arranged in a first region on a first main surface side of the substrate;
light-shielding portions surrounding the plurality of pixels so as to demarcate each of the plurality of pixels in the first region;
a plurality of first electrodes each of which is provided in each of the plurality of pixels;
a second electrode provided so as to overlap the plurality of first electrodes when seen in a plan view;
a plurality of third electrodes provided at intervals so as to respectively overlap the second electrode when seen in a plan view; and
a fourth electrode provided apart from any of the plurality of third electrodes in the first region,
wherein images are displayed by applying voltage between each of the plurality of first electrodes and the second electrode,
wherein input positions are detected based on electrostatic capacitance between the second electrode and each of the plurality of third electrodes,
wherein each of the plurality of third electrodes includes a first metal layer or a first alloy layer, wherein the fourth electrode includes a second metal layer or a second alloy layer, wherein a ratio of total sum of areas of portions of the plurality of pixels which overlap any of the plurality of third electrodes and the fourth electrode when seen in a plan view to a total sum of areas of the plurality of pixels is 1 to 22%, and wherein an area of a respective one of the pixels does not include an area of the light-shielding portion demarcating the respective one of the pixels.

2. The display device according to claim 1, wherein the plurality of pixels are arranged in a matrix form in a first direction and a second direction which intersects the first direction in the first region, wherein each of the plurality of third electrodes has a first conductive line including the first metal layer or the first alloy layer, and wherein the first conductive line extends in a third direction as a whole while alternately bending in opposite directions when seen in a plan view.

3. The display device according to claim 2, wherein the ratio of total sum of areas of portions of the plurality of pixels which overlap any of the plurality of third electrodes and the fourth electrode when seen in a plan view to total sum of areas of the plurality of pixels is 1 to 11%.

4. The display device according to claim 2, wherein an arrangement interval of the plurality of pixels in the first direction is smaller than an arrangement interval of the plurality of pixels in the second direction, and wherein the arrangement interval of the plurality of pixels in the first direction is 45 to 180 μm.

5. The display device according to claim 1, wherein the plurality of pixels are arranged in a matrix form in a first direction and a second direction which intersects the first direction in the first region, wherein each of the plurality of third electrodes includes a plurality of first conductive lines, wherein each of the plurality of first conductive lines includes the first metal layer or the first alloy layer and extends in a third direction as a whole while alternately bending in opposite directions when seen in a plan view, and wherein portions of adjacent first conductive lines which are bent in mutually opposite directions are coupled with each other.

6. The display device according to claim 5, wherein the ratio of total sum of areas of portions of the plurality of pixels which overlap any of the plurality of third electrodes and the fourth electrode when seen in a plan view to total sum of areas of the plurality of pixels is 2 to 22%.

7. The display device according to claim 1, wherein the plurality of pixels are arranged in a matrix form in a first direction and a second direction which intersects the first direction in the first region, wherein each of the plurality of third electrodes includes:

a plurality of first conductive lines which extend in a third direction and are arranged in a fourth direction which intersects the third direction; and a plurality of second conductive lines which respectively extend in a fifth direction which intersects both of the third direction and the fourth direction and are arranged in the fourth direction, wherein each of the plurality of first conductive lines includes the first metal layer or the first alloy layer, wherein each of the plurality of second conductive lines includes a third metal layer or a third alloy layer, wherein the plurality of first conductive lines and the plurality of second conductive lines intersect each other, and wherein each of the plurality of third electrodes has a mesh-like shape formed by the plurality of first conductive lines and the plurality of second conductive lines which intersect each other.

8. The display device according to claim 7, wherein the ratio of total sum of areas of portions of the plurality of pixels which overlap any of the plurality of third electrodes and the fourth electrode when seen in a plan view to total sum of areas of the plurality of pixels is 2 to 22%.

9. The display device according to claim 1, wherein each of the plurality of third electrodes has light-shielding properties with respect to visible light.

10. The display device according to claim 1, wherein the first electrodes are pixel electrodes, wherein the second electrode is a common electrode, wherein the third electrodes are detecting electrodes to which detecting signals for detecting the input positions are output, and wherein driving signals for measuring the electrostatic capacitance between the common electrode and the detecting electrodes are input to the common electrode.

11. The display device according to claim 1, wherein a low reflection layer having a lower reflectance with respect to visible light than a reflectance of the third electrodes with respect to visible light is formed on a surface of the third electrodes or on the third electrodes.

12. A display device, comprising:

a substrate;

a plurality of pixels arranged in a matrix form in a first direction and a second direction which intersects the first direction in a first region on a first main surface side of the substrate;

a plurality of first electrodes each of which is provided in each of the plurality of pixels;

a second electrode provided so as to overlap the plurality of first electrodes when seen in a plan view; and a plurality of third electrodes provided at intervals so as to respectively overlap the second electrode when seen in a plan view, wherein images are displayed by applying voltage between each of the plurality of first electrodes and the second electrode, wherein input positions are detected based on electrostatic capacitance between the second electrode and each of the plurality of third electrodes, wherein each of the plurality of third electrodes has a first conductive line including a first metal layer or a first alloy layer, wherein the first conductive line has a portion extending in a third direction which intersects both of the first direction and the second direction when seen in a plan view, wherein a width of the first conductive line is 2 to 7 μm and the arrangement interval of the plurality of pixels in the first direction is 45 to 180 μm, and wherein an interval of adjacent first conductive lines is 50 to 200 μm.

13. The display device according to claim 12, wherein a low reflection layer having a lower reflectance with respect to visible light than a reflectance of the third electrodes with respect to visible light is formed on a surface of the third electrodes or on the third electrodes.

14. A display device, comprising:
a substrate;
a plurality of pixels arranged in a first region on a first main surface side of the substrate;
light-shielding portions surrounding the plurality of pixels so as to demarcate each of the plurality of pixels in the first region;
a plurality of first electrodes each of which is provided in each of the plurality of pixels;
a second electrode provided so as to overlap the plurality of first electrodes when seen in a plan view; and
a plurality of third electrodes provided so as to respectively overlap the second electrode when seen in a plan view,
wherein images are displayed by applying voltage between each of the plurality of first electrodes and the second electrode,
wherein input positions are detected based on electrostatic capacitance between the second electrode and each of the plurality of third electrodes,
wherein each of the plurality of third electrodes includes a first metal layer or a first alloy layer, and
wherein a ratio of total sum of areas of portions of the plurality of pixels which overlap any of the plurality of third electrodes when seen in a plan view to total sum of areas of the plurality of pixels is 1 to 22%, and
wherein an area of a respective one of the pixels does not include an area of the light-shielding portion demarcating the respective one of the pixels.

15. The display device according to claim 14,
wherein each of the plurality of third electrodes has light-shielding properties with respect to visible light.

16. The display device according to claim 14,
wherein the first electrodes are pixel electrodes,
wherein the second electrode is a common electrode,
wherein the third electrodes are detecting electrodes to which detecting signals for detecting the input positions are output, and
wherein driving signals for measuring the electrostatic capacitance between the common electrode and the detecting electrodes are input to the common electrode.

17. The display device according to claim 14,
wherein a low reflection layer having a lower reflectance with respect to visible light than a reflectance of the third electrodes with respect to visible light is formed on a surface of the third electrodes or on the third electrodes.

18. A display device, comprising:
a substrate;
a plurality of pixels arranged in a first region on a first main surface side of the substrate;
light-shielding portions surrounding the plurality of pixels so as to demarcate each of the plurality of pixels in the first region;
a plurality of first electrodes each of which is provided in each of the plurality of pixels;
a second electrode provided so as to overlap the plurality of first electrodes when seen in a plan view;
a plurality of third electrodes provided at intervals so as to respectively overlap the second electrode when seen in a plan view; and
a fourth electrode provided apart from any of the plurality of third electrodes in the first region,
wherein images are displayed by applying voltage between each of the plurality of first electrodes and the second electrode,
wherein input positions are detected based on electrostatic capacitance of each of the plurality of third electrodes,
wherein each of the plurality of third electrodes includes a first metal layer or a first alloy layer,
wherein the fourth electrode includes a second metal layer or a second alloy layer, and
wherein a ratio of total sum of areas of portions of the plurality of pixels which overlap any of the plurality of third electrodes and the fourth electrode when seen in a plan view to total sum of areas of the plurality of pixels is 1 to 22%, and
wherein an area of a respective one of the pixels does not include an area of the light-shielding portion demarcating the respective one of the pixels.

19. A display device, comprising:
a substrate;
a plurality of pixels arranged in a first region on a first main surface side of the substrate;
light-shielding portions surrounding the plurality of pixels so as to demarcate each of the plurality of pixels in the first region;
a plurality of first electrodes each of which is provided in each of the plurality of pixels;
a second electrode provided so as to overlap the plurality of first electrodes when seen in a plan view; and
a plurality of third electrodes provided so as to respectively overlap the second electrode when seen in a plan view,
wherein images are displayed by applying voltage between each of the plurality of first electrodes and the second electrode,
wherein input positions are detected based on electrostatic capacitance of each of the plurality of third electrodes,
wherein each of the plurality of third electrodes includes a first metal layer or a first alloy layer, and
wherein a ratio of total sum of areas of portions of the plurality of pixels which overlap any of the plurality of third electrodes when seen in a plan view to total sum of areas of the plurality of pixels is 1 to 22%, and
wherein an area of a respective one of the pixels does not include an area of the light-shielding portion demarcating the respective one of the pixels.

* * * * *